(12) United States Patent
Pyzow et al.

(10) Patent No.: US 12,315,234 B2
(45) Date of Patent: May 27, 2025

(54) METHODS AND SYSTEMS FOR VISUAL REPRESENTATION OF MODEL PERFORMANCE

(71) Applicant: DataRobot, Inc., Boston, MA (US)

(72) Inventors: Ivan Pyzow, Chicago, IL (US); Pavlo Kochubei, Kyiv (UA); Yehor Kolchyba, Kyiv (UA); Sylvain Ferrandiz, Perros-Guirec (FR); Anton Kasyanov, Kyiv (UA)

(73) Assignee: DataRobot, Inc., Boston, MA (US)

( * ) Notice: Subject to any disclaimer, the term of this patent is extended or adjusted under 35 U.S.C. 154(b) by 335 days.

(21) Appl. No.: 18/090,596

(22) Filed: Dec. 29, 2022

(65) Prior Publication Data

US 2023/0206610 A1 Jun. 29, 2023

Related U.S. Application Data

(60) Provisional application No. 63/294,726, filed on Dec. 29, 2021.

(51) Int. Cl.
| | |
|---|---|
| *G06V 10/00* | (2022.01) |
| *G06V 10/56* | (2022.01) |
| *G06V 10/776* | (2022.01) |
| *G06V 10/82* | (2022.01) |
| *G06V 10/94* | (2022.01) |

(52) U.S. Cl.
CPC .......... *G06V 10/776* (2022.01); *G06V 10/56* (2022.01); *G06V 10/82* (2022.01); *G06V 10/945* (2022.01)

(58) Field of Classification Search
CPC ........ G06N 20/00; G06N 20/10; G06N 20/20; G06V 10/82; G06V 10/761; G06V 10/776; G06V 10/56; G06V 10/945
See application file for complete search history.

(56) References Cited

U.S. PATENT DOCUMENTS

| | | | |
|---|---|---|---|
| 7,075,536 B1* | 7/2006 | Goldschmidt | H04L 41/0253 |
| | | | 715/234 |
| 9,218,574 B2* | 12/2015 | Phillipps | G06N 20/20 |
| 10,282,677 B2* | 5/2019 | Merler | H04N 21/00 |
| 11,030,574 B1* | 6/2021 | Grande | G06N 3/045 |
| 11,126,847 B2* | 9/2021 | Yu | G06V 20/56 |
| 11,295,483 B1* | 4/2022 | Krishnamoorthy | G06V 20/20 |
| 11,829,445 B1* | 11/2023 | Bazzani | G06Q 30/0631 |
| 11,900,244 B1* | 2/2024 | Genc | G06N 3/08 |

(Continued)

*Primary Examiner* — Amir Alavi
(74) *Attorney, Agent, or Firm* — Greenberg Traurig, LLP; Andrew J. Tibbetts; Samuel S. Stone

(57) ABSTRACT

Disclosed herein at methods and systems for visualizing machine learning model performance. One method comprises receiving a request to provide a visual representation of a machine learning technique executed on a set of images to generate a first attribute and a second attribute for each image; executing the machine learning model to receive the first and the second attribute for each image; mapping the first attribute to a visual distinctiveness protocol; identifying a distance for each image, the distance representing a difference between the second attribute predicted by the model for each pair of respective images within the set of images; and providing for display at least a subset of the set of images arranged in accordance with their respective distance and having a visual attribute corresponding to the mapped first attribute for each image.

20 Claims, 23 Drawing Sheets

(56) References Cited

U.S. PATENT DOCUMENTS

| | | | |
|---|---|---|---|
| 11,948,078 B2* | 4/2024 | Vahdat | G06V 30/274 |
| 11,984,042 B2* | 5/2024 | Cho | G09B 7/02 |
| 12,100,077 B2* | 9/2024 | Bonic | G06T 11/206 |
| 2022/0108495 A1* | 4/2022 | Krishnamoorthy | G06F 18/22 |

* cited by examiner

METHODS AND SYSTEMS FOR VISUAL REPRESENTATION OF MODEL PERFORMANCE

CROSS-REFERENCE TO RELATED APPLICATIONS

This application claims priority to U.S. Provisional Patent Application No. 63/294,726, filed on Dec. 29, 2021, which is incorporated herein by reference in its entirety for all purposes.

BACKGROUND

When training a machine learning model, it is imperative that the end-user is aware of various classifications and categorizations of the training data and/or results generated by the model. For instance, the end-user may be interested in monitoring certain anomalies within the training data and/or operations of a model (e.g., how the model has identified an image and whether the model's designation or categorization is accurate). Inexperienced end-users are generally unable to generate code that can monitor the model's performance.

SUMMARY OF THE INVENTION

Systems and methods of this technical solution can identify and visually present how a model's performance. Specifically, various graphical user interfaces (GUIs) described herein visualize categories or clusters data (e.g., training data and/or user data used to make predictions) as ingested and/or analyzed by a model. Using the methods and systems described herein, a model performance visualization system (system) can produce various GUIs that can quickly identify how data is treated by one or more models, such that end-users (regardless of their programming or computer science skills) can quickly evaluate the models.

Using the methods and systems of the technical solutions described herein, users can identify whether a particular dataset includes any anomalies, the types of anomalies included within the dataset, remove anomalies, and/or track data drift by counting anomalies in test data over time. Using the methods and system of the technical solutions described herein, users may use unlabeled data to train a machine learning model and use various GUIs discussed herein to gain insight into the ingested training data and predictions. Users may use these identified anomalous data points (e.g., identified via using the GUIs described herein) to make it easier to manually label data.

At least one aspect of this technical solution is directed to a method. The method can be performed by a data processing system. The method can include the data processing system receiving a request to provide a visual representation of a machine learning technique executed on a set of images to generate a first attribute and a second attribute for each image. The method can include the data processing system executing the machine learning model to receive the first and the second attribute for each image. The method can include the data processing system mapping the first attribute to a visual distinctiveness protocol. The method can include the data processing system identifying a distance for each image. The distance can represent a difference between the second attribute predicted by the model for each pair of respective images within the set of images. The method can include the data processing system providing for display at least a subset of the set of images arranged in accordance with their respective distance and having a visual attribute corresponding to the mapped first attribute for each image.

In another embodiment, a system comprises a server having one or more processors configured to receive a request to provide a visual representation of a machine learning technique executed on a set of images to generate a first attribute and a second attribute for each image; execute the machine learning model to receive the first and the second attribute for each image; map the first attribute to a visual distinctiveness protocol; identify a distance for each image, the distance representing a difference between the second attribute predicted by the model for each pair of respective images within the set of images; and provide for display at least a subset of the set of images arranged in accordance with their respective distance and having a visual attribute corresponding to the mapped first attribute for each image.

In yet another embodiment, a system comprises a non-transitory computer-readable medium containing instructions that when executed by a processor causes the processor to perform operations comprising receiving a request to provide a visual representation of a machine learning technique executed on a set of images to generate a first attribute and a second attribute for each image; executing the machine learning model to receive the first and the second attribute for each image; mapping, by the data processing system, the first attribute to a visual distinctiveness protocol; identifying a distance for each image, the distance representing a difference between the second attribute predicted by the model for each pair of respective images within the set of images; and providing for display at least a subset of the set of images arranged in accordance with their respective distance and having a visual attribute corresponding to the mapped first attribute for each image.

BRIEF DESCRIPTION OF THE DRAWINGS

The advantages of some embodiments may be understood by referring to the following description taken in conjunction with the accompanying drawings. In the drawings, reference characters generally refer to the same parts throughout the different views. Also, the drawings are not necessarily to scale, emphasis instead generally being placed upon illustrating principles of some embodiments of the solution.

FIGS. 2A-2G illustrate different graphical user interfaces displayed within a model performance visualization system in accordance with various embodiments.

DETAILED DESCRIPTION

Figure 1:
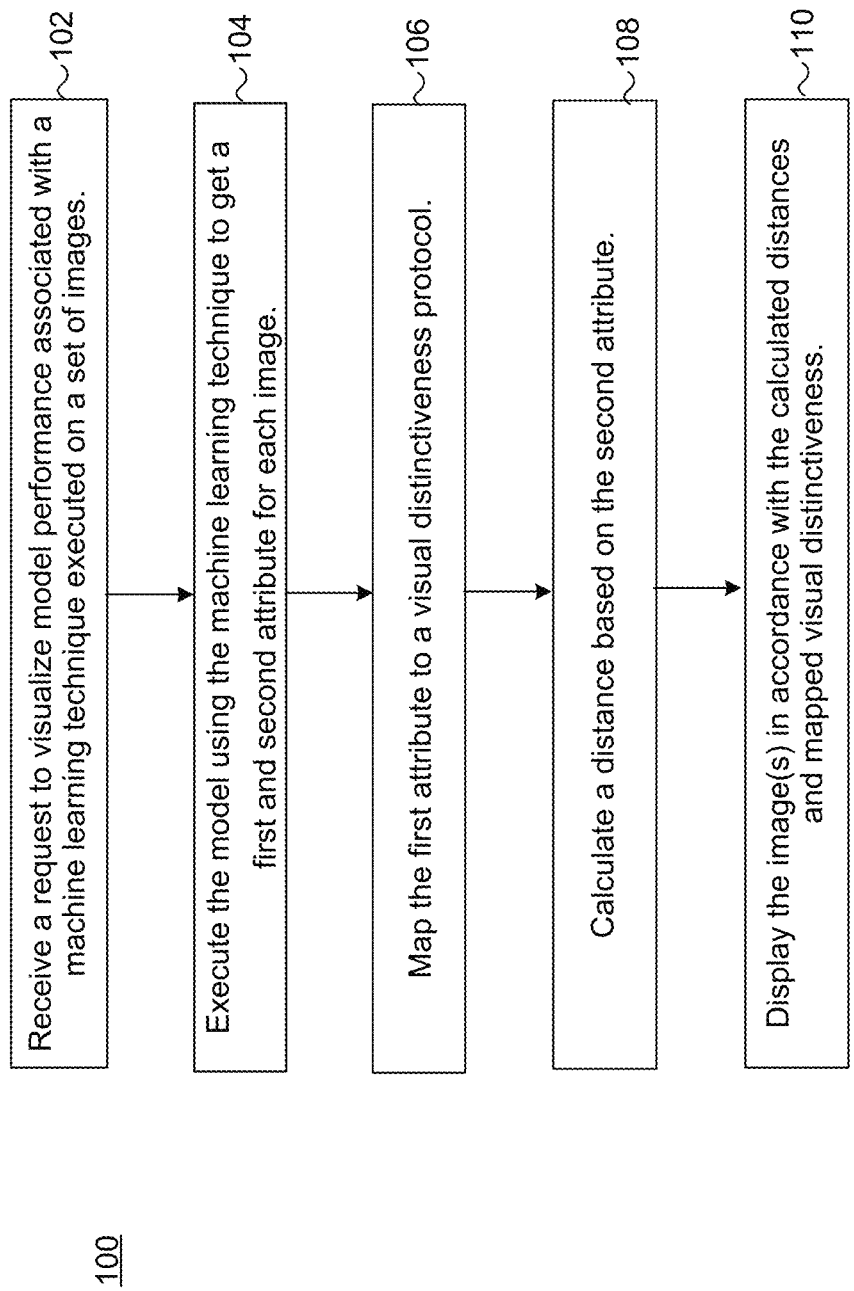
FIG. 1 illustrates execution steps for a model performance visualization system, in accordance with an embodiment.

This disclosure is directed to systems and methods to visualize model performance. For purposes of reading the description of the various embodiments below, the following descriptions of the sections of the specification and their respective contents may be helpful:

Referring now to FIG. 1, a flowchart depicting operational steps executed by a model performance visualization system (the system) is depicted, in accordance with an embodiment. The method 100 can be performed by one or more systems or components depicted in FIGS. 5A-11, including, for example, a server 1050, client 1010, processing nodes 1070, as depicted in FIG. 10. The method 100 describes how a processor or a server of the system can allow a user to monitor the performance of one or more models.

Other configurations of the method 100 may comprise additional or alternative steps, or may omit one or more steps altogether. Some of the steps of the method 100 may be executed by another processor or server (e.g., local processor on an electronic device) under direction and instructions from the system.

Using the method 100, the system may display one or more GUIs on a user computing device, such as a computer operated by a user. As used herein, the user may be a customer utilizing services associated with the system. For instance, the user may be a subscriber of the services rendered by the system and may utilize the system and its various models to generate decisions or receive predicted outputs. For instance, the user may access an electronic platform (e.g., website) associated with the system and interact with various GUIs and features discussed herein to evaluate a model's performance. For instance, the user may use the methods and systems discussed herein to determine whether their training dataset includes any anomalies. In another example, the user may use the GUIs discussed herein to determine how the model groups different images or which features (within the images) have been identified by the model to be the important features (e.g., activation maps).

Using the method 100, users can view and understand how a model is classifying the data. Users can also view enough images to feel confident in conclusions and predictions made by a model. For instance, after viewing how a model has accurately recognized and grouped various images (as opposed to reading other accuracy metrics), users may gain more trust in the model. Using the method 100, users can view the images in a way that allows them to "dive into" a single image and not have it be obstructed by other images. For instance, users can interact with images by zooming in and out of the depicted set of images, explore each image if desired, browse through the images, and view model performance as it relates to each image. For instance, as described herein, a user can see an image of a cat then click on the image to view a likelihood of the image including a cat that has been calculated by the model. These insights allow the user to easily understand how the model is treating the ingested data.

At step 102, the system may receive a request to visualize model performance associated with a machine learning technique executed on a set of images. The system may receive a request from the user to visualize a model's performance. The user may log into a platform provided by the system (e.g., website), select a model and request the system to visualize its performance. The method 100 can be applied to models that are in training and/or deployed. For instance, the user may request to view a visualization of how a model treats various data points within a training dataset. Additionally or alternatively, the user may upload a test dataset to be ingested and analyzed by the model.

The system may also receive a machine learning technique to be applied to the dataset. The methods and system discussed herein can be applied to visualize model performance regarding one or more models using various AI/ML, specific techniques or protocols (also referred to as a machine learning problem). Non-limiting examples of techniques may include binary technique, classification technique, regression technique, clustering technique, multi-class technique, and multi-labeling technique. That is, the model may generate a prediction using one or more of these techniques.

At step 104, the system may execute the model using the machine learning technique to get a first and second attribute for each image. The system may use the dataset to analyze the test dataset (either identified or uploaded by the user or retrieved by the system) and generate various predictions.

In a non-limiting example, a user may upload a set of images of airplanes and helicopters. The user may then indicate that the user is interested in executing the model to identify whether each airplane is in flight or on the ground and separate the images of the airplanes from the helicopters. The system may then execute the model and determine two attributes related to each image. The first attribute may correspond to the likelihood that each image depicts an airplane or a helicopter. The second attribute may indicate a likelihood that each image depicts a helicopter or a plane that is in flight versus a likelihood of the plane or the helicopter being on the ground. In another non-limiting example, the system may analyze a set of images to determine whether they depict a cat or a dog (first attribute) and their respective color (second attribute).

The machine learning technique may either be inputted by the user or may be automatically detected in accordance with the dataset and/or the model's training. For instance, the system may automatically detect a clustering technique because the model is being trained in an unsupervised manner.

At step 106, the system may map the first attribute to a visual distinctiveness protocol. The system may identify a distinctiveness protocol and may map the first attribute to the said protocol. As used herein, distinctiveness protocol is any method of visually distinguishing an image (from the set of images that is ingested and analyzed by the model) based on their attribute. Therefore, distinctiveness protocol may correspond to a spectrum where the first attribute associated with an image is mapped to the spectrum. The spectrum may be a spectrum of different colors, different hues of the same color, different hatching patterns, different line thickness values, and the like.

At step 108, the system may identify a distance for each pair of images in accordance with their second attribute. As used herein, a distance may refer to a difference between the second attribute of each image. For instance, and referring back to the example of identifying and classifying images of cats and dogs, the distance between two images may indicate a difference between a first image's likelihood of depicting a cat with a second image's likelihood of depicting a cat. As described herein, the system may use the distance to visually identify how the model groups the set of images.

At step 110, the system may display the image(s) in accordance with the calculated distances and mapped visual distinctiveness. The system may first extract various feature layers from the model. The feature layers, as used herein, may refer to high dimensional vectors or featurized versions of a set of images ingested and/or analyzed by the model. the system may then execute a dimensionality reduction protocol, such as Trimaping to generate a suitable 2-dimensional representation of the image. The system may then plot the image (e.g., provide a visual representation of the image). The system may also arrange the images in accordance with the distance and visual distinctiveness calculated.

For certain project types (e.g., regression analysis), the system may display a graphical input element, such as a slider, and allow users to select a particular region (or a range) to view. This is particularly helpful for regression analysis because the values are continuous.

In some embodiments, the images may be visually distinct in accordance with one or more predicted or actual values. For instance, the system may use visual elements (e.g., color borders, hatch patterns, and the like) to visually distinguish an image in accordance with its particular predicted and/or actual attribute.

The GUIs discussed herein are information-rich and allow users to view multiple categories of information at once. Therefore, various visual attributes of the images (e.g., the position and color of each image) may be presented at once. For instance, a set of images may be displayed in groups where a distance between the images (on X or Y axis) represent a distance between the content of the images with respect to a particular attribute (e.g., the distance may indicate a likelihood that the image includes a cat; therefore, all images that are identified as including cats are shown as closer together than images that include a dog). Simultaneously, the system may view an activation map for each image. Moreover, the user can filter in accordance with various actual and/or predicted attributes of the images.

The GUIs discussed herein may display different images as visually distinct in accordance with one or more actual and/or predicted attributes. In some of the depicted embodiments, the system uses different colors (e.g., colors displayed as a border around one or more images) to visually distinguish different images. However, the visual distinctiveness of the images is not limited to colors. In other configurations, the system may use other methods (e.g., hatching patterns) to visually distinguish one or more images. In yet some other configurations, the system may show different shapes to visually distinguish one or more images. For instance, an image that satisfies a user-defined threshold may be shown as having a circular or rectangular border.

The images displayed within the GUIs described herein may be interactive, such that users can hover over or click on (or otherwise interact with) an image to view specific values of the selected image. Upon receiving a request from a user, the system may also display the image in its entirety (e.g., a high-resolution image and not a thumbnail or a low-resolution small depiction of the image).

Figure 2A:
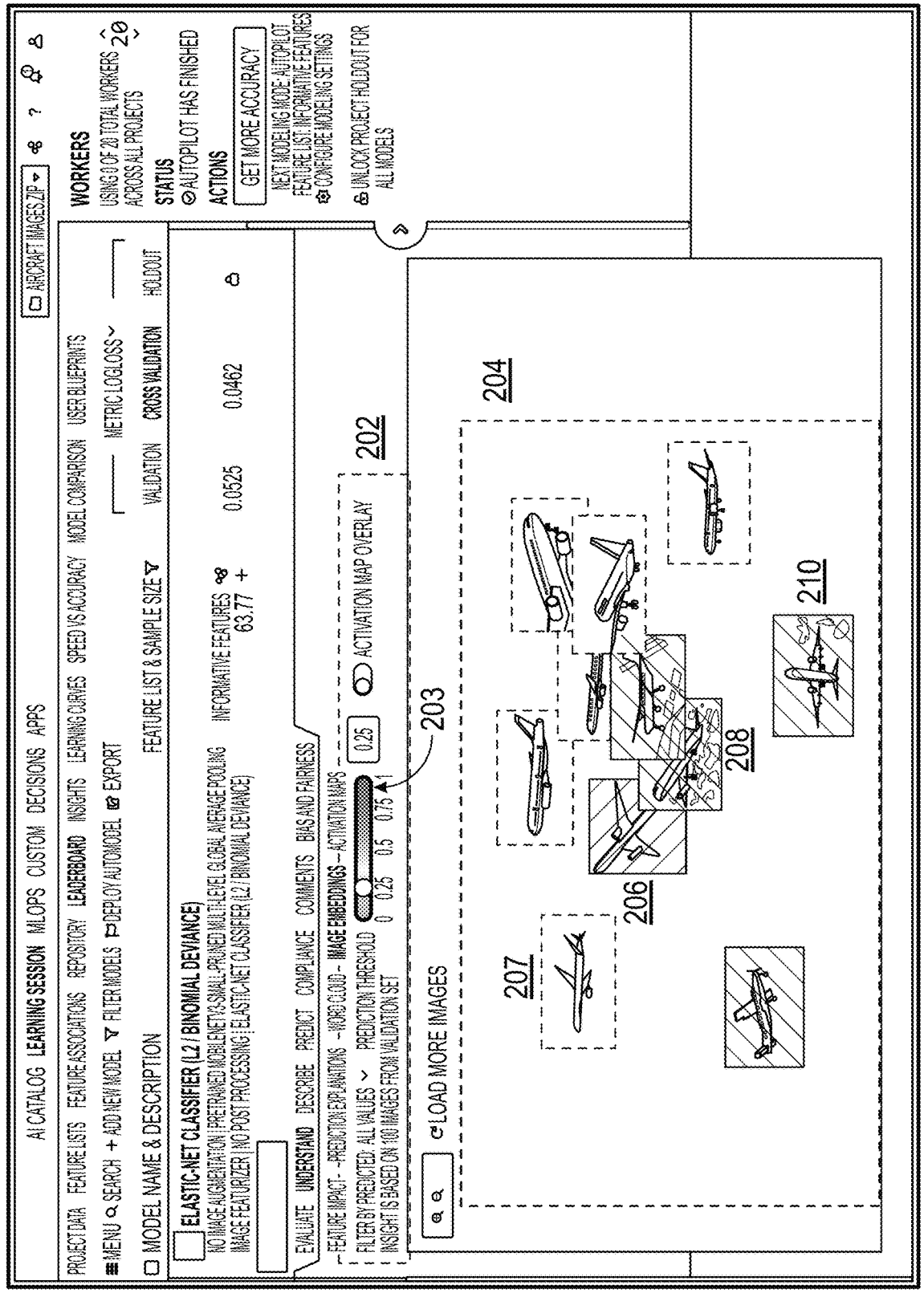

If the system is displaying results of binary analysis, the system may arrange the images based on their predicted probability scaled in accordance with a pre-determines scale (e.g., 0-1). Referring now to FIG. 2A, the system may display the GUI 200 that includes the input elements 202 and a set of images 204. The GUI 200 arranges the set of images 204 after analyzing the set of images 204 for a binary prediction.

In the depicted embodiment, the model is deployed to determine which images include a plane. The system may change the colored border of each image in accordance with values received from the slider 203 within the input elements 202. The slider 203 is an input element configured to receive a prediction threshold.

Prediction requests for binary classification models may return both a probability of the positive class and a label. The system may use a prediction threshold of 0.5 as a default. In the resulting predictions, records with values above the threshold will have the positive class's label (in addition to the probability) based on this threshold. However, this threshold may be revised. For instance, a threshold of 0.7 may indicate that a classification is to be made if the model has indicated a likelihood that an image is more than 70% likely to include a plane.

The color borders may correspond to the prediction threshold. For instance, when the slider 203 is set to 0, the system may show a color border for each image. However, when the slider 203 is set to 0.25 (as depicted), the system may show a border for only images that satisfy the prediction threshold. The color of each border corresponds to a color scheme that is regenerated and can be revised and/or customized for each user. For instance, an image that has a high prediction rate (e.g., 90% likely to be a plane) has a color that matches its respective value within the color spectrum displayed within the input elements 204. For instance, the image 206 has a lower prediction likelihood than image 208 or 210. Moreover, the image 207 is shown without a colored border because the predicted value of the image 207 is below the predictions threshold. In some embodiments, the system may also hide the images below (or sometimes above) the prediction threshold.

The system may revise the set of images (e.g., the number of images, the position of one or more images, and/or color of one or more borders) in accordance with changes received from the input elements 202. For instance, the user may modify the slider 203 and the set of images (and their corresponding color) may change in real-time or near real-time.

The system may use the methods and system described herein to visualize a model's performance with respect to clustering. In unsupervised learning, "clustering" can include the model automatically splitting a dataset (e.g., images of planes) into groups according to similarity. This allows the model to automatically identify patterns associated with group(s) of data within the dataset. In the depicted example, the model uses clustering algorithms to identify three clusters associated with the images. Therefore, each image may be planed into a cluster or a bin accordingly. The number of clusters may be generated or calculated by the model.

Figure 2B:
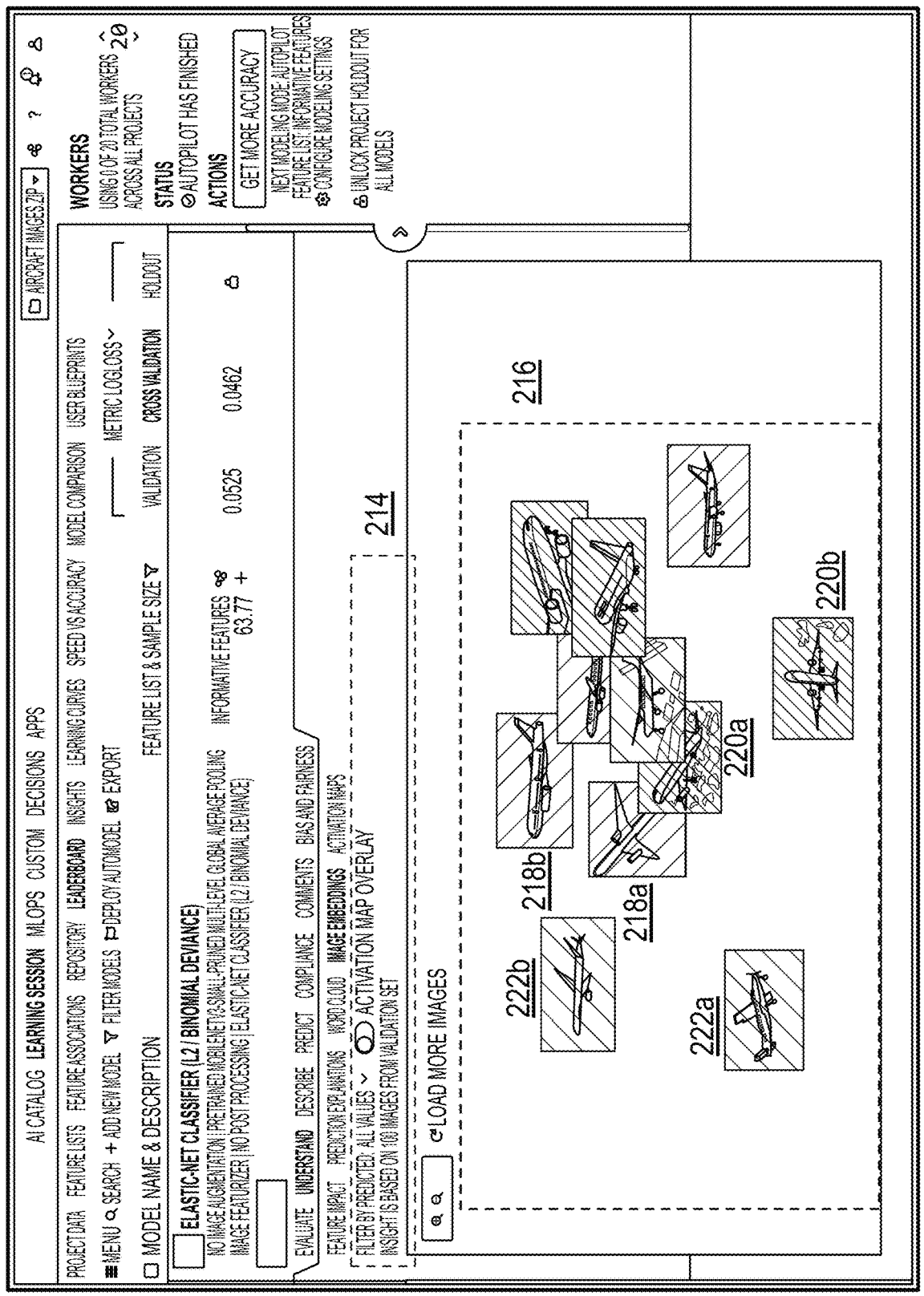
Figure 2C:
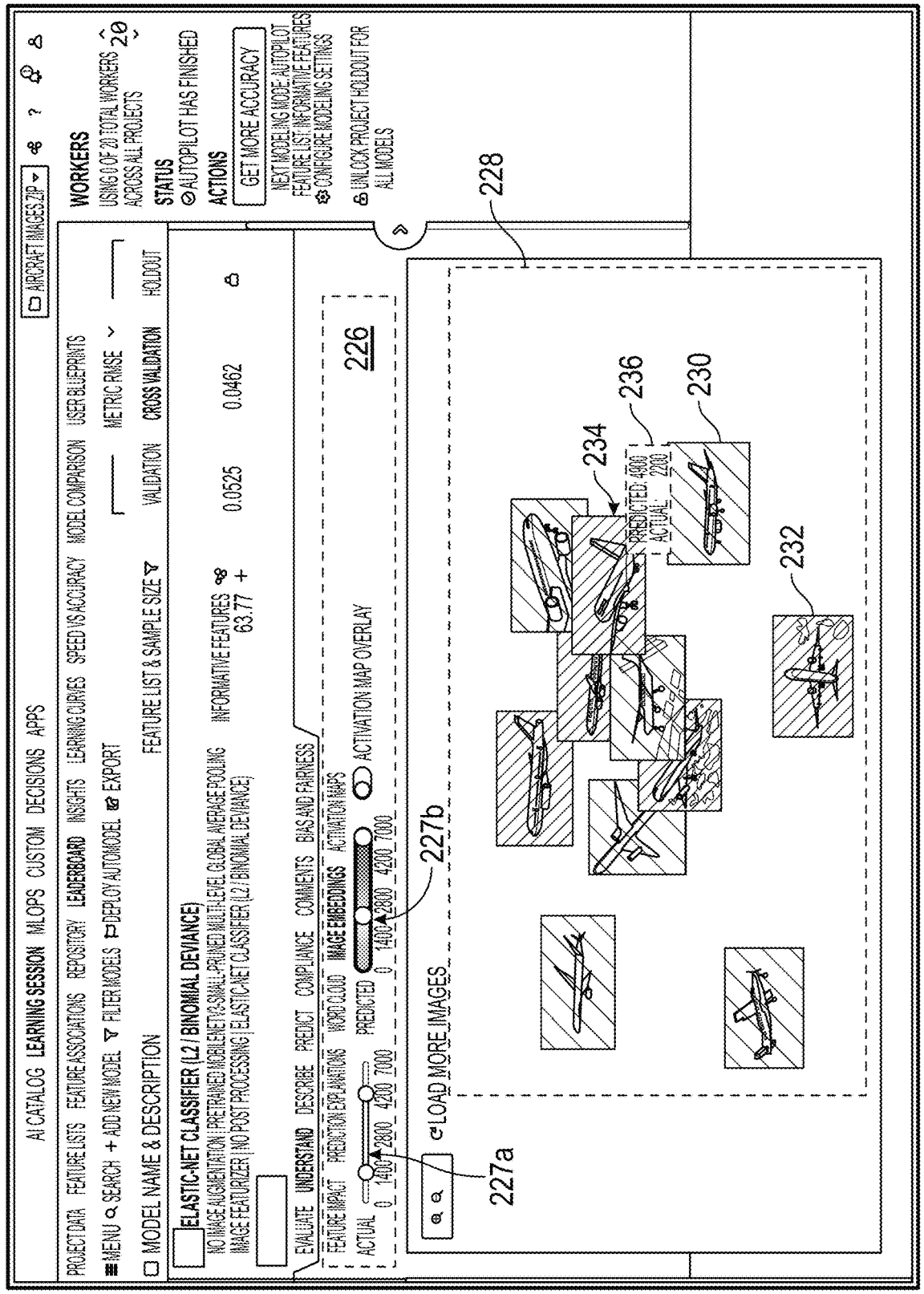

Referring now to FIG. 2B, the GUI 212 may include the input elements 214. Because the GUI 212 is showing results of a model's clustering, the input elements are limited to the predicted values. The input elements 214 also do not include a slider because the model is not deployed to solve a regression technique or a binary technique (e.g., there is not one continuum of probability on which to predict). The system may also display a set of images 216 where each image is visually distinct based on its corresponding cluster. For instance, the images 218*a-b* belong to a first cluster, images 220*a-b* belong to a second cluster, and the images 222*a-b* belong to a third cluster. The system may use different (and consistent) colored image borders to depict which image belongs to which cluster.

The system may also filter for each class/cluster. For instance, the system may only show images that belong to a particular cluster when the system determines that the user has selected that cluster to view.

Figure 2D:
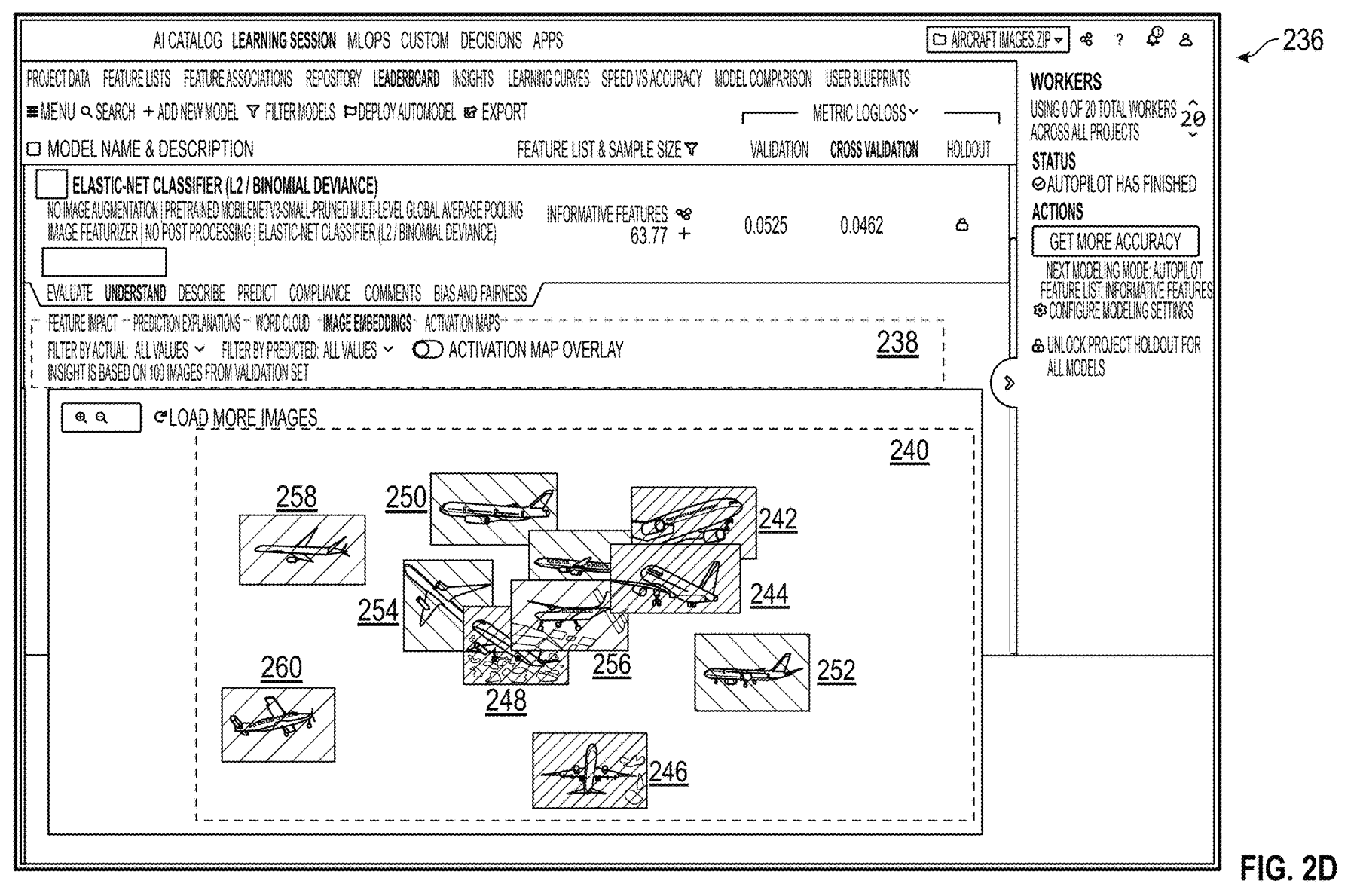
Figure 2E:
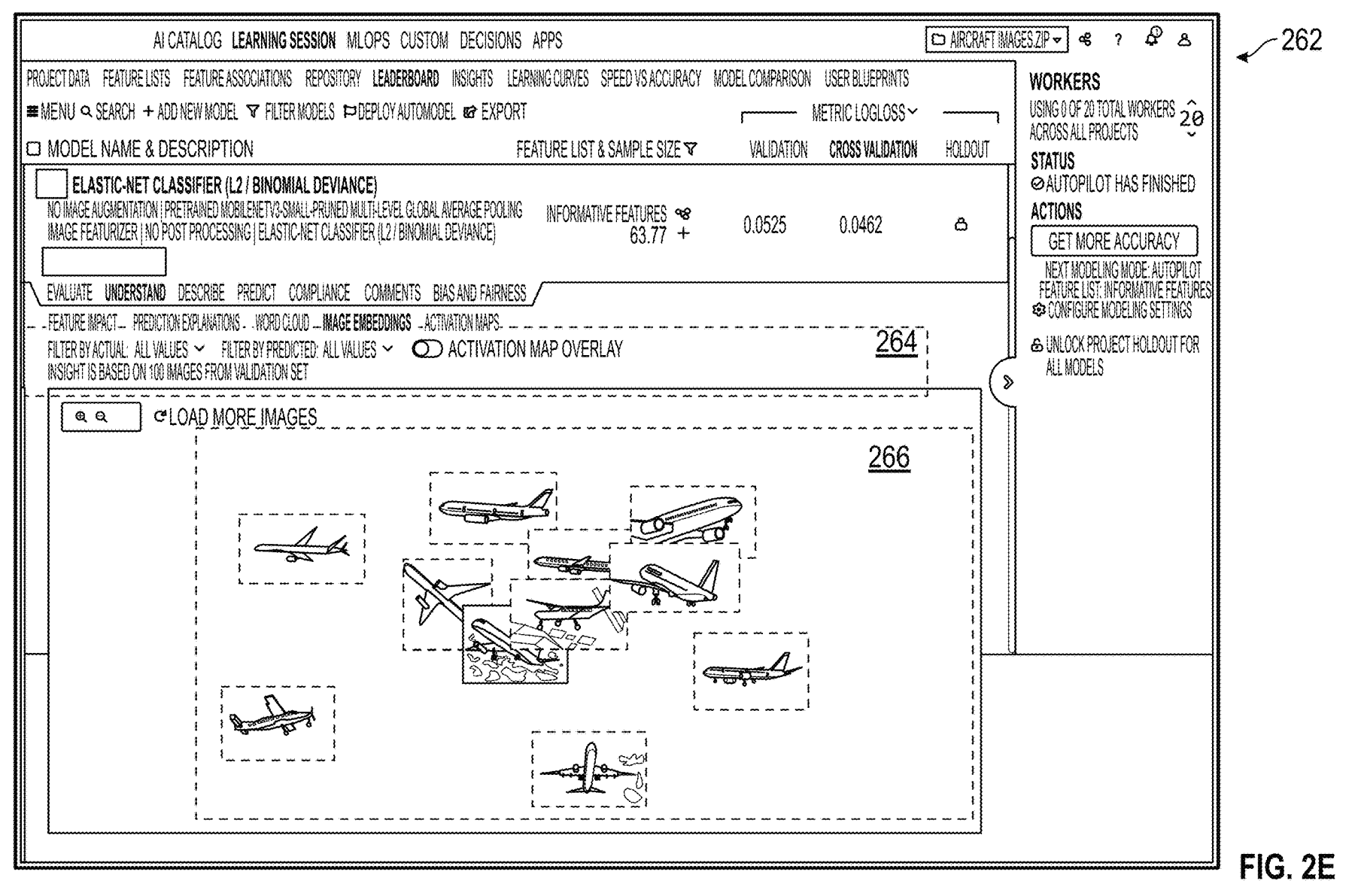
Figure 2F:
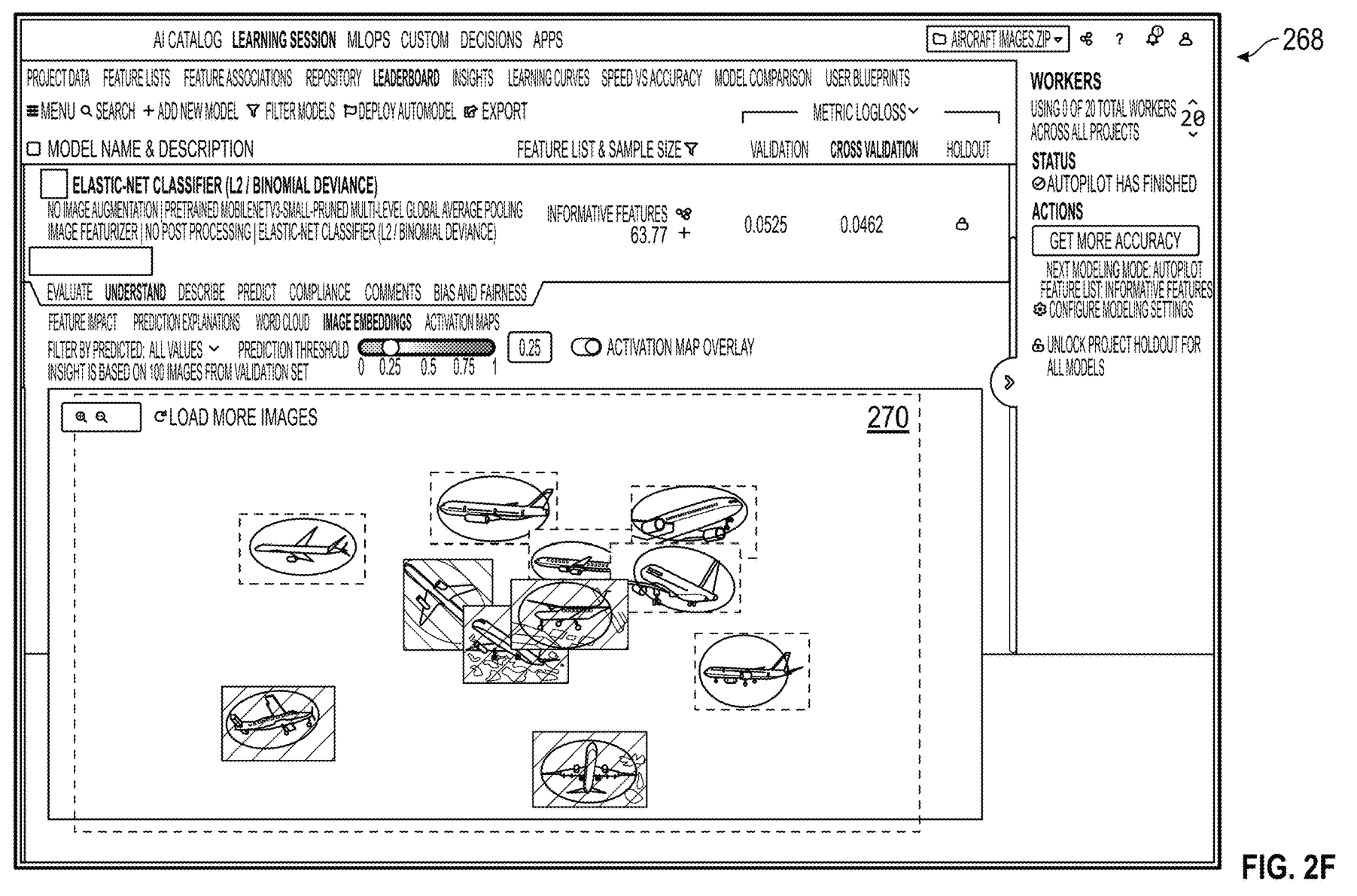
Figure 2G:
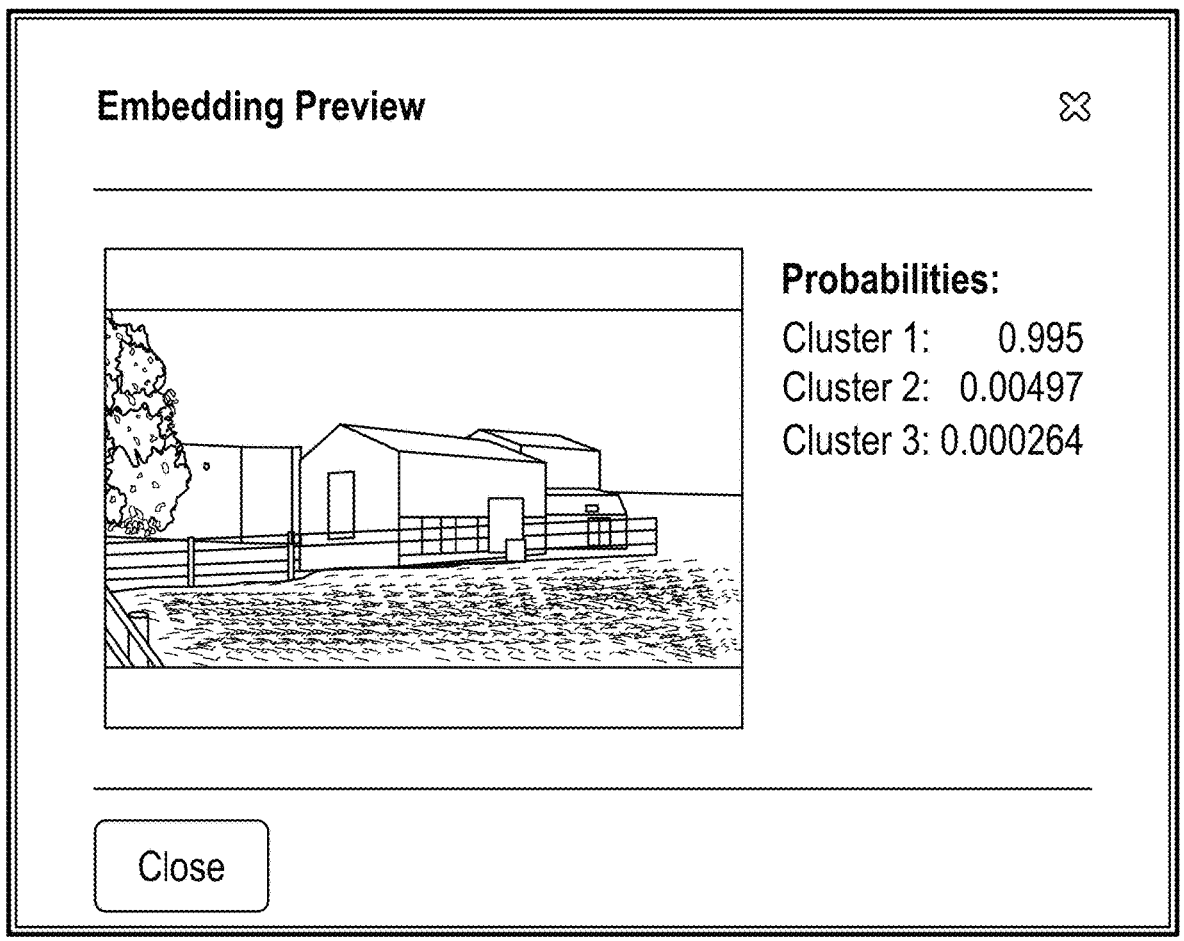

The images within the set of images 216 may be interactive, such that when interacted with, the system shows detailed data associated with the selected image. For instance, as depicted in FIG. 2G, the system may display a probability of the image belonging to different clusters.

The system may also use the methods and systems discussed herein to visualize a model's performance with regard to classification technique, as depicted in GUI 224. The input elements 226 include actual values and predicted values, which indicates that the model was deployed to solve a supervised problem. The input elements also include a predicted threshold on a scale of 0-1 (regression problem was solved therefore the model will have predicted values). The system may show different images within the set of images 228 as having different colored borders in accordance with different inputs received from the user interacting with the input elements 226.

The input elements 226 may include a slider 227*a* for actual values and a slider 227*b* for predicted values. These slides may be single or double-sided. The user may filter the images in accordance with one or both of the sliders. For instance, the set of images 228 may include only images that are within the actual value slider (227*a*). The images shown may then also be visually distinct in accordance with the color scheme/scale depicted for the predicted values slider (227*b*) and in accordance with the range selected by the user.

In a non-limiting example, the system may deploy a model to ingest the set of images 228 and determine the number of hours before the plane should be serviced. Therefore, the image 230 indicates a color that corresponds to almost 7000 hours before the plane should be serviced. In contrast, the image 232 has a color that corresponds to around 4000 hours before the plane should be serviced.

The images within the set of images 228 may be interactive. Therefore, when the user interacts with the image 234, the system displays the pop-up window 236 that displays the actual and predicted values. Because the depicted embodiment is associated with a regression problem solved by a supervised training method, the system may have access to actual and predicted values. For instance, the pop-up window 236 indicates that the actual number of hours needed for the plane depicted in the image 234 is 2200 hours. However, the system also indicates that the predicted number of hours was 4900, which may or may not be acceptable to the user based on their accuracy appetite.

If the system is displaying results of a multi-class technique, the system may arrange the images based on a color of the predicted class. In multiclass classification, each record belongs to one of three or more classes, and the model's goal is to construct a function which, given a new data point, will correctly identify the class into which the new data point falls. Referring now to FIG. 2D, the system may display the GUI 236 that includes input elements 238 and a set of images 240. The user may filter the set of images based on their actual value (e.g., actual class in a supervised training method) and the predicted value (e.g., predicted class).

As depicted, the set of images may be visually distinct, such that each predicted or actual class (or both) is visually identified. For instance, in the depicted embodiment, the user has filtered the set of images 240 by "all values," indicating that the user has instructed the system to display all the images ingested and analyzed by the model. The user has also filtered the predicted values by "all values," indicating that the user has instructed the system to display all the images in accordance with their predicted class. As a result, the system displays colored borders that represent a predicted class for each image. For instance, the images 250-254 belong to a first class, the images 242-248 belong to a second class, and images 256-260 belong to a third class.

As a result of creating a visual distinct set of images, the user can see (at a glance) a group or class of images that have similar (or the same) predicted values. In another embodiment, the user can view the types of images that have received similar treatment or deemed to be similar when analyzed by a model. Because the GUI 236 is dedicated to a multi-class model, it does not include a slider input element.

If the system is displaying results of a multi-label technique, the system may arrange the images and allow the user to filter based on actual and predicted values. Referring now to FIG. 2E, as depicted in GUI 262, the input element 264 allows the user to filter the set of images 266 using actual or predicted values. In accordance with the user's selection, the system may revise the set of images 266. For instance, the system may hide a particular set of images because of their predicted label or attributes.

For each GUI described herein, the system may also display an activation map input element. As used herein, an activation map may refer to a visual representation of activation numbers at various layers of the network as a given image progresses through as a result of various linear algebraic operations. In other words, the activation map may visually identify, for each part of each image, where the neural network is focusing to make a prediction regarding the image.

The system may display a grid of images or may overlay the activation map on top of various GUIs discussed herein. For instance, the system may display a toggle allowing the user to request the activation map as an additional layer of information. As a result, the system displays and the user can view how the model treats different images. For instance, the user can view how the model analyzes images of one cluster compared to another.

Having the activation map as an additional layer to the visual distinctiveness discussed herein, the system can display insights as to how and why a certain group of images was misclassified and/or treated differently. For instance, because images are segmented and separated by their attributes (whether predicted or actual) and/or visually distinct (e.g., colored borders), the user can easily identify which micro-segment of the images were misclassified or represented anomalies. For instance, using the methods and systems described herein, the user can determine that the images of Cessna planes were misclassified consistently when the image included clouds. As a result, the user may remove those images (and other similar images) accordingly. In another embodiment, the user may provide an additional training dataset that includes different Cessna planes images that include clouds. In this way, the user can augment the model's training.

In a non-limiting example, a model may analyze a set of images corresponding to different planes. As a result of viewing the activation map, the user can verify that for a subset of images, the model has focused on the wings of each plane and for another subset of planes, the model has focused on the nose of each plane. In another example, the user may determine that the model is incorrectly focusing on clouds in the background and that is why the model has incorrectly identified an image of a helicopter and not a plane. The user may then determine that for a different group of helicopter images, the model focused on the rotor and that is why the model accurately identified the images as helicopters.

The system may display the activation map as a separate feature or in addition to the filters depicted in FIGS. 2A-2D. For instance, the GUI 268 depicts an embodiment similar to the embodiment depicted in FIG. 2A (binary problem). However, the GUI 268 includes an activation map that visually highlights important areas within each image within the set of images 270.

Using the methods and systems discussed herein, the system can visualize data associated with a binary classification technique as well. As used herein, a binary classification refers to configurations where the goal of the model is to categorize data points (e.g., images) into one of two buckets: 0 or 1 (i.e., true or false). Different GUIs depicting binary classification visualization are presented in FIGS. 3A-3D.

Figure 3A:
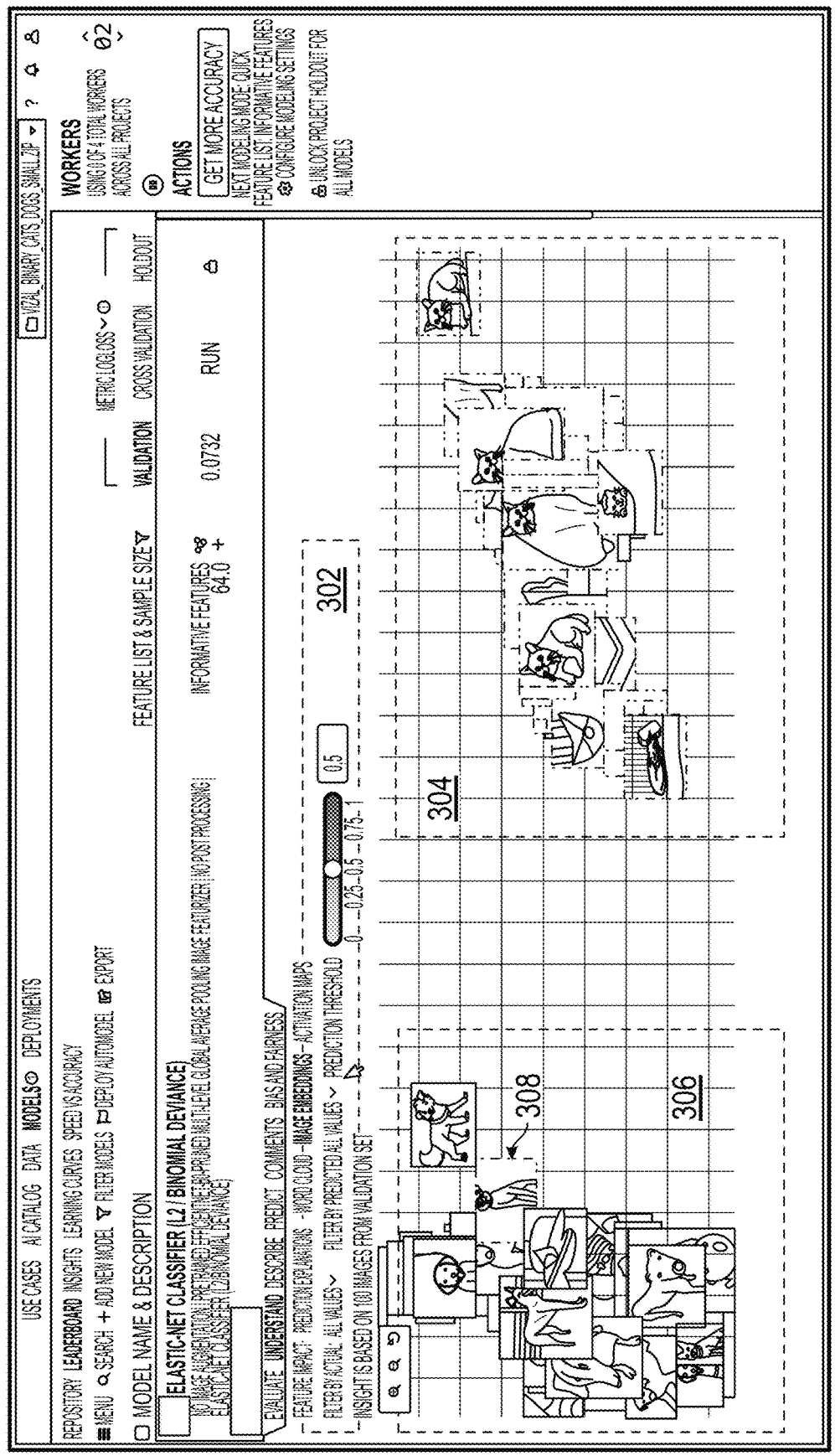
FIGS. 3A-3D illustrate different graphical user interfaces displayed within a model performance visualization system in accordance with various embodiments.

Referring now to FIG. 3A, the system may present the GUI 300 that includes the input elements 302. The input elements 302 may include input elements associated with actual values, predicted values, and prediction by threshold ranges. The user may use the input elements 302 to customize the set of images 304 and 306. As discussed herein, the set of images 304 and 306 may include colored borders where the color corresponds to the prediction threshold. For instance, as depicted, the set of images 304 depict cats and therefore, receive the same color borders. Moreover, the image 308 is an image of a cat, which has been correctly identified as a cat. Therefore, the image 308 receives a similar colored border as the images within the set of images 304.

Figure 3B:
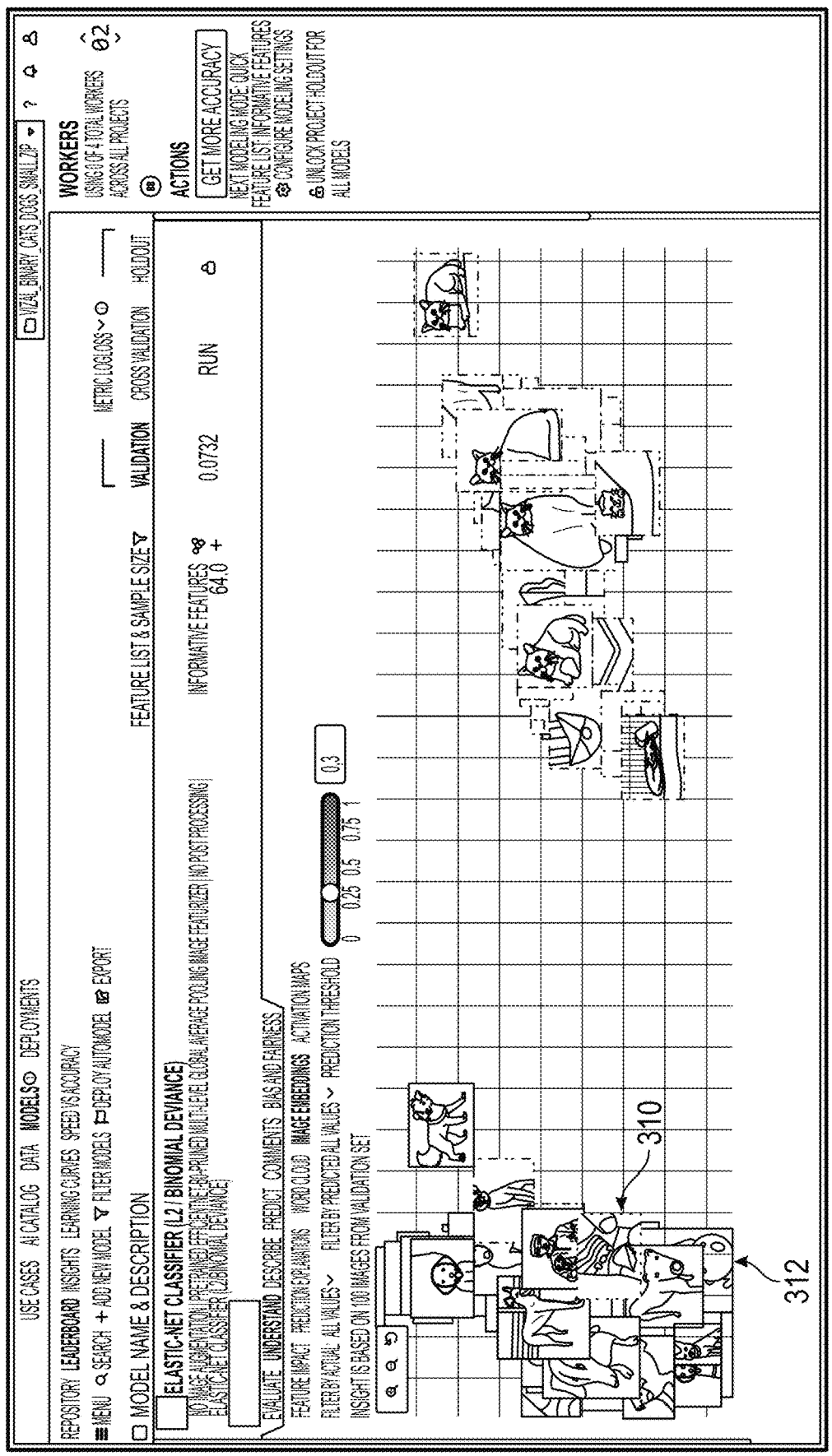

As depicted in FIG. 3B, the system can change the colored borders for different images in response to identifying that the user has interacted with the prediction threshold. For instance, the image 310 has been identified as a dog. However, the image prediction value for the image (e.g., the value representing the likelihood of the image 310 being a dog) is less than other images identified as dogs, such as the image 312.

The system may arrange and depict the set of images in accordance with their corresponding values. For instance, the set of images 304 and 306 are grouped together and certain images are shown as having less distance than other images. In some configurations, the distance may represent a value distance between images with regard to a certain attribute that is selected or revised by the user. For instance, the images' distance on X and Y axes may be customized, such that the system depicts all the brown dogs together, black dogs together, white cats together, and/or black cats together.

Figure 3C:
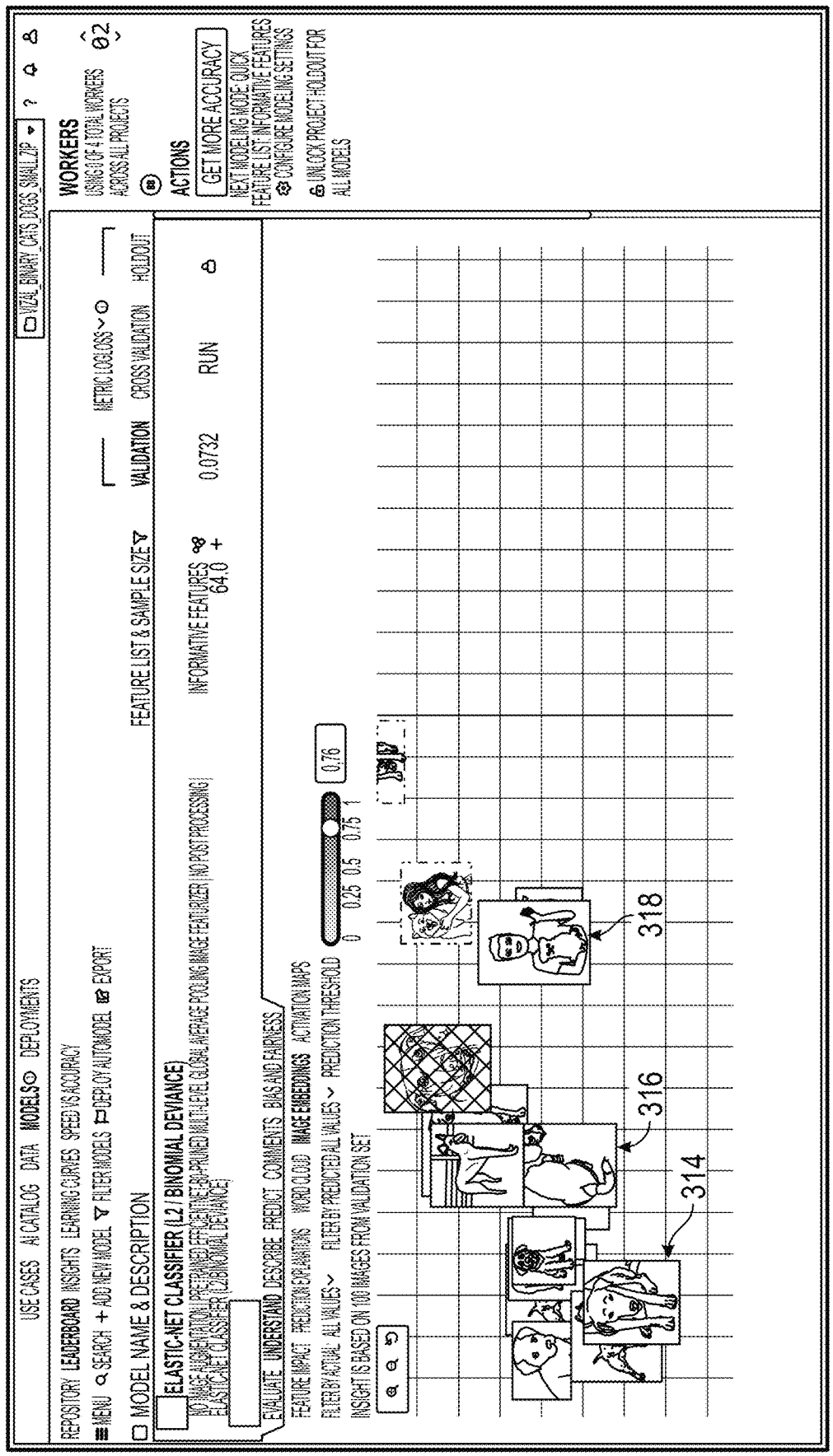

Moreover, as depicted in FIG. 3C, the GUI 300 may allow the user to zoom in and out of the set of images depicted. This allows the user to navigate through different images. For instance, as depicted in FIG. 3C, the user is navigating through the set of images 306. The system may allow the user to examine different images.

The system may revise the GUIs discussed herein, such that the images have a distance to each other that is proportionally consistent with the distance calculated by the model. For instance, when the set of images 306 are depicted in FIG. 3A, certain images seem closer to each other. However, when the user zooms in the set of images 306 (e.g., FIG. 3C), the images seem further apart. The system may revise the images, such that their respective distance corresponds to their new configurations. For instance, the images 314-318 are shown apart in accordance with their respective distance. This distance may appear less or more depending on the scale in which the images 314-318 are shown (e.g., when the user zooms in or out). However, the relative and proportional distance between the images 314-318 remains the same regardless of the scale. In other words, the scale in which the distances are shown may change, however, the actual distance between the images is calculated by the model and may not change.

Figure 3D:
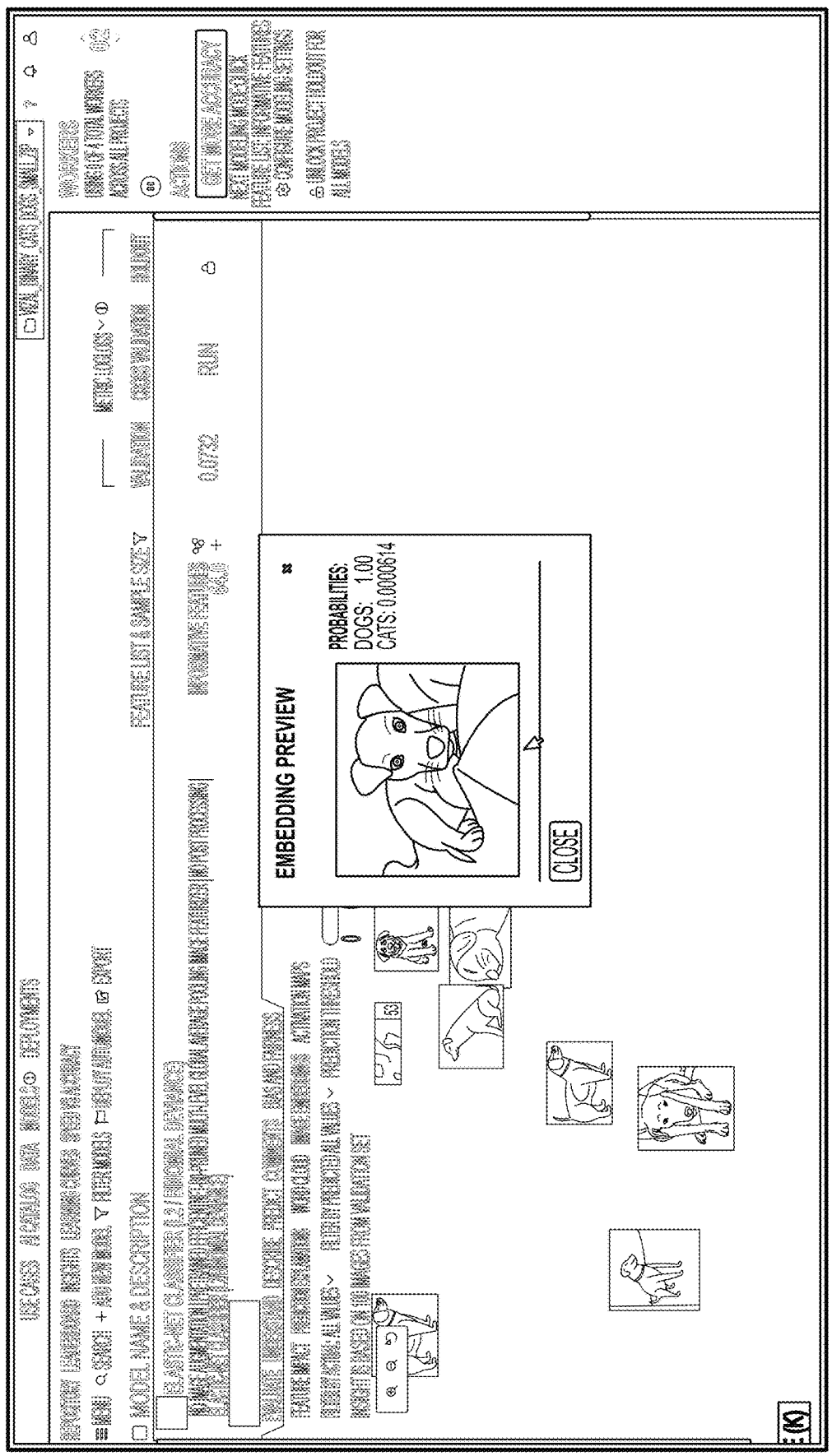

Each image depicted within the GUIs 3A-3C may be interactive and when the user interacts with an image, the system may display detailed values associated with the image, as depicted in FIG. 3D.

Figure 4A:
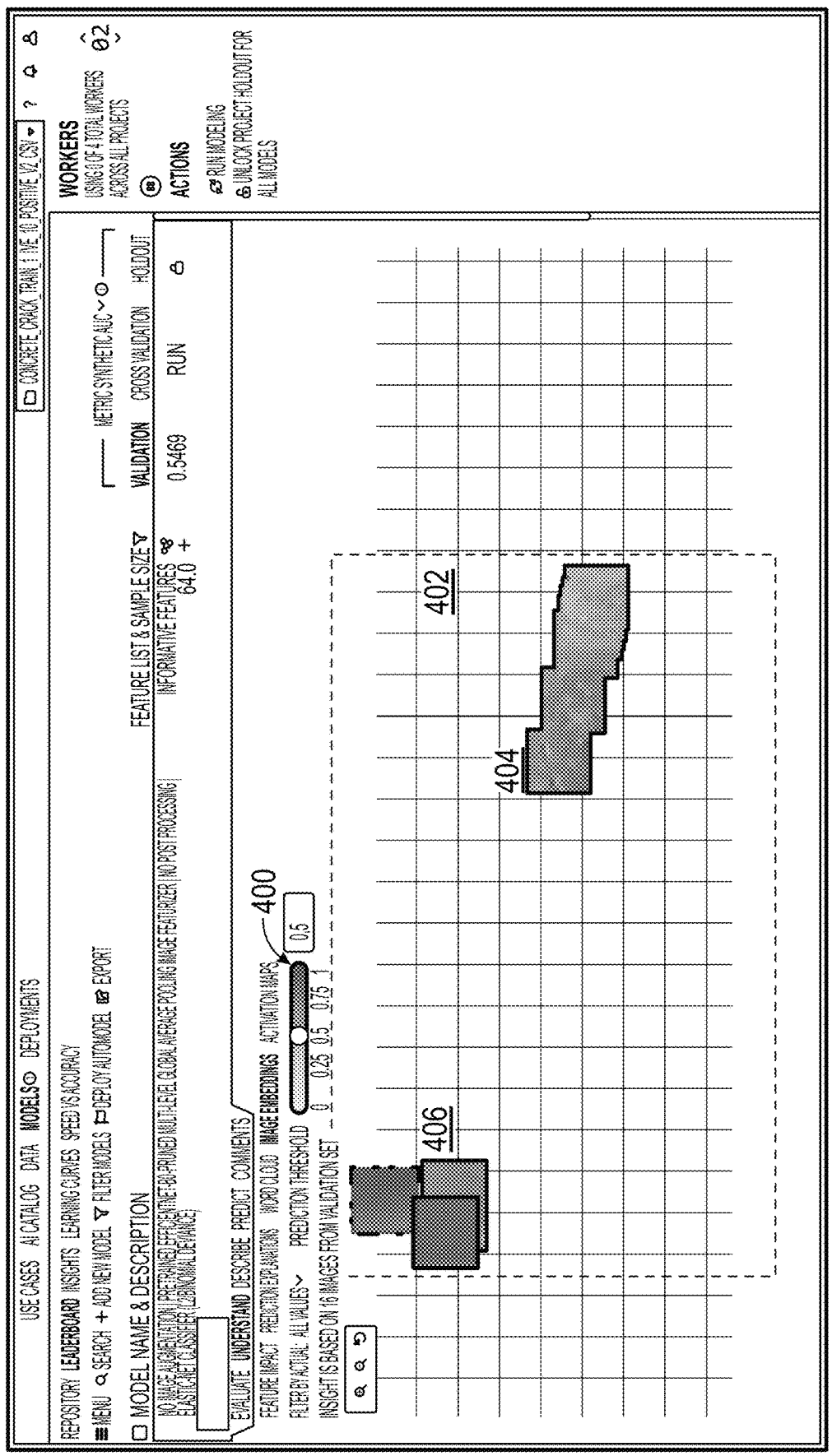
FIGS. 4A-4C illustrate different graphical user interfaces displayed within model performance visualization system in accordance with various embodiments.
Figure 4B:
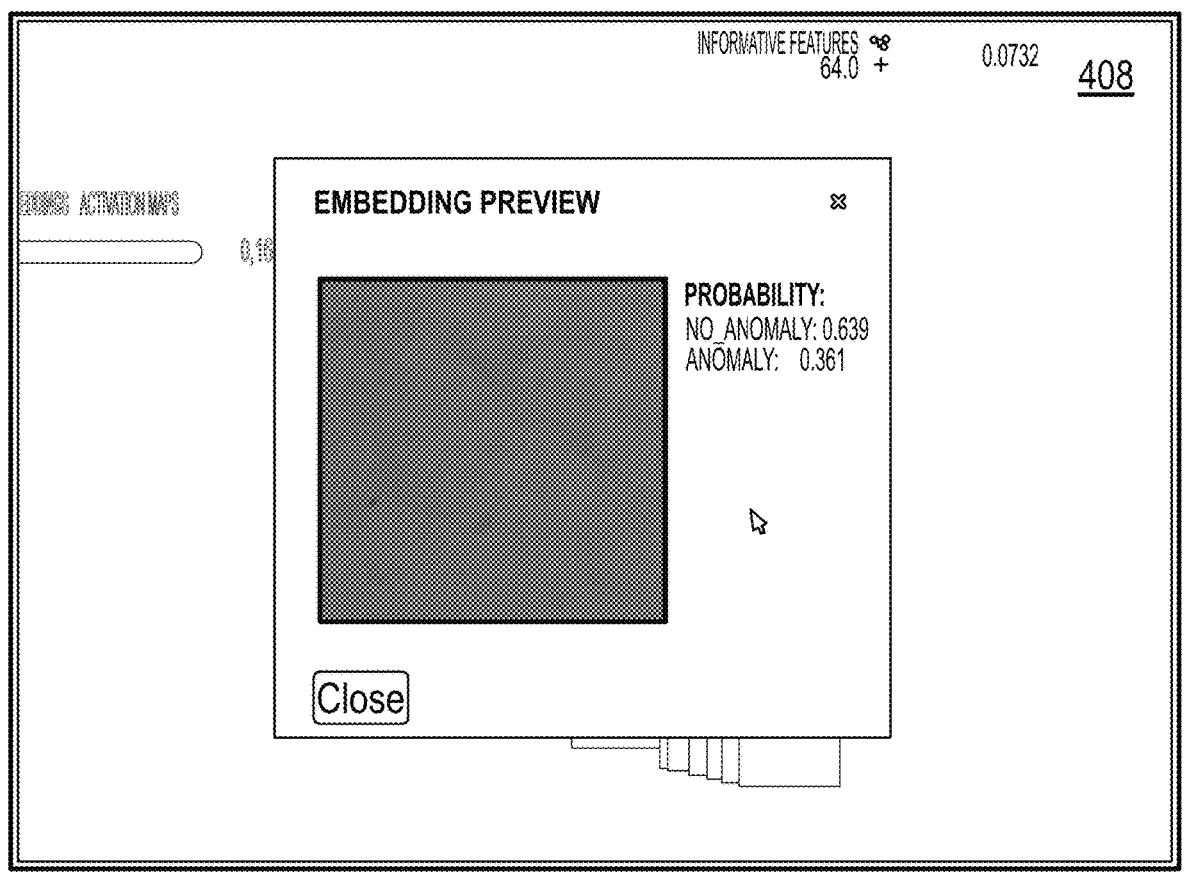
Figure 4C:
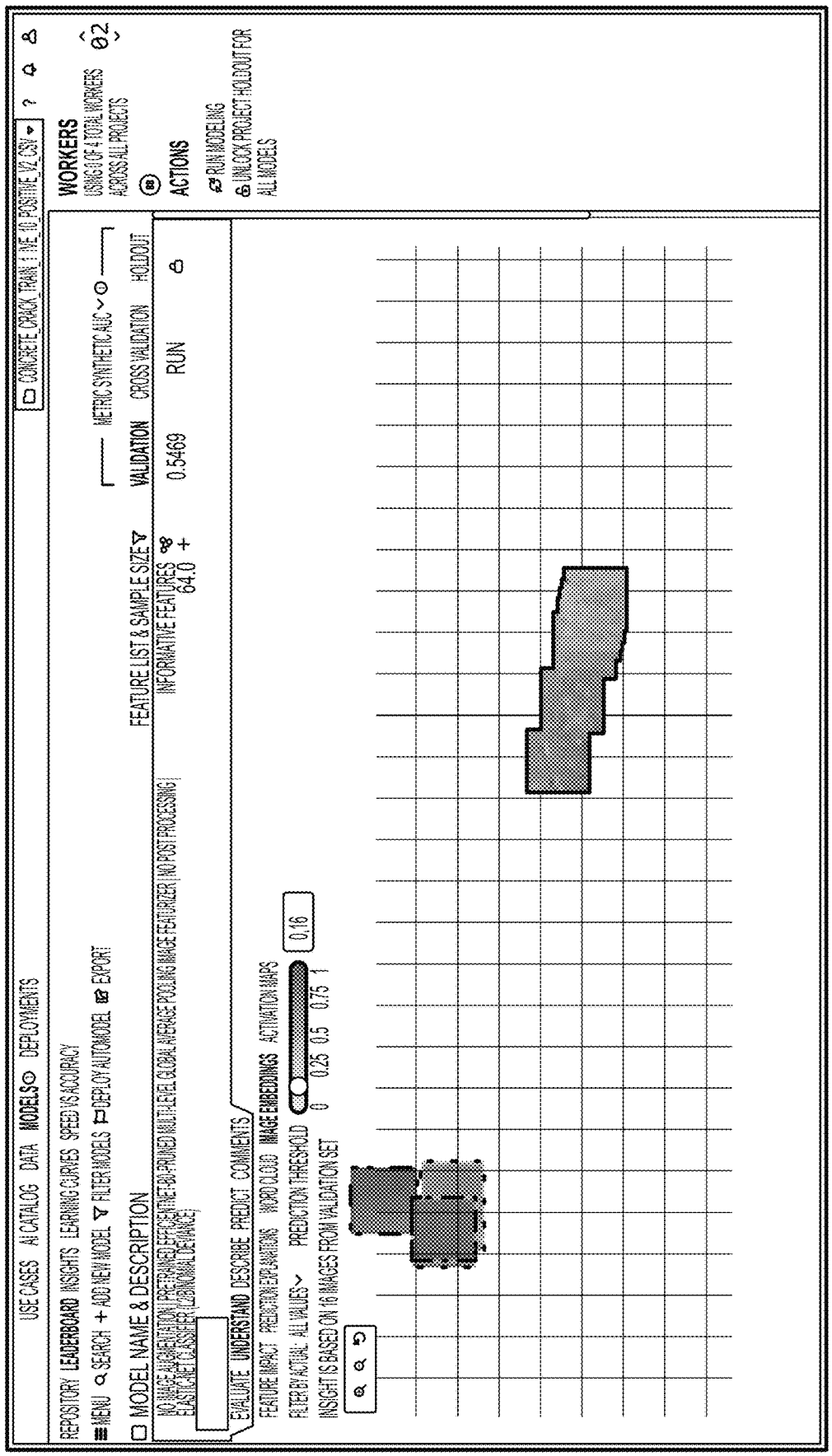

The system may also display anomalous data points in a visually distinct manner. As depicted in FIG. 4A, the system may display the slider 400 that receives an input threshold from the user. The threshold corresponds to a likelihood of an image being anomalous. Accordingly, the system displays the set of images 402 using colored borders around the images that satisfy the threshold. For instance, the image 404 does not have a border because the system does not identify the image 404 to have a likelihood of being anomalous that is more than 50% (threshold). When the user clicks on the image 404, the system directs the user to the page 408 in which the likelihood of the image 404 being an anomaly versus not being an anomaly is displayed. In contrast, the image 406 incudes a border that corresponds to the color scheme depicted in the slider 400. The system may revise the depicted GUI in response to the user interacting with the slider 400, as depicted in FIG. 4C.

The system may display various input elements allowing users to input their feedback. The system may use the feedback in active learning protocols. In an embodiment, the system may visually represent a cluster of images that have a predicted likelihood of accurate prediction that is lower than a threshold (e.g., the model is unsure of the results). As a result, the user may manually label the images using one or more input elements provided by the system. The system may then use the labeling to further retrain or recalibrate the model.

Additionally or alternatively, upon visually identifying characteristics of a group of images that have led to less-than-desired results from a model, the user may augment the training dataset accordingly. For instance, the user may determine that images of helicopters that include clouds are usually misidentified by a model. As a result, the user may augment the training dataset and increase the number of images depicting helicopters and clouds, such that the model can be re-calibrated accordingly.

The system may also allow the user to switch between models and visually represent model performances for different models. Specifically, the system may revise the set of images and re-arrange them in accordance with how a secondary model treats the same images. As a result, users can identify which model should be used. For instance, using the methods and systems described herein, a user may determine that a challenger model is less accurate overall and less accurate when analyzing images of planes. However, the challenger model may be more accurate with regard to analyzing images of helicopters (and particularly when analyzing images of helicopters that also include clouds). As a result, when the user desires a model to analyze helicopter images, the user may instruct the system to switch the model used by the system from the champion to the challenger. As a result, the system may deploy the challenger model.

Computing Environment

Figure 5A:
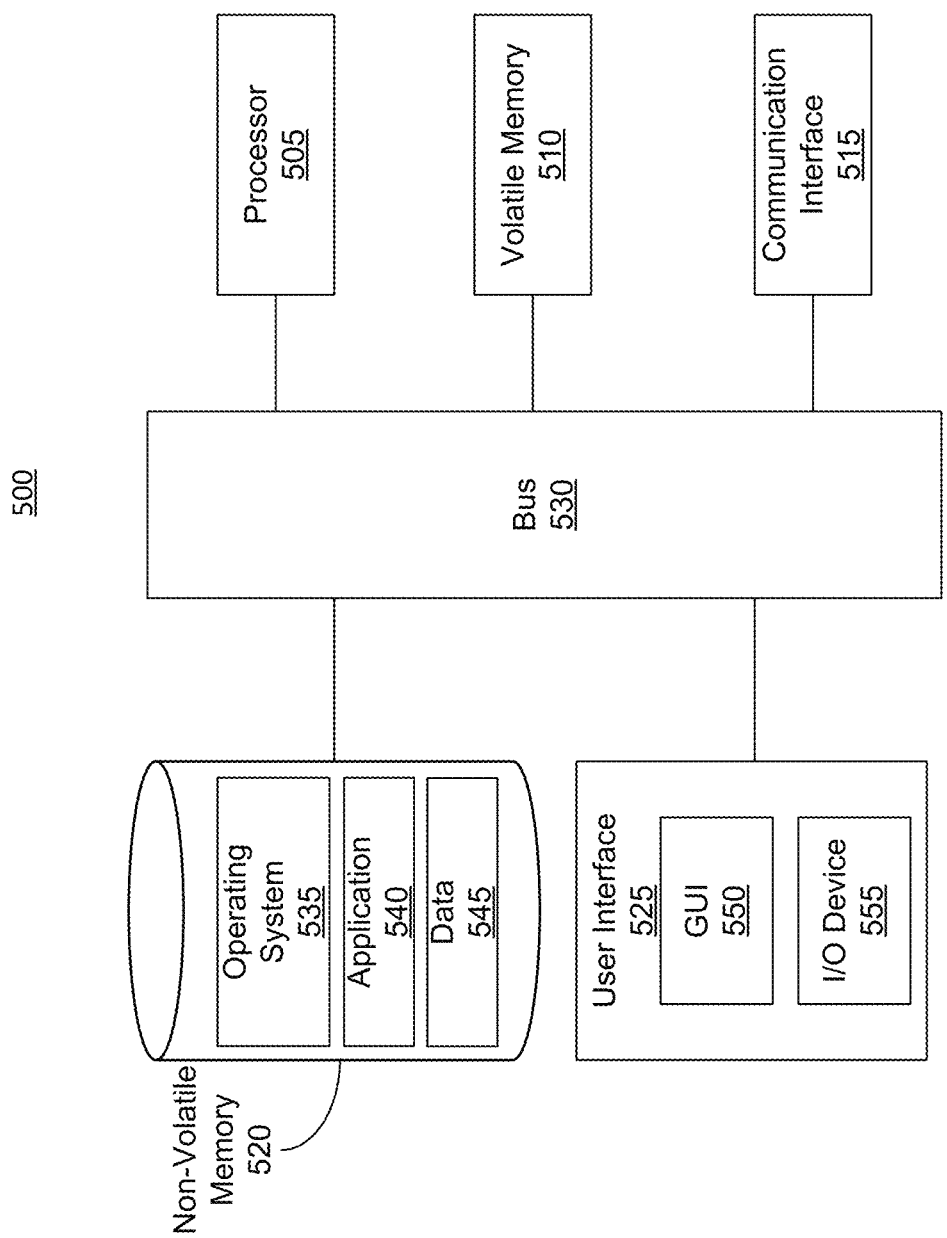
FIG. 5A illustrates a block diagram of embodiments of a computing device, in accordance with an embodiment.
Figure 5B:
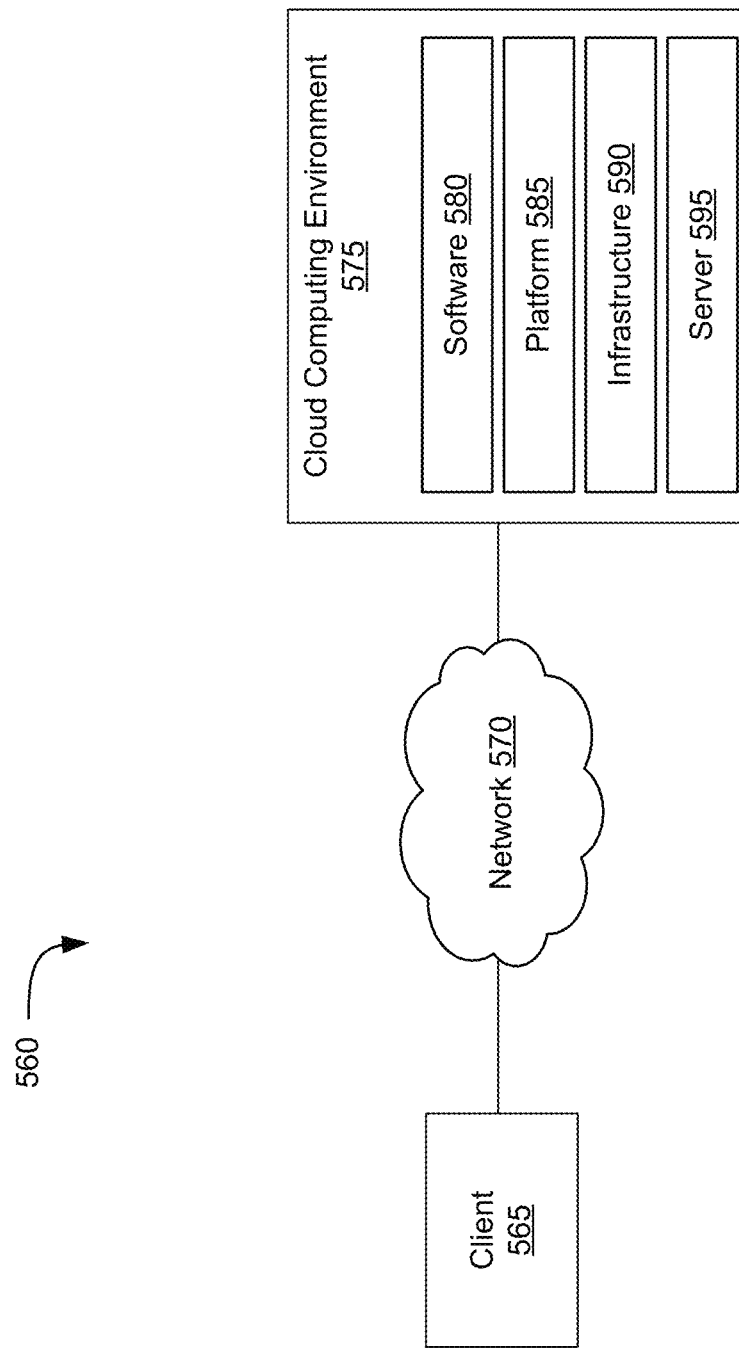
FIG. 5B illustrates a block diagram depicting a computing environment that includes a client device in communication with a cloud service provider, in accordance with an embodiment.

FIGS. 5A-5B depict example computing environments that form, perform, or otherwise provide or facilitate systems and methods of epidemiological modeling using machine learning. FIG. 5A illustrates an example computing device 500, which can include one or more processors 505, volatile memory 610 (e.g., random access memory (RAM)), non-volatile memory 520 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 525, one or more communications interfaces 515, and communication bus 530. User interface 525 may include graphical user interface (GUI) 550 (e.g., a touchscreen, a display, etc.) and one or more input/output (I/O) devices 555 (e.g., a mouse, a keyboard, a microphone, one or more speakers, one or more cameras, one or more biometric scanners, one or more environmental sensors, one or more accelerometers, etc.).

Non-volatile memory 520 can store the operating system 535, one or more applications 540, and data 545 such that, for example, computer instructions of operating system 535 and/or applications 540 are executed by processor(s) 505 out of volatile memory 510. In some embodiments, volatile memory 510 may include one or more types of RAM and/or a cache memory that may offer a faster response time than a main memory. Data may be entered using an input device of GUI 650 or received from I/O device(s) 555. Various elements of computing device 500 may communicate via one or more communication buses, shown as communication bus 530.

Clients, servers, and other components or devices on a network can be implemented by any computing or processing environment and with any type of machine or set of machines that may have suitable hardware and/or software capable of operating as described herein. Processor(s) 505 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 515 may include one or more interfaces to enable computing device 500 to access a computer network such as a Local Area Network (LAN), a Wide Area Network (WAN), a Personal Area Network (PAN), or the Internet through a variety of wired and/or wireless or cellular connections.

The computing device 500 may execute an application on behalf of a user of a client computing device. The computing device 500 can provide virtualization features, including, for example, hosting a virtual machine. The computing device 500 may also execute a terminal services session to provide a hosted desktop environment. The computing device 500 may provide access to a computing environment including one or more of: one or more applications, one or more desktop applications, and one or more desktop sessions in which one or more applications may execute.

FIG. 5B depicts an example computing environment 560. Computing environment 560 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 560 can provide the delivery of shared services (e.g., computer services) and shared resources (e.g., computer resources) to multiple users. For example, the computing environment 560 can include an environment or system for providing or delivering access to a plurality of shared services and resources to a plurality of users through the internet. The shared resources and services can include, but not limited to, networks, network bandwidth, servers 595, processing, memory, storage, applications, virtual machines, databases, software, hardware, analytics, and intelligence.

In embodiments, the computing environment 560 may provide clients 565 with one or more resources provided by a network environment. The computing environment 560 may include one or more clients 565, in communication with a cloud 575 over a network 570. The cloud 575 may include back end platforms, e.g., servers 595, storage, server farms or data centers. The clients 565 can include one or more component or functionality of computing device 500 depicted in FIG. 5A.

The users or clients 565 can correspond to a single organization or multiple organizations. For example, the computing environment 560 can include a private cloud serving a single organization (e.g., enterprise cloud). The computing environment 560 can include a community cloud or public cloud serving multiple organizations. In embodiments, the computing environment 560 can include a hybrid cloud that is a combination of a public cloud and a private cloud. For example, the cloud 575 may be public, private, or hybrid. Public clouds 575 may include public servers 595 that are maintained by third parties to the clients 565 or the owners of the clients 565. The servers 195 may be located off-site in remote geographical locations as disclosed above or otherwise. Public clouds 575 may be connected to the servers 195 over a public network 570. Private clouds 575 may include private servers 195 that are physically maintained by clients 565 or owners of clients 565. Private clouds 575 may be connected to the servers 195 over a private network 570. Hybrid clouds 575 may include both the private and public networks 670 and servers 195.

The cloud 575 may include back end platforms, e.g., servers 195, storage, server farms or data centers. For example, the cloud 575 can include or correspond to a server 195 or system remote from one or more clients 565 to provide third party control over a pool of shared services and resources. The computing environment 560 can provide resource pooling to serve multiple users via clients 565 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users.

In some embodiments, the computing environment 560 can include and provide different types of cloud computing services. For example, the computing environment 560 can include Infrastructure as a service (IaaS). The computing environment 560 can include Platform as a service (PaaS). The computing environment 560 can include server-less computing. The computing environment 560 can include Software as a service (SaaS). For example, the cloud 575 may also include a cloud based delivery, e.g. Software as a Service (SaaS) 580, Platform as a Service (PaaS) 585, and Infrastructure as a Service (IaaS) 590. IaaS may refer to a user renting the use of infrastructure resources that are used during a specified time period. IaaS providers may offer storage, networking, servers or virtualization resources from large pools, allowing the users to quickly scale up by accessing more resources as appropriate. PaaS providers may offer functionality provided by IaaS, including, e.g., storage, networking, servers or virtualization, as well as additional resources such as, e.g., the operating system, middleware, or runtime resources. SaaS providers may offer the resources that PaaS provides, including storage, networking, servers, virtualization, operating system, middleware, or runtime resources. In some embodiments, SaaS providers may offer additional resources including, e.g., data and application resources.

Clients 565 may access IaaS resources with one or more IaaS standards. Some IaaS standards may allow clients access to resources over HTTP, and may use Representational State Transfer (REST) protocol or Simple Object Access Protocol (SOAP). Clients 565 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 565 may access SaaS resources through the use of web-based user interfaces, provided by a web browser. Clients 565 may also access SaaS resources through smartphone or tablet applications. Clients 565 may also access SaaS resources through the client operating system.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Predictive Modeling System

Prior to discussing embodiments of epidemiologic modeling using machine learning, an overview of a predictive modeling system is provided. A predictive modeling system for use Data analysts can use analytic techniques and computational infrastructures to build predictive models from electronic data, including operations and evaluation data. Data analysts generally use one of two approaches to build predictive models. With the first approach, an organization dealing with a prediction problem simply uses a packaged predictive modeling solution already developed for the same prediction problem or a similar prediction problem. This "cookie cutter" approach, though inexpensive, is generally viable only for a small number of prediction problems (e.g., fraud detection, churn management, marketing response, etc.) that are common to a relatively large number of organizations. With the second approach, a team of data analysts builds a customized predictive modeling solution for a prediction problem. This "artisanal" approach is generally expensive and time-consuming, and therefore tends to be used for a small number of high-value prediction problems.

The space of potential predictive modeling solutions for a prediction problem is generally large and complex. Statistical learning techniques are influenced by many academic traditions (e.g., mathematics, statistics, physics, engineering, economics, sociology, biology, medicine, artificial intelligence, data mining, etc.) and by applications in many areas of commerce (e.g., finance, insurance, retail, manufacturing, healthcare, etc.). Consequently, there are many different predictive modeling algorithms, which may have many variants and/or tuning parameters, as well as different pre-processing and post-processing steps with their own variants and/or parameters. The volume of potential predictive modeling solutions (e.g., combinations of pre-processing steps, modeling algorithms, and post-processing steps) is already quite large and is increasing rapidly as researchers develop new techniques.

Given this vast space of predictive modeling techniques, some approaches, such as the artisanal approach, to generating predictive models tend to be time-consuming and to leave large portions of the modeling search space unexplored. Analysts tend to explore the modeling space in an ad hoc fashion, based on their intuition or previous experience and on extensive trial-and-error testing. They may not pursue some potentially useful avenues of exploration or adjust their searches properly in response to the results of their initial efforts. Furthermore, the scope of the trial-and-error testing tends to be limited by constraints on the analysts' time, such that the artisanal approach generally explores only a small portion of the modeling search space.

The artisanal approach can also be very expensive. Developing a predictive model via the artisanal approach often entails a substantial investment in computing resources and in well-paid data analysts. In view of these substantial costs, organizations often forego the artisanal approach in favor of the cookie cutter approach, which can be less expensive, but tends to explore only a small portion of this vast predictive modeling space (e.g., a portion of the modeling space that is expected, a priori, to contain acceptable solutions to a specified prediction problem). The cookie cutter approach can generate predictive models that perform poorly relative to unexplored options.

Thus, systems and methods of this technical solution can systematically and cost-effectively evaluate the space of potential predictive modeling techniques for prediction problems. This technical solution can utilize statistical learning techniques to systematically and cost-effectively evaluate the space of potential predictive modeling solutions for prediction problems.

Figure 6:
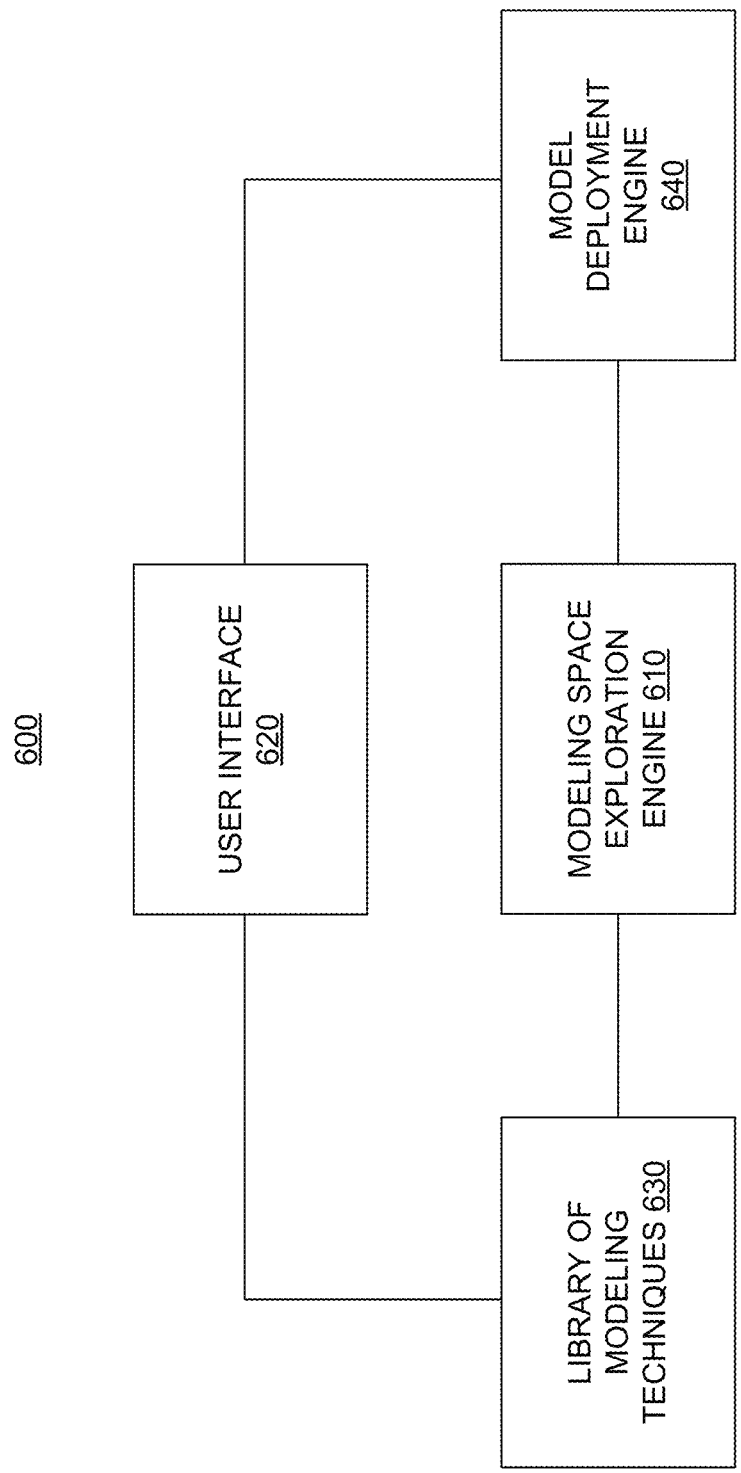
FIG. 6 illustrates a block diagram of a predictive modeling system, in accordance with some embodiments, in accordance with an embodiment.

Referring to FIG. 6, in some embodiments a predictive modeling system 600 includes a predictive modeling exploration engine 610, a user interface 620, a library 630 of predictive modeling techniques, and a predictive model deployment engine 240. The system 600 and its components can include one or more component or functionality depicted in FIGS. 5A-5B. The exploration engine 610 may implement a search technique (or "modeling methodology") for efficiently exploring the predictive modeling search space (e.g., potential combinations of pre-processing steps, modeling algorithms, and post-processing steps) to generate a predictive modeling solution suitable for a specified prediction problem. The search technique may include an initial evaluation of which predictive modeling techniques are likely to provide suitable solutions for the prediction problem. In some embodiments, the search technique includes an incremental evaluation of the search space (e.g., using increasing fractions of a dataset), and a consistent comparison of the suitability of different modeling solutions for the prediction problem (e.g., using consistent metrics). In some embodiments, the search technique adapts based on results of prior searches, which can improve the effectiveness of the search technique over time.

The exploration engine 610 may use the library 630 of modeling techniques to evaluate potential modeling solutions in the search space. In some embodiments, the modeling technique library 630 includes machine-executable templates encoding complete modeling techniques. A machine-executable template may include one or more predictive modeling algorithms. In some embodiments, the modeling algorithms included in a template may be related in some way. For example, the modeling algorithms may be variants of the same modeling algorithm or members of a family of modeling algorithms. In some embodiments, a machine-executable template further includes one or more pre-processing and/or post-processing steps suitable for use with the template's algorithm(s). The algorithm(s), pre-processing steps, and/or post-processing steps may be parameterized. A machine-executable template may be applied to a user dataset to generate potential predictive modeling solutions for the prediction problem represented by the dataset.

The exploration engine 610 may uses the computational resources of a distributed computing system to explore the search space or portions thereof. In some embodiments, the exploration engine 610 generates a search plan for efficiently executing the search using the resources of the distributed computing system, and the distributed computing system executes the search in accordance with the search plan. The distributed computing system may provide interfaces that facilitate the evaluation of predictive modeling solutions in accordance with the search plan, including, without limitation, interfaces for queuing and monitoring of predictive modeling techniques, for virtualization of the computing system's resources, for accessing databases, for partitioning the search plan and allocating the computing system's resources to evaluation of modeling techniques, for collecting and organizing execution results, for accepting user input, etc.

The user interface 620 provides tools for monitoring and/or guiding the search of the predictive modeling space. These tools may provide insight into a prediction problem's dataset (e.g., by highlighting problematic variables in the dataset, identifying relationships between variables in the dataset, etc.), and/or insight into the results of the search. In some embodiments, data analysts may use the interface to guide the search, e.g., by specifying the metrics to be used to evaluate and compare modeling solutions, by specifying the criteria for recognizing a suitable modeling solution, etc. Thus, the user interface may be used by analysts to improve their own productivity, and/or to improve the performance of the exploration engine 610. In some embodiments, user interface 620 presents the results of the search in real-time, and permits users to guide the search (e.g., to adjust the scope of the search or the allocation of resources among the evaluations of different modeling solutions) in real-time. In some embodiments, user interface 620 provides tools for coordinating the efforts of multiple data analysts working on the same prediction problem and/or related prediction problems.

In some embodiments, the user interface 620 provides tools for developing machine-executable templates for the library 630 of modeling techniques. System users may use these tools to modify existing templates, to create new templates, or to remove templates from the library 630. In this way, system users may update the library 630 to reflect advances in predictive modeling research, and/or to include proprietary predictive modeling techniques.

The model deployment engine 640 provides tools for deploying predictive models in operational environments (e.g., predictive models generated by exploration engine 610). In some embodiments, the model deployment engine also provides tools for monitoring and/or updating predictive models. System users may use the deployment engine 640 to deploy predictive models generated by exploration engine 610, to monitor the performance of such predictive models, and to update such models (e.g., based on new data or advancements in predictive modeling techniques). In some embodiments, exploration engine 610 may use data collected and/or generated by deployment engine 640 (e.g., based on results of monitoring the performance of deployed predictive models) to guide the exploration of a search space for a prediction problem (e.g., to re-fit or tune a predictive model in response to changes in the underlying dataset for the prediction problem).

The system can include a library of modeling techniques. Library 630 of predictive modeling techniques includes machine-executable templates encoding complete predictive modeling techniques. In some embodiments, a machine-executable template includes one or more predictive modeling algorithms, zero or more pre-processing steps suitable for use with the algorithm(s), and zero or more post-processing steps suitable for use with the algorithm(s). The algorithm(s), pre-processing steps, and/or post-processing steps may be parameterized. A machine-executable template may be applied to a dataset to generate potential predictive modeling solutions for the prediction problem represented by the dataset.

A template may encode, for machine execution, pre-processing steps, model-fitting steps, and/or post-processing steps suitable for use with the template's predictive modeling algorithm(s). Examples of pre-processing steps include, without limitation, imputing missing values, feature engineering (e.g., one-hot encoding, splines, text mining, etc.), feature selection (e.g., dropping uninformative features, dropping highly correlated features, replacing original features by top principal components, etc.). Examples of model-fitting steps include, without limitation, algorithm selection, parameter estimation, hyper-parameter tuning, scoring, diagnostics, etc. Examples of post-processing steps include, without limitation, calibration of predictions, censoring, blending, etc.

In some embodiments, a machine-executable template includes metadata describing attributes of the predictive modeling technique encoded by the template. The metadata may indicate one or more data processing techniques that the template can perform as part of a predictive modeling solution (e.g., in a pre-processing step, in a post-processing step, or in a step of predictive modeling algorithm). These data processing techniques may include, without limitation, text mining, feature normalization, dimension reduction, or other suitable data processing techniques. Alternatively or in addition, the metadata may indicate one or more data processing constraints imposed by the predictive modeling technique encoded by the template, including, without limitation, constraints on dimensionality of the dataset, characteristics of the prediction problem's target(s), and/or characteristics of the prediction problem's feature(s).

In some embodiments, a template's metadata includes information relevant to estimating how well the corresponding modeling technique will work for a given dataset. For example, a template's metadata may indicate how well the corresponding modeling technique is expected to perform on datasets having particular characteristics, including, without limitation, wide datasets, tall datasets, sparse datasets, dense datasets, datasets that do or do not include text, datasets that include variables of various data types (e.g., numerical, ordinal, categorical, interpreted (e.g., date, time, text), etc.), datasets that include variables with various statistical properties (e.g., statistical properties relating to the variable's missing values, cardinality, distribution, etc.), etc. As another example, a template's metadata may indicate how well the corresponding modeling technique is expected to perform for a prediction problem involving target variables of a particular type. In some embodiments, a template's metadata indicates the corresponding modeling technique's expected performance in terms of one or more performance metrics (e.g., objective functions).

In some embodiments, a template's metadata includes characterizations of the processing steps implemented by the corresponding modeling technique, including, without limitation, the processing steps' allowed data type(s), structure, and/or dimensionality.)

In some embodiments, a template's metadata includes data indicative of the results (actual or expected) of applying the predictive modeling technique represented by the template to one or more prediction problems and/or datasets. The results of applying a predictive modeling technique to a prediction problem or dataset may include, without limitation, the accuracy with which predictive models generated by the predictive modeling technique predict the target(s) of the prediction problem or dataset, the rank of accuracy of the predictive models generated by the predictive modeling technique (relative to other predictive modeling techniques) for the prediction problem or dataset, a score representing the utility of using the predictive modeling technique to generate a predictive model for the prediction problem or dataset (e.g., the value produced by the predictive model for an objective function), etc.

The data indicative of the results of applying a predictive modeling technique to a prediction problem or dataset may be provided by exploration engine 610 (e.g., based on the results of previous attempts to use the predictive modeling technique for the prediction problem or the dataset), provided by a user (e.g., based on the user's expertise), and/or obtained from any other suitable source. In some embodiments, exploration engine 610 updates such data based, at least in part, on the relationship between actual outcomes of instances of a prediction problem and the outcomes predicted by a predictive model generated via the predictive modeling technique.

In some embodiments, a template's metadata describes characteristics of the corresponding modeling technique relevant to estimating how efficiently the modeling technique will execute on a distributed computing infrastructure. For example, a template's metadata may indicate the processing resources used to train and/or test the modeling technique on a dataset of a given size, the effect on resource consumption of the number of cross-validation folds and the number of points searched in the hyper-parameter space, the intrinsic parallelization of the processing steps performed by the modeling technique, etc.

In some embodiments, the library 630 of modeling techniques includes tools for assessing the similarities (or differences) between predictive modeling techniques. Such tools may express the similarity between two predictive modeling techniques as a score (e.g., on a predetermined scale), a classification (e.g., "highly similar", "somewhat similar", "somewhat dissimilar", "highly dissimilar"), a binary determination (e.g., "similar" or "not similar"), etc. Such tools may determine the similarity between two predictive modeling techniques based on the processing steps that are common to the modeling techniques, based on the data indicative of the results of applying the two predictive modeling techniques to the same or similar prediction problems, etc. For example, given two predictive modeling techniques that have a large number (or high percentage) of their processing steps in common and/or yield similar results when applied to similar prediction problems, the tools may assign the modeling techniques a high similarity score or classify the modeling techniques as "highly similar".

In some embodiments, the modeling techniques may be assigned to families of modeling techniques. The familial classifications of the modeling techniques may be assigned by a user (e.g., based on intuition and experience), assigned by a machine-learning classifier (e.g., based on processing steps common to the modeling techniques, data indicative of the results of applying different modeling techniques to the same or similar problems, etc.), or obtained from another suitable source. The tools for assessing the similarities between predictive modeling techniques may rely on the familial classifications to assess the similarity between two modeling techniques. In some embodiments, the tool may treat all modeling techniques in the same family as "similar" and treat any modeling techniques in different families as "not similar". In some embodiments, the familial classifications of the modeling techniques may be just one factor in the tool's assessment of the similarity between modeling techniques.

Figure 7:
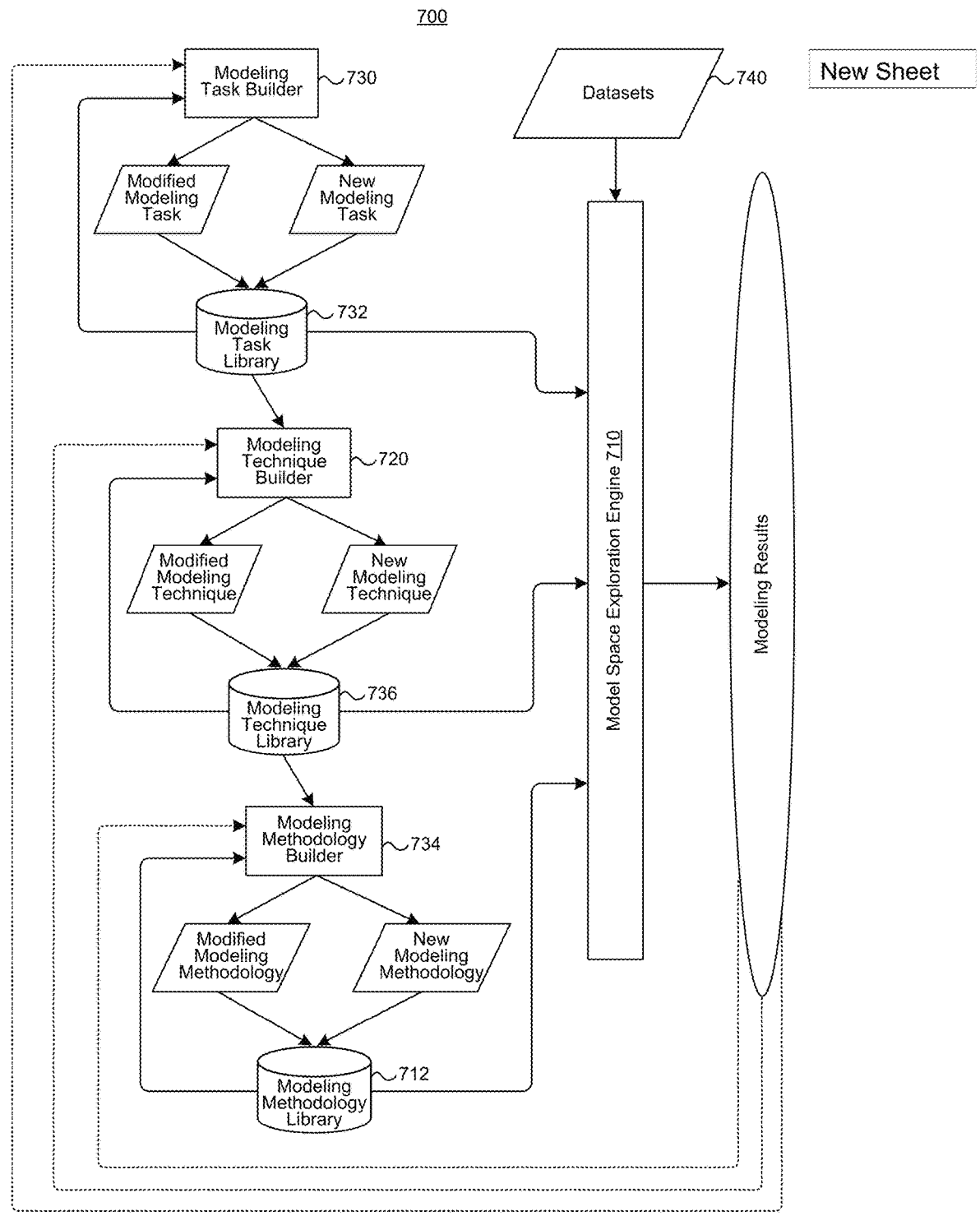
FIG. 7 illustrates a block diagram of a modeling tool for building machine-executable templates encoding predictive modeling tasks, techniques, and methodologies, in accordance with some embodiments, in accordance with an embodiment.

In some embodiments, predictive modeling system 700 includes a library of prediction problems (not shown in FIG. 7). The library of prediction problems may include data indicative of the characteristics of prediction problems. In some embodiments, the data indicative of the characteristics of prediction problems includes data indicative of characteristics of datasets representing the prediction problem. Characteristics of a dataset may include, without limitation, the dataset's width, height, sparseness, or density; the number of targets and/or features in the dataset, the data types of the data set's variables (e.g., numerical, ordinal, categorical, or interpreted (e.g., date, time, text, etc.); the ranges of the dataset's numerical variables; the number of classes for the dataset's ordinal and categorical variables; etc.

In some embodiments, characteristics of a dataset include statistical properties of the dataset's variables, including, without limitation, the number of total observations; the number of unique values for each variable across observations; the number of missing values of each variable across observations; the presence and extent of outliers and inliers; the properties of the distribution of each variable's values or class membership; cardinality of the variables; etc. In some embodiments, characteristics of a dataset include relationships (e.g., statistical relationships) between the dataset's variables, including, without limitation, the joint distributions of groups of variables; the variable importance of one or more features to one or more targets (e.g., the extent of correlation between feature and target variables); the statistical relationships between two or more features (e.g., the extent of multicollinearity between two features); etc.

In some embodiments, the data indicative of the characteristics of the prediction problems includes data indicative of the subject matter of the prediction problem (e.g., finance, insurance, defense, e-commerce, retail, internet-based advertising, internet-based recommendation engines, etc.); the provenance of the variables (e.g., whether each variable was acquired directly from automated instrumentation, from human recording of automated instrumentation, from human measurement, from written human response, from verbal human response, etc.); the existence and performance of known predictive modeling solutions for the prediction problem; etc.

In some embodiments, predictive modeling tool 700 may support time-series prediction problems (e.g., uni-dimensional or multi-dimensional time-series prediction problems). For time-series prediction problems, the objective is generally to predict future values of the targets as a function of prior observations of all features, including the targets themselves. The data indicative of the characteristics of a prediction problem may accommodate time-series prediction problems by indicating whether the prediction problem is a time-series prediction problem, and by identifying the time measurement variable in datasets corresponding to time-series prediction problems.

In some embodiments, the library of prediction problems includes tools for assessing the similarities (or differences) between prediction problems. Such tools may express the similarity between two prediction problems as a score (e.g., on a predetermined scale), a classification (e.g., "highly similar", "somewhat similar", "somewhat dissimilar", "highly dissimilar"), a binary determination (e.g., "similar" or "not similar"), etc. Such tools may determine the similarity between two prediction problems based on the data indicative of the characteristics of the prediction problems, based on data indicative of the results of applying the same or similar predictive modeling techniques to the prediction problems, etc. For example, given two prediction problems represented by datasets that have a large number (or high percentage) of characteristics in common and/or are susceptible to the same or similar predictive modeling techniques, the tools may assign the prediction problems a high similarity score or classify the prediction problems as "highly similar".

FIG. 7 illustrates a block diagram of a modeling tool 700 suitable for building machine-executable templates encoding predictive modeling techniques and for integrating such templates into predictive modeling methodologies, in accordance with some embodiments. User interface 620 may provide an interface to modeling tool 700.

In the example of FIG. 7, a modeling methodology builder 710 builds a library 712 of modeling methodologies on top of a library 630 of modeling techniques. A modeling technique builder 720 builds the library 630 of modeling techniques on top of a library 732 of modeling tasks. A modeling methodology may correspond to one or more analysts' intuition about and experience of what modeling techniques work well in which circumstances, and/or may leverage results of the application of modeling techniques to previous prediction problems to guide exploration of the modeling search space for a prediction problem. A modeling technique may correspond to a step-by-step recipe for applying a specific modeling algorithm. A modeling task may correspond to a processing step within a modeling technique.

In some embodiments, a modeling technique may include a hierarchy of tasks. For example, a top-level "text mining" task may include sub-tasks for (a) creating a document-term matrix and (b) ranking terms and dropping terms that may be unimportant or that are not to be weighted or considered as highly. In turn, the "term ranking and dropping" sub-task may include sub-tasks for (b.1) building a ranking model and (b.2) using term ranks to drop columns from a document-term matrix. Such hierarchies may have arbitrary depth.

In the example of FIG. 7, modeling tool 700 includes a modeling task builder 730, a modeling technique builder 720, and a modeling methodology builder 710. Each builder may include a tool or set of tools for encoding one of the modeling elements in a machine-executable format. Each builder may permit users to modify an existing modeling element or create a new modeling element. To construct a complete library of modeling elements across the modeling layers illustrated in FIG. 7, developers may employ a top-down, bottom-up, inside-out, outside-in, or combination strategy. However, from the perspective of logical dependency, leaf-level tasks are the smallest modeling elements, so FIG. 7 depicts task creation as the first step in the process of constructing machine-executable templates.

Each builder's user interface may be implemented using, without limitation, a collection of specialized routines in a standard programming language, a formal grammar designed specifically for the purpose of encoding that builder's elements, a rich user interface for abstractly specifying the desired execution flow, etc. However, the logical structure of the operations allowed at each layer is independent of any particular interface.

When creating modeling tasks at the leaf level in the hierarchy, modeling tool 700 may permit developers to incorporate software components from other sources. This capability leverages the installed base of software related to statistical learning and the accumulated knowledge of how to develop such software. This installed base covers scientific programming languages, scientific routines written in general purpose programming languages (e.g., C), scientific computing extensions to general-purpose programming languages (e.g., scikit-learn for Python), commercial statistical environments (e.g., SAS/STAT), and open source statistical environments (e.g., R). When used to incorporate the capabilities of such a software component, the modeling task builder 730 may use a specification of the software component's inputs and outputs, and/or a characterization of what types of operations the software component can perform. In some embodiments, the modeling task builder 730 generates this metadata by inspecting a software component's source code signature, retrieving the software components' interface definition from a repository, probing the software component with a sequence of requests, or performing some other form of automated evaluation. In some embodiments, the developer manually supplies some or all of this metadata.

In some embodiments, the modeling task builder 730 uses this metadata to create a "wrapper" that allows it to execute the incorporated software. The modeling task builder 730 may implement such wrappers utilizing any mechanism for integrating software components, including, without limitation, compiling a component's source code into an internal executable, linking a component's object code into an internal executable, accessing a component through an emulator of the computing environment expected by the component's standalone executable, accessing a component's functions running as part of a software service on a local machine, accessing a components functions running as part of a software service on a remote machine, accessing a component's function through an intermediary software service running on a local or remote machine, etc. No matter which incorporation mechanism the modeling task builder 730 uses, after the wrapper has been generated, modeling tool 700 may make software calls to the component as it would any other routine.

In some embodiments, developers may use the modeling task builder 730 to assemble leaf-level modeling tasks recursively into higher-level tasks. As indicated previously, there are many different ways to implement the user interface for specifying the arrangement of the task hierarchy. But from a logical perspective, a task that is not at the leaf-level may include a directed graph of sub-tasks. At each of the top and intermediate levels of this hierarchy, there may be one starting sub-task whose input is from the parent task in the hierarchy (or the parent modeling technique at the top level of the hierarchy). There may also be one ending sub-task whose output is to the parent task in the hierarchy (or the parent modeling technique at the top level of the hierarchy). Every other sub-task at a given level may receive inputs from one or more previous sub-tasks and sends outputs to one or more subsequent sub-tasks.

Combined with the ability to incorporate arbitrary code in leaf-level tasks, propagating data according to the directed graph facilitates implementation of arbitrary control flows within an intermediate-level task. In some embodiments, modeling tool 700 may provide additional built-in operations. For example, while it would be straightforward to implement any particular conditional logic as a leaf-level task coded in an external programming language, the modeling task builder 730 may provide a built-in node or arc that performs conditional evaluations in a general fashion, directing some or all of the data from a node to different subsequent nodes based on the results of these evaluations. Similar alternatives exist for filtering the output from one node according to a rule or expression before propagating it as input to subsequent nodes, transforming the output from one node before propagating it as input to subsequent nodes, partitioning the output from one node according to a rule or expression before propagating each partition to a respective subsequent node, combining the output of multiple previous nodes according to a rule or formula before accepting it as input, iteratively applying a sub-graph of nodes' operations using one or more loop variables, etc.

In some embodiments, developers may use the modeling technique builder 720 to assemble tasks from the modeling task library 732 into modeling techniques. At least some of the modeling tasks in modeling task library 732 may correspond to the pre-processing steps, model-fitting steps, and/or post-processing steps of one or more modeling techniques. The development of tasks and techniques may follow a linear pattern, in which techniques are assembled after the task library 732 is populated, or a more dynamic, circular pattern, in which tasks and techniques are assembled concurrently. A developer may be inspired to combine existing tasks into a new technique, realize that this technique uses new tasks, and iteratively refine until the new technique is complete. Alternatively, a developer may start with the conception of a new technique, perhaps from an academic publication, begin building it from new tasks, but pull existing tasks from the modeling task library 732 when they provide suitable functionality. In all cases, the results from applying a modeling technique to reference datasets or in field tests will allow the developer or analyst to evaluate the performance of the technique. This evaluation may, in turn, result in changes anywhere in the hierarchy from leaf-level modeling task to modeling technique. By providing common modeling task and modeling technique libraries (732, 736) as well as high productivity builder interfaces (710, 720, and 730), modeling tool 700 may enable developers to make changes rapidly and accurately, as well as propagate such enhancements to other developers and users with access to the libraries (732, 734).

A modeling technique may provide a focal point for developers and analysts to conceptualize an entire predictive modeling procedure, with all the steps expected based on the best practices in the field. In some embodiments, modeling techniques encapsulate best practices from statistical learning disciplines. Moreover, the modeling tool 700 can provide guidance in the development of high-quality techniques by, for example, providing a checklist of steps for the developer to consider and comparing the task graphs for new techniques to those of existing techniques to, for example, detect missing tasks, detect additional steps, and/or detect anomalous flows among steps.

In some embodiments, exploration engine 610 is used to build a predictive model for a dataset 740 using the techniques in the modeling technique library 630. The exploration engine 610 may prioritize the evaluation of the modeling techniques in modeling technique library 630 based on a prioritization scheme encoded by a modeling methodology selected from the modeling methodology library 712. Examples of suitable prioritization schemes for exploration of the modeling space are described in the next section. In the example of FIG. 7, results of the exploration of the modeling space may be used to update the metadata associated with modeling tasks and techniques.

In some embodiments, unique identifiers (IDs) may be assigned to the modeling elements (e.g., techniques, tasks, and sub-tasks). The ID of a modeling element may be stored as metadata associated with the modeling element's template. In some embodiments, these modeling element IDs may be used to efficiently execute modeling techniques that share one or more modeling tasks or sub-tasks. Methods of efficiently executing modeling techniques are described in further detail below.

In the example of FIG. 7, the modeling results produced by exploration engine 610 are fed back to the modeling task builder 730, the modeling technique builder 720, and the modeling methodology builder 734. The modeling builders may be adapted automatically (e.g., using a statistical learning algorithm) or manually (e.g., by a user) based on the modeling results. For example, modeling methodology builder 734 may be adapted based on patterns observed in the modeling results and/or based on a data analyst's experience. Similarly, results from executing specific modeling techniques may inform automatic or manual adjustment of default tuning parameter values for those techniques or tasks within them. In some embodiments, the adaptation of the modeling builders may be semi-automated. For example, predictive modeling system 600 may flag potential improvements to methodologies, techniques, and/or tasks, and a user may decide whether to implement those potential improvements.

Figure 8:
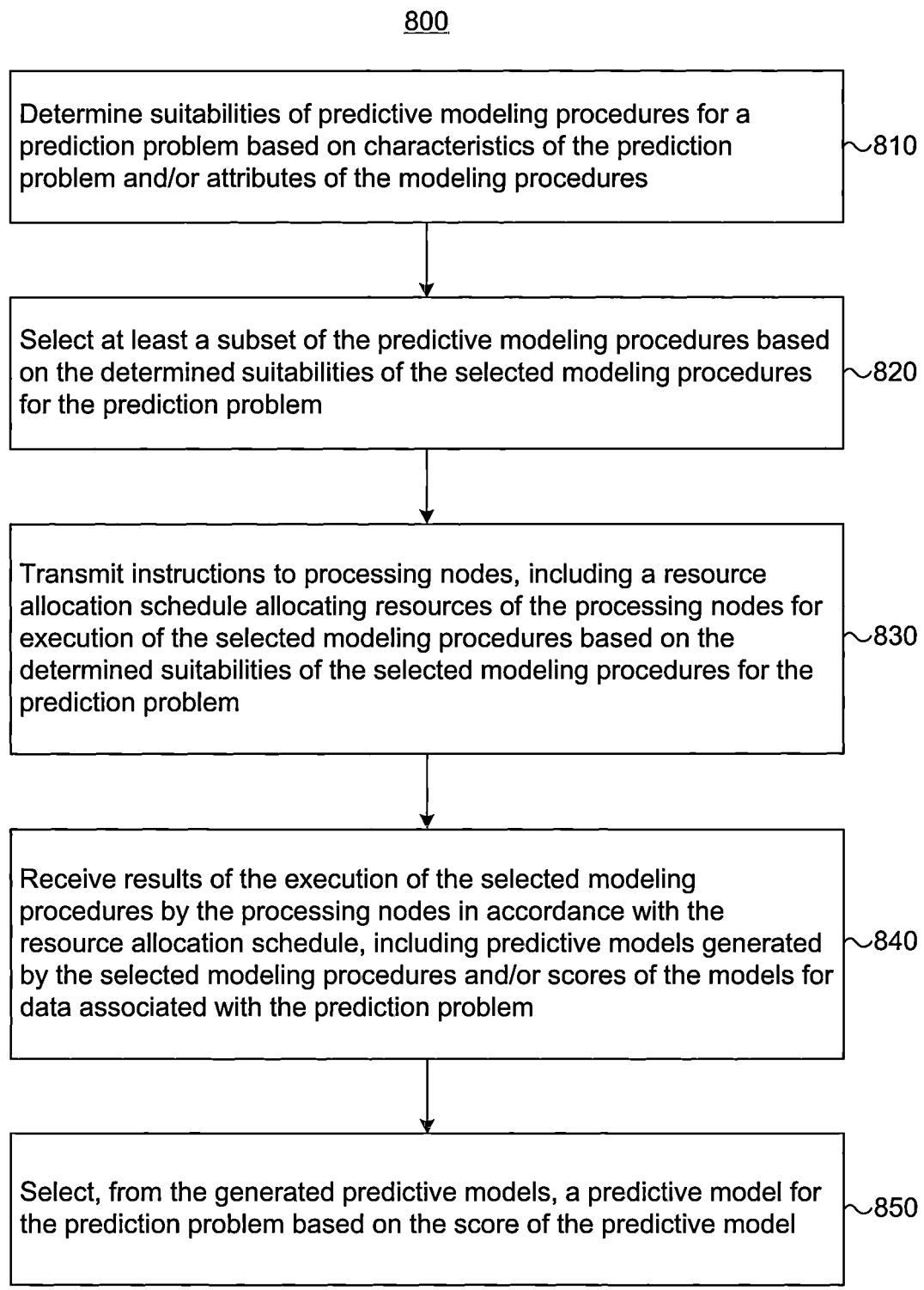
FIG. 8 illustrates a flowchart of a method for selecting a predictive model for a prediction problem, in accordance with some embodiments, in accordance with an embodiment.

The technical solution can include or utilize a modeling space exploration engine. FIG. 8 is a flowchart of a method 800 for selecting a predictive model for a prediction problem, in accordance with some embodiments. In some embodiments, method 800 may correspond to a modeling methodology in the modeling methodology library 712.

At step 810 of method 800, the suitability of a plurality of predictive modeling procedures (e.g., predictive modeling techniques) for a prediction problem are determined. A predictive modeling procedure's suitability for a prediction problem may be determined based on characteristics of the prediction problem, based on attributes of the modeling procedures, and/or based on other suitable information.

The "suitability" of a predictive modeling procedure for a prediction problem may include data indicative of the expected performance on the prediction problem of predictive models generated using the predictive modeling procedure. In some embodiments, a predictive model's expected performance on a prediction problem includes one or more expected scores (e.g., expected values of one or more objective functions) and/or one or more expected ranks (e.g., relative to other predictive models generated using other predictive modeling techniques).

Alternatively or in addition, the "suitability" of a predictive modeling procedure for a prediction problem may include data indicative of the extent to which the modeling procedure is expected to generate predictive models that provide adequate performance for a prediction problem. In some embodiments, a predictive modeling procedure's "suitability" data includes a classification of the modeling procedure's suitability. The classification scheme may have two classes (e.g., "suitable" or "not suitable") or more than two classes (e.g., "highly suitable", "moderately suitable", "moderately unsuitable", "highly unsuitable").

In some embodiments, exploration engine 610 determines the suitability of a predictive modeling procedure for a prediction problem based, at least in part, on one or more characteristics of the prediction problem, including (but not limited to) characteristics described herein. As just one example, the suitability of a predictive modeling procedure for a prediction problem may be determined based on characteristics of the dataset corresponding to the prediction problem, characteristics of the variables in the dataset corresponding to the prediction problem, relationships between the variables in the dataset, and/or the subject matter of the prediction problem. Exploration engine 610 may include tools (e.g., statistical analysis tools) for analyzing datasets associated with prediction problems to determine the characteristics of the prediction problems, the datasets, the dataset variables, etc.

In some embodiments, exploration engine 610 determines the suitability of a predictive modeling procedure for a prediction problem based, at least in part, on one or more attributes of the predictive modeling procedure, including (but not limited to) the attributes of predictive modeling procedures described herein. As just one example, the suitability of a predictive modeling procedure for a prediction problem may be determined based on the data processing techniques performed by the predictive modeling procedure and/or the data processing constraints imposed by the predictive modeling procedure.

In some embodiments, determining the suitability of the predictive modeling procedures for the prediction problem comprises eliminating at least one predictive modeling procedure from consideration for the prediction problem. The decision to eliminate a predictive modeling procedure from consideration may be referred to herein as "pruning" the eliminated modeling procedure and/or "pruning the search space". In some embodiments, the user can override the exploration engine's decision to prune a modeling procedure, such that the previously pruned modeling procedure remains eligible for further execution and/or evaluation during the exploration of the search space.

A predictive modeling procedure may be eliminated from consideration based on the results of applying one or more deductive rules to the attributes of the predictive modeling procedure and the characteristics of the prediction problem. The deductive rules may include, without limitation, the following: (1) if the prediction problem includes a categorical target variable, select only classification techniques for execution; (2) if numeric features of the dataset span vastly different magnitude ranges, select or prioritize techniques that provide normalization; (3) if a dataset has text features, select or prioritize techniques that provide text mining; (4) if the dataset has more features than observations, eliminate some or all techniques that use the number of observations to be greater than or equal to the number of features; (5) if the width of the dataset exceeds a threshold width, select or prioritize techniques that provide dimension reduction; (6) if the dataset is large and sparse (e.g., the size of the dataset exceeds a threshold size and the sparseness of the dataset exceeds a threshold sparseness), select or prioritize techniques that execute efficiently on sparse data structures; and/or any rule for selecting, prioritizing, or eliminating a modeling technique wherein the rule can be expressed in the form of an if-then statement. In some embodiments, deductive rules are chained so that the execution of several rules in sequence produces a conclusion. In some embodiments, the deductive rules may be updated, refined, or improved based on historical performance.

In some embodiments, exploration engine 610 determines the suitability of a predictive modeling procedure for a prediction problem based on the performance (expected or actual) of similar predictive modeling procedures on similar prediction problems. (As a special case, exploration engine 610 may determine the suitability of a predictive modeling procedure for a prediction problem based on the performance (expected or actual) of the same predictive modeling procedure on similar prediction problems.)

As described above, the library of modeling techniques 630 may include tools for assessing the similarities between predictive modeling techniques, and the library of prediction problems may include tools for assessing the similarities between prediction problems. Exploration engine 610 may use these tools to identify predictive modeling procedures and prediction problems similar to the predictive modeling procedure and prediction problem at issue. For purposes of determining the suitability of a predictive modeling procedure for a prediction problem, exploration engine 610 may select the M modeling procedures most similar to the modeling procedure at issue, select all modeling procedures exceeding a threshold similarity value with respect to the modeling procedure at issue, etc. Likewise, for purposes of determining the suitability of a predictive modeling procedure for a prediction problem, exploration engine 610 may select the N prediction problems most similar to the prediction problem at issue, select all prediction problems exceeding a threshold similarity value with respect to the prediction problem at issue, etc.

Given a set of predictive modeling procedures and a set of prediction problems similar to the modeling procedure and prediction problem at issue, exploration engine may combine the performances of the similar modeling procedures on the similar prediction problems to determine the expected suitability of the modeling procedure at issue for the prediction problem at issue. As described above, the templates of modeling procedures may include information relevant to estimating how well the corresponding modeling procedure will perform for a given dataset. Exploration engine 610 may use the model performance metadata to determine the performance values (expected or actual) of the similar modeling procedures on the similar prediction problems. These performance values can then be combined to generate an estimate of the suitability of the modeling procedure at issue for the prediction problem at issue. For example, exploration engine 610 may calculate the suitability of the modeling procedure at issue as a weighted sum of the performance values of the similar modeling procedures on the similar prediction problems.

In some embodiments, exploration engine 610 determines the suitability of a predictive modeling procedure for a prediction problem based, at least in part, on the output of a "meta" machine-learning model, which may be trained to determine the suitability of a modeling procedure for a prediction problem based on the results of various modeling procedures (e.g., modeling procedures similar to the modeling procedure at issue) for other prediction problems (e.g., prediction problems similar to the prediction problem at issue). The machine-learning model for estimating the suitability of a predictive modeling procedure for a prediction problem may be referred to as a "meta" machine-learning model because it applies machine learning recursively to predict which techniques are most likely to succeed for the prediction problem at issue. Exploration engine 610 may therefore produce meta-predictions of the suitability of a modeling technique for a prediction problem by using a meta-machine-learning algorithm trained on the results from solving other prediction problems.

In some embodiments, exploration engine 610 may determine the suitability of a predictive modeling procedure for a prediction problem based, at least in part, on user input (e.g., user input representing the intuition or experience of data analysts regarding the predictive modeling procedure's suitability).

Returning to FIG. 8, at step 820 of method 800, at least a subset of the predictive modeling procedures may be selected based on the suitability of the modeling procedures for the prediction problem. In embodiments where the modeling procedures have been assigned to suitability categories (e.g., "suitable" or "not suitable"; "highly suitable", "moderately suitable", "moderately unsuitable", or "highly unsuitable"; etc.), selecting a subset of the modeling procedures may comprise selecting the modeling procedures assigned to one or more suitability categories (e.g., all modeling procedures assigned to the "suitable category"; all modeling procedures not assigned to the "highly unsuitable" category; etc.).

In embodiments where the modeling procedures have been assigned suitability values, exploration engine 610 may select a subset of the modeling procedures based on the suitability values. In some embodiments, exploration engine 610 selects the modeling procedures with suitability scores above a threshold suitability score. The threshold suitability score may be provided by a user or determined by exploration engine 610. In some embodiments, exploration engine 610 may adjust the threshold suitability score to increase or decrease the number of modeling procedures selected for execution, depending on the amount of processing resources available for execution of the modeling procedures.

In some embodiments, exploration engine 610 selects the modeling procedures with suitability scores within a specified range of the highest suitability score assigned to any of the modeling procedures for the prediction problem at issue. The range may be absolute (e.g., scores within S points of the highest score) or relative (e.g., scores within P % of the highest score). The range may be provided by a user or determined by exploration engine 610. In some embodiments, exploration engine 610 may adjust the range to increase or decrease the number of modeling procedures selected for execution, depending on the amount of processing resources available for execution of the modeling procedures.

In some embodiments, exploration engine 610 selects a fraction of the modeling procedures having the highest suitability scores for the prediction problem at issue. Equivalently, the exploration engine 610 may select the fraction of the modeling procedures having the highest suitability ranks (e.g., in cases where the suitability scores for the modeling procedures are not available, but the ordering (ranking) of the modeling procedures' suitability is available). The fraction may be provided by a user or determined by exploration engine 610. In some embodiments, exploration engine 610 may adjust the fraction to increase or decrease the number of modeling procedures selected for execution, depending on the amount of processing resources available for execution of the modeling procedures.

In some embodiments, a user may select one or more modeling procedures to be executed. The user-selected procedures may be executed in addition to or in lieu of one or more modeling procedures selected by exploration engine 610. Allowing the users to select modeling procedures for execution may improve the performance of predictive modeling system 600, particularly in scenarios where a data analyst's intuition and experience indicate that the modeling system 600 has not accurately estimated a modeling procedure's suitability for a prediction problem.

In some embodiments, exploration engine 610 may control the granularity of the search space evaluation by selecting a modeling procedure P0 that is representative of (e.g., similar to) one or more other modeling procedures P1 . . . PN, rather than selecting modeling procedures P0 . . . PN, even if modeling procedures P0 . . . PN are all determined to be suitable for the prediction problem at issue. In addition, exploration engine 610 may treat the results of executing the selected modeling procedure P0 as being representative of the results of executing the modeling procedures P1 . . . PN. This coarse-grained approach to evaluating the search space may conserve processing resources, particularly if applied during the earlier stages of the evaluation of the search space. If exploration engine 610 later determines that modeling procedure P0 is among the most suitable modeling procedures for the prediction problem, a fine-grained evaluation of the relevant portion of the search space can then be performed by executing and evaluating the similar modeling procedures P1 . . . PN.

Returning to FIG. 8, at step 830 of method 800, a resource allocation schedule may be generated. The resource allocation schedule may allocate processing resources for the execution of the selected modeling procedures. In some embodiments, the resource allocation schedule allocates the processing resources to the modeling procedures based on the determined suitability of the modeling procedures for the prediction problem at issue. In some embodiments, exploration engine 610 transmits the resource allocation schedule to one or more processing nodes with instructions for executing the selected modeling procedures according to the resource allocation schedule.

The allocated processing resources may include temporal resources (e.g., execution cycles of one or more processing nodes, execution time on one or more processing nodes, etc.), physical resources (e.g., a number of processing nodes, an amount of machine-readable storage (e.g., memory and/or secondary storage), etc.), and/or other allocable processing resources. In some embodiments, the allocated processing resources may be processing resources of a distributed computing system and/or a cloud-based computing system. In some embodiments, costs may be incurred when processing resources are allocated and/or used (e.g., fees may be collected by an operator of a data center in exchange for using the data center's resources).

As indicated above, the resource allocation schedule may allocate processing resources to modeling procedures based on the suitability of the modeling procedures for the prediction problem at issue. For example, the resource allocation schedule may allocate more processing resources to modeling procedures with higher predicted suitability for the prediction problem, and allocate fewer processing resources to modeling procedures with lower predicted suitability for the prediction problem, so that the more promising modeling procedures benefit from a greater share of the limited processing resources. As another example, the resource allocation schedule may allocate processing resources sufficient for processing larger datasets to modeling procedures with higher predicted suitability, and allocate processing resources sufficient for processing smaller datasets to modeling procedures with lower predicted suitability.

As another example, the resource allocation schedule may schedule execution of the modeling procedures with higher predicted suitability prior to execution of the modeling procedures with lower predicted suitability, which may also have the effect of allocating more processing resources to the more promising modeling procedures. In some embodiments, the results of executing the modeling procedures may be presented to the user via user interface 620 as the results become available. In such embodiments, scheduling the modeling procedures with higher predicted suitability to execute before the modeling procedures with lower predicted suitability may provide the user with additional information about the evaluation of the search space at an earlier phase of the evaluation, thereby facilitating rapid user-driven adjustments to the search plan. For example, based on the preliminary results, the user may determine that one or more modeling procedures that were expected to perform very well are actually performing very poorly. The user may investigate the cause of the poor performance and determine, for example, that the poor performance is caused by an error in the preparation of the dataset. The user can then fix the error and restart execution of the modeling procedures that were affected by the error.

In some embodiments, the resource allocation schedule may allocate processing resources to modeling procedures based, at least in part, on the resource utilization characteristics and/or parallelism characteristics of the modeling procedures. As described above, the template corresponding to a modeling procedure may include metadata relevant to estimating how efficiently the modeling procedure will execute on a distributed computing infrastructure. In some embodiments, this metadata includes an indication of the modeling procedure's resource utilization characteristics (e.g., the processing resources used to train and/or test the modeling procedure on a dataset of a given size). In some embodiments, this metadata includes an indication of the modeling procedure's parallelism characteristics (e.g., the extent to which the modeling procedure can be executed in parallel on multiple processing nodes). Using the resource utilization characteristics and/or parallelism characteristics of the modeling procedures to determine the resource allocation schedule may facilitate efficient allocation of processing resources to the modeling procedures.

In some embodiments, the resource allocation schedule may allocate a specified amount of processing resources for the execution of the modeling procedures. The allocable amount of processing resources may be specified in a processing resource budget, which may be provided by a user or obtained from another suitable source. The processing resource budget may impose limits on the processing resources to be used for executing the modeling procedures (e.g., the amount of time to be used, the number of processing nodes to be used, the cost incurred for using a data center or cloud-based processing resources, etc.). In some embodiments, the processing resource budget may impose limits on the total processing resources to be used for the process of generating a predictive model for a specified prediction problem.

Returning to FIG. 8, at step 840 of method 800, the results of executing the selected modeling procedures in accordance with the resource allocation schedule may be received. These results may include one or more predictive models generated by the executed modeling procedures. In some embodiments, the predictive models received at step 840 are fitted to dataset(s) associated with the prediction problem, because the execution of the modeling procedures may include fitting of the predictive models to one or more datasets associated with the prediction problem. Fitting the predictive models to the prediction problem's dataset(s) may include tuning one or more hyper-parameters of the predictive modeling procedure that generates the predictive model, tuning one or more parameters of the generated predictive model, and/or other suitable model-fitting steps.

In some embodiments, the results received at step 840 include evaluations (e.g., scores) of the models' performances on the prediction problem. These evaluations may be obtained by testing the predictive models on test dataset(s) associated with the prediction problem. In some embodiments, testing a predictive model includes cross-validating the model using different folds of training datasets associated with the prediction problem. In some embodiments, the execution of the modeling procedures includes the testing of the generated models. In some embodiments, the testing of the generated models is performed separately from the execution of the modeling procedures.

The models may be tested in accordance with suitable testing techniques and scored according to a suitable scoring metric (e.g., an objective function). Different scoring metrics may place different weights on different aspects of a predictive model's performance, including, without limitation, the model's accuracy (e.g., the rate at which the model correctly predicts the outcome of the prediction problem), false positive rate (e.g., the rate at which the model incorrectly predicts a "positive" outcome), false negative rate (e.g., the rate at which the model incorrectly predicts a "negative" outcome), positive prediction value, negative prediction value, sensitivity, specificity, etc. The user may select a standard scoring metric (e.g., goodness-of-fit, R-square, etc.) from a set of options presented via user interface 620, or specific a custom scoring metric (e.g., a custom objective function) via user interface 620. Exploration engine 610 may use the user-selected or user-specified scoring metric to score the performance of the predictive models.

Returning to FIG. 8, at step 850 of method 800, a predictive model may be selected for the prediction problem based on the evaluations (e.g., scores) of the generated predictive models. Space search engine 610 may use any suitable criteria to select the predictive model for the prediction problem. In some embodiments, space search engine 610 may select the model with the highest score, or any model having a score that exceeds a threshold score, or any model having a score within a specified range of the highest score. In some embodiments, the predictive models' scores may be just one factor considered by space exploration engine 610 in selecting a predictive model for the prediction problem. Other factors considered by space exploration engine may include, without limitation, the predictive model's complexity, the computational demands of the predictive model, etc.

In some embodiments, selecting the predictive model for the prediction problem may comprise iteratively selecting a subset of the predictive models and training the selected predictive models on larger or different portions of the dataset. This iterative process may continue until a predictive model is selected for the prediction problem or until the processing resources budgeted for generating the predictive model are exhausted.

Selecting a subset of predictive models may comprise selecting a fraction of the predictive models with the highest scores, selecting all models having scores that exceed a threshold score, selecting all models having scores within a specified range of the score of the highest-scoring model, or selecting any other suitable group of models. In some embodiments, selecting the subset of predictive models may be analogous to selecting a subset of predictive modeling procedures, as described above with reference to step 820 of method 800. Accordingly, the details of selecting a subset of predictive models are not belabored here.

Training the selected predictive models may comprise generating a resource allocation schedule that allocates processing resources of the processing nodes for the training of the selected models. The allocation of processing resources may be determined based, at least in part, on the suitability of the modeling techniques used to generate the selected models, and/or on the selected models' scores for other samples of the dataset. Training the selected predictive models may further comprise transmitting instructions to processing nodes to fit the selected predictive models to a specified portion of the dataset, and receiving results of the training process, including fitted models and/or scores of the fitted models. In some embodiments, training the selected predictive models may be analogous to executing the selected predictive modeling procedures, as described above with reference to steps 820-840 of method 800. Accordingly, the details of training the selected predictive models are not belabored here.

In some embodiments, steps 830 and 840 may be performed iteratively until a predictive model is selected for the prediction problem or until the processing resources budgeted for generating the predictive model are exhausted. At the end of each iteration, the suitability of the predictive modeling procedures for the prediction problem may be re-determined based, at least in part, on the results of executing the modeling procedures, and a new set of predictive modeling procedures may be selected for execution during the next iteration.

In some embodiments, the number of modeling procedures executed in an iteration of steps 830 and 840 may tend to decrease as the number of iterations increases, and the amount of data used for training and/or testing the generated models may tend to increase as the number of iterations increases. Thus, the earlier iterations may "cast a wide net" by executing a relatively large number of modeling procedures on relatively small datasets, and the later iterations may perform more rigorous testing of the most promising modeling procedures identified during the earlier iterations. Alternatively or in addition, the earlier iterations may implement a more coarse-grained evaluation of the search space, and the later iterations may implement more fine-grained evaluations of the portions of the search space determined to be most promising.

In some embodiments, method 800 includes one or more steps not illustrated in FIG. 8. Additional steps of method 800 may include, without limitation, processing a dataset associated with the prediction problem, blending two or more predictive models to form a blended predictive model, and/or tuning the predictive model selected for the prediction problem. Some embodiments of these steps are described in further detail below.

Method 800 may include a step in which the dataset associated with a prediction problem is processed. In some embodiments, processing a prediction problem's dataset includes characterizing the dataset. Characterizing the dataset may include identifying potential problems with the dataset, including but not limited to identifying data leaks (e.g., scenarios in which the dataset includes a feature that is strongly correlated with the target, but the value of the feature would not be available as input to the predictive model under the conditions imposed by the prediction problem), detecting missing observations, detecting missing variable values, identifying outlying variable values, and/or identifying variables that are likely to have significant predictive value ("predictive variables").

In some embodiments, processing a prediction problem's dataset includes applying feature engineering to the dataset. Applying feature engineering to the dataset may include combining two or more features and replacing the constituent features with the combined feature, extracting different aspects of date/time variables (e.g., temporal and seasonal information) into separate variables, normalizing variable values, infilling missing variable values, etc.

Method 800 may include a step in which two or more predictive models are blended to form a blended predictive model. The blending step may be performed iteratively in connection with executing the predictive modeling techniques and evaluating the generated predictive models. In some embodiments, the blending step may be performed in only some of the execution/evaluation iterations (e.g., in the later iterations, when multiple promising predictive models have been generated).

Two or more models may be blended by combining the outputs of the constituent models. In some embodiments, the blended model may comprise a weighted, linear combination of the outputs of the constituent models. A blended predictive model may perform better than the constituent predictive models, particularly in cases where different constituent models are complementary. For example, a blended model may be expected to perform well when the constituent models tend to perform well on different portions of the prediction problem's dataset, when blends of the models have performed well on other (e.g., similar) prediction problems, when the modeling techniques used to generate the models are dissimilar (e.g., one model is a linear model and the other model is a tree model), etc. In some embodiments, the constituent models to be blended together are identified by a user (e.g., based on the user's intuition and experience).

Method 800 may include a step in which the predictive model selected for the prediction problem is tuned. In some cases, deployment engine 640 provides the source code that implements the predictive model to the user, thereby enabling the user to tune the predictive model. However, disclosing a predictive model's source code may be undesirable in some cases (e.g., in cases where the predictive modeling technique or predictive model contains proprietary capabilities or information). To permit a user to tune a predictive model without exposing the model's source code, deployment engine 640 may construct human-readable rules for tuning the model's parameters based on a representation (e.g., a mathematical representation) of the predictive model, and provide the human-readable rules to the user. The user can then use the human-readable rules to tune the model's parameters without accessing the model's source code. Thus, predictive modeling system 600 may support evaluation and tuning of proprietary predictive modeling techniques without exposing the source code for the proprietary modeling techniques to end users.

In some embodiments, the machine-executable templates corresponding to predictive modeling procedures may include efficiency-enhancing features to reduce redundant computation. These efficiency-enhancing features can be particularly valuable in cases where relatively small amounts of processing resources are budgeted for exploring the search space and generating the predictive model. As described above, the machine-executable templates may store unique IDs for the corresponding modeling elements (e.g., techniques, tasks, or sub-tasks). In addition, predictive modeling system 600 may assign unique IDs to dataset samples S. In some embodiments, when a machine-executable template T is executed on a dataset sample S, the template stores its modeling element ID, the dataset/sample ID, and the results of executing the template on the data sample in a storage structure (e.g., a table, a cache, a hash, etc.) accessible to the other templates. When a template T is invoked on a dataset sample S, the template checks the storage structure to determine whether the results of executing that template on that dataset sample are already stored. If so, rather than reprocessing the dataset sample to obtain the same results, the template simply retrieves the corresponding results from the storage structure, returns those results, and terminates. The storage structure may persist within individual iterations of the loop in which modeling procedures are executed, across multiple iterations of the procedure-execution loop, or across multiple search space explorations. The computational savings achieved through this efficiency-enhancing feature can be appreciable, since many tasks and sub-tasks are shared by different modeling techniques, and method 800 often involves executing different modeling techniques on the same datasets.

Figure 9:
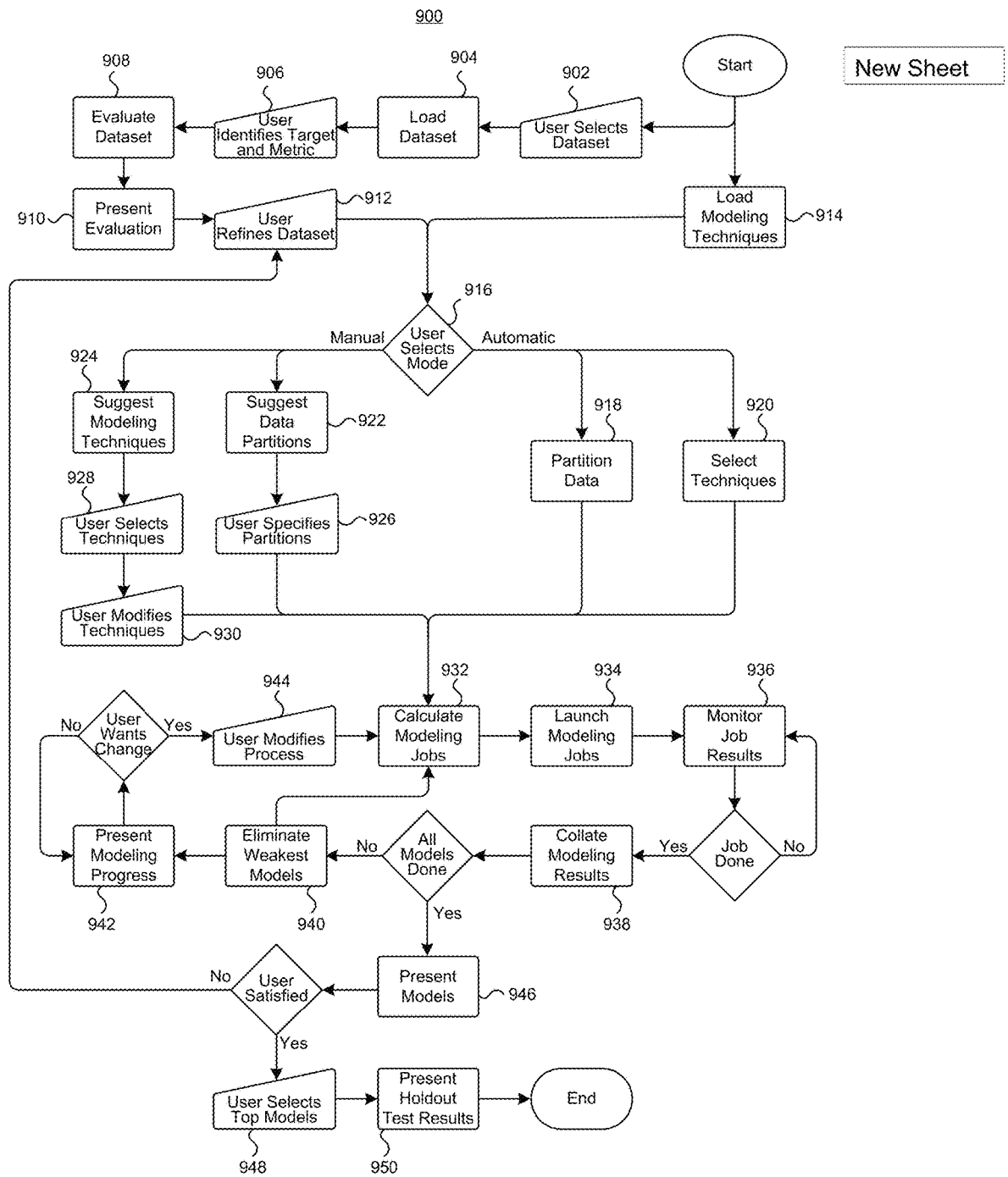
FIG. 9 illustrates another flowchart of a method for selecting a predictive model for a prediction problem, in accordance with some embodiments, in accordance with an embodiment.
Figure 10:
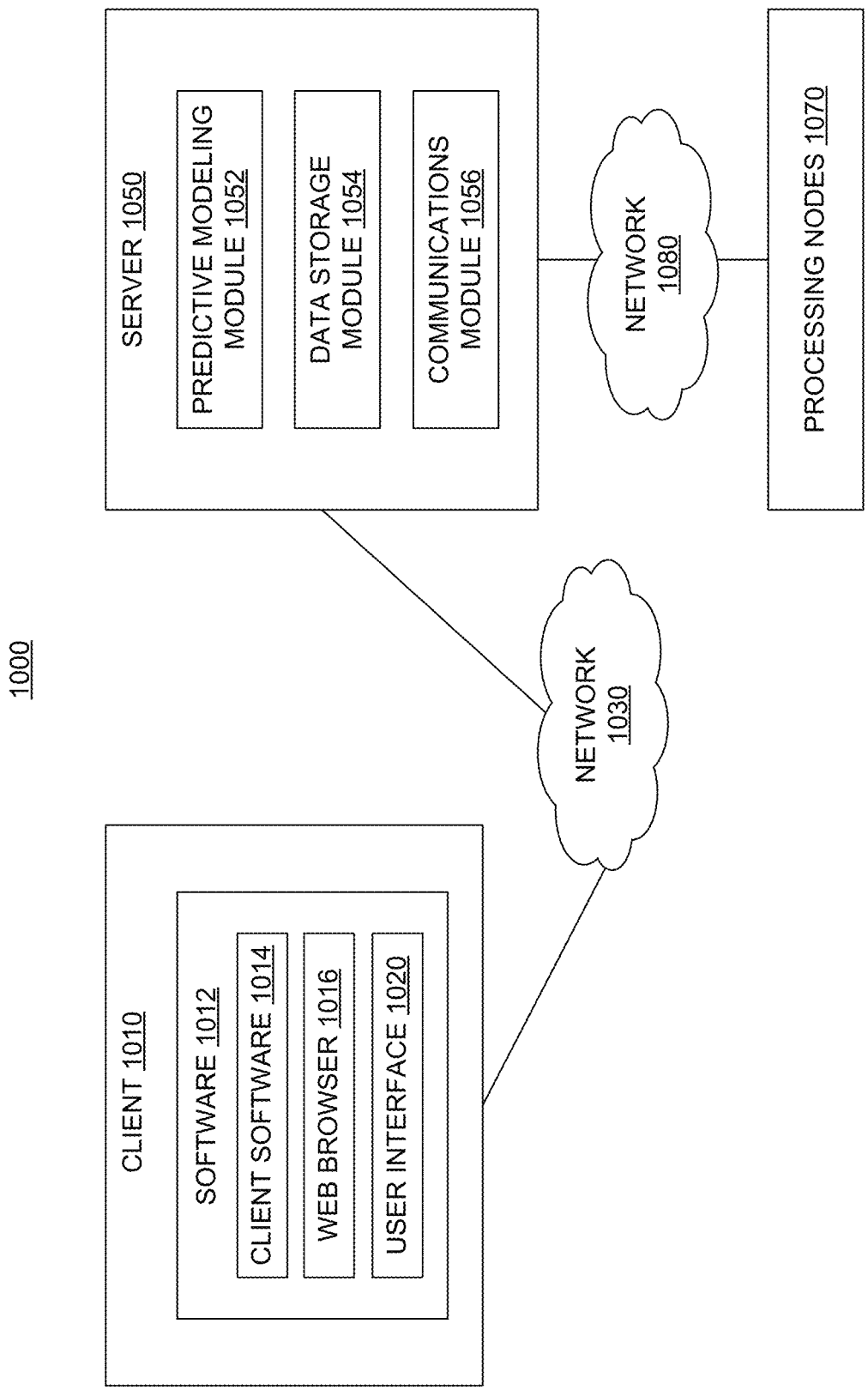
FIG. 10 illustrates a schematic of a predictive modeling system, in accordance with some embodiments, in accordance with an embodiment.

FIG. 9 shows a flowchart of a method 900 for selecting a predictive model for a prediction problem, in accordance with some embodiments. Method 800 may be embodied by the example of method 900.

In the example of FIG. 9, space exploration engine 610 uses the modeling methodology library 712, the modeling technique library 630, and the modeling task library 732 to search the space of available modeling techniques for a solution to a predictive modeling problem. Initially, the user may select a modeling methodology from library 712, or space exploration engine 610 may automatically select a default modeling methodology. The available modeling methodologies may include, without limitation, selection of modeling techniques based on application of deductive rules, selection of modeling techniques based on the performance of similar modeling techniques on similar prediction problems, selection of modeling techniques based on the output of a meta machine-learning model, any combination of the foregoing modeling techniques, or other suitable modeling techniques.

At step 902 of method 900, the exploration engine 610 prompts the user to select the dataset for the predictive modeling problem to be solved. The user can chose from previously loaded datasets or create a new dataset, either from a file or instructions for retrieving data from other information systems. In the case of files, the exploration engine 610 may support one or more formats including, without limitation, comma separated values, tab-delimited, eXtensible Markup Language (XML), JavaScript Object Notation, native database files, etc. In the case of instructions, the user may specify the types of information systems, their network addresses, access credentials, references to the subsets of data within each system, and the rules for mapping the target data schemas into the desired dataset schema. Such information systems may include, without limitation, databases, data warehouses, data integration services, distributed applications, Web services, etc.

At step 504 of method 900, exploration engine 610 loads the data (e.g., by reading the specified file or accessing the specified information systems). Internally, the exploration engine 610 may construct a two-dimensional matrix with the features on one axis and the observations on the other. Conceptually, each column of the matrix may correspond to a variable, and each row of the matrix may correspond to an observation. The exploration engine 610 may attach relevant metadata to the variables, including metadata obtained from the original source (e.g., explicitly specified data types) and/or metadata generated during the loading process (e.g., the variable's apparent data types; whether the variables appear to be numerical, ordinal, cardinal, or interpreted types; etc.).

At step 906 of method 900, exploration engine 610 prompts the user to identify which of the variables are targets and/or which are features. In some embodiments, exploration engine 610 also prompts the user to identify the metric of model performance to be used for scoring the models (e.g., the metric of model performance to be optimized, in the sense of statistical optimization techniques, by the statistical learning algorithm implemented by exploration engine 610).

At step 908 of method 900, exploration engine 610 evaluates the dataset. This evaluation may include calculating the characteristics of the dataset. In some embodiments, this evaluation includes performing an analysis of the dataset, which may help the user better understand the prediction problem. Such an analysis may include applying one or more algorithms to identify problematic variables (e.g., those with outliers or inliers), determining variable importance, determining variable effects, and identifying effect hotspots.

The analysis of the dataset may be performed using any suitable techniques. Variable importance, which measures the degree of significance each feature has in predicting the target, may be analyzed using "gradient boosted trees", Breiman and Cutler's "Random Forest", "alternating conditional expectations", and/or other suitable techniques. Variable effects, which measure the directions and sizes of the effects features have on a target, may be analyzed using "regularized regression", "logistic regression", and/or other suitable techniques. Effect hotspots, which identify the ranges over which features provide the most information in predicting the target, may be analyzed using the "RuleFit" algorithm and/or other suitable techniques.

In some embodiments, in addition to assessing the importance of features contained in the original dataset, the evaluation performed at step 908 of method 900 includes feature generation. Feature generation techniques may include generating additional features by interpreting the logical type of the dataset's variable and applying various transformations to the variable. Examples of transformations include, without limitation, polynomial and logarithmic transformations for numeric features. For interpreted variables (e.g., date, time, currency, measurement units, percentages, and location coordinates), examples of transformations include, without limitation, parsing a date string into a continuous time variable, day of week, month, and season to test each aspect of the date for predictive power.

The systematic transformation of numeric and/or interpreted variables, followed by their systematic testing with potential predictive modeling techniques may enable predictive modeling system 600 to search more of the potential model space and achieve more precise predictions. For example, in the case of "date/time", separating temporal and seasonal information into separate features can be very beneficial because these separate features often exhibit very different relationships with the target variable.

Creating derived features by interpreting and transforming the original features can increase the dimensionality of the original dataset. The predictive modeling system 600 may apply dimension reduction techniques, which may counter the increase in the dataset's dimensionality. However, some modeling techniques are more sensitive to dimensionality than others. Also, different dimension reduction techniques tend to work better with some modeling techniques than others. In some embodiments, predictive modeling system 600 maintains metadata describing these interactions. The system 600 may systematically evaluate various combinations of dimension reduction techniques and modeling techniques, prioritizing the combinations that the metadata indicate are most likely to succeed. The system 600 may further update this metadata based on the empirical performance of the combinations over time and incorporate new dimension reduction techniques as they are discovered.

At step 910 of method 900, predictive modeling system 600 presents the results of the dataset evaluation (e.g., the results of the dataset analysis, the characteristics of the dataset, and/or the results of the dataset transformations) to the user. In some embodiments, the results of the dataset evaluation are presented via user interface 620 (e.g., using graphs and/or tables).

At step 912 of method 900, the user may refine the dataset (e.g., based on the results of the dataset evaluation). Such refinement may include selecting methods for handling missing values or outliers for one or more features, changing an interpreted variable's type, altering the transformations under consideration, eliminating features from consideration, directly editing particular values, transforming features using a function, combining the values of features using a formula, adding entirely new features to the dataset, etc.

Steps 902-912 of method 900 may represent one embodiment of the step of processing a prediction problem's dataset, as described above in connection with some embodiments of method 800.

At step 914 of method 900, the exploration engine 610 may load the available modeling techniques from the modeling technique library 630. The determination of which modeling techniques are available may depend on the selected modeling methodology. In some embodiments, the loading of the modeling techniques may occur in parallel with one or more of steps 902-912 of method 900.

At step 916 of method 900, the user instructs the exploration engine 610 to begin the search for modeling solutions in either manual mode or automatic mode. In automatic mode, the exploration engine 610 partitions the dataset (step 918) using a default sampling algorithm and prioritizes the modeling techniques (step 920) using a default prioritization algorithm. Prioritizing the modeling techniques may include determining the suitability of the modeling techniques for the prediction problem, and selecting at least a subset of the modeling techniques for execution based on their determined suitability.

In manual mode, the exploration engine 610 suggests data partitions (step 922) and suggests a prioritization of the modeling techniques (step 924). The user may accept the suggested data partition or specify custom partitions (step 926). Likewise, the user may accept the suggested prioritization of modeling techniques or specify a custom prioritization of the modeling techniques (step 928). In some embodiments, the user can modify one or more modeling techniques (e.g., using the modeling technique builder 720 and/or the modeling task builder 730) (step 930) before the exploration engine 610 begins executing the modeling techniques.

To facilitate cross-validation, predictive modeling system 600 may partition the dataset (or suggest a partitioning of the dataset) into K "folds". Cross-validation comprises fitting a predictive model to the partitioned dataset K times, such that during each fitting, a different fold serves as the test set and the remaining folds serve as the training set. Cross-validation can generate useful information about how the accuracy of a predictive model varies with different training data. In steps 918 and 922, predictive modeling system may partition the dataset into K folds, where the number of folds K is a default parameter. In step 926, the user may change the number of folds K or cancel the use of cross-validation altogether.

To facilitate rigorous testing of the predictive models, predictive modeling system 600 may partition the dataset (or suggest a partitioning of the dataset) into a training set and a "holdout" test set. In some embodiments, the training set is further partitioned into K folds for cross-validation. The training set may then be used to train and evaluate the predictive models, but the holdout test set may be reserved strictly for testing the predictive models. In some embodiments, predictive modeling system 600 can strongly enforce the use of the holdout test set for testing (and not for training) by making the holdout test set inaccessible until a user with the designated authority and/or credentials releases it. In steps 918 and 922, predictive modeling system 600 may partition the dataset such that a default percentage of the dataset is reserved for the holdout set. In step 926, the user may change the percentage of the dataset reserved for the holdout set, or cancel the use of a holdout set altogether.

In some embodiments, predictive modeling system 600 partitions the dataset to facilitate efficient use of computing resources during the evaluation of the modeling search space. For example, predictive modeling system 600 may partition the cross-validation folds of the dataset into smaller samples. Reducing the size of the data samples to which the predictive models are fitted may reduce the amount of computing resources used to evaluate the relative performance of different modeling techniques. In some embodiments, the smaller samples may be generated by taking random samples of a fold's data. Likewise, reducing the size of the data samples to which the predictive models are fitted may reduce the amount of computing resources used to tune the parameters of a predictive model or the hyper-parameters of a modeling technique. Hyper-parameters include variable settings for a modeling technique that can affect the speed, efficiency, and/or accuracy of model fitting process. Examples of hyper-parameters include, without limitation, the penalty parameters of an elastic-net model, the number of trees in a gradient boosted trees model, the number of neighbors in a nearest neighbors model, etc.

In steps 932-958 of method 900, the selected modeling techniques may be executed using the partitioned data to evaluate the search space. These steps are described in further detail below. For convenience, some aspects of the evaluation of the search space relating to data partitioning are described in the following paragraphs.

Tuning hyper-parameters using sample data that includes the test set of a cross-validation fold can lead to model over-fitting, thereby making comparisons of different models' performance unreliable. Using a "specified approach" can help avoid this problem, and can provide several other advantages. Some embodiments of exploration engine 610 therefore implement "nested cross-validation", a technique whereby two loops of k-fold cross validation are applied. The outer loop provides a test set for both comparing a given model to other models and calibrating each model's predictions on future samples. The inner loop provides both a test set for tuning the hyper-parameters of the given model and a training set for derived features.

Moreover, the cross-validation predictions produced in the inner loop may facilitate blending techniques that combine multiple different models. In some embodiments, the inputs into a blender are predictions from an out-of-sample model. Using predictions from an in-sample model could result in over-fitting if used with some blending algorithms. Without a well-defined process for consistently applying nested cross-validation, even the most experienced users can omit steps or implement them incorrectly. Thus, the application of a double loop of k-fold cross validation may allow predictive modeling system 600 to simultaneously achieve five goals: (1) tuning complex models with many hyper-parameters, (2) developing informative derived features, (3) tuning a blend of two or more models, (4) calibrating the predictions of single and/or blended models, and (5) maintaining a pure untouched test set that allows an accurate comparison of different models.

At step 932 of method 900, the exploration engine 610 generates a resource allocation schedule for the execution of an initial set of the selected modeling techniques. The allocation of resources represented by the resource allocation schedule may be determined based on the prioritization of modeling techniques, the partitioned data samples, and the available computation resources. In some embodiments, exploration engine 610 allocates resources to the selected modeling techniques greedily (e.g., assigning computational resources in turn to the highest-priority modeling technique that has not yet executed).

At step 934 of method 900, the exploration engine 610 initiates execution of the modeling techniques in accordance with the resource allocation schedule. In some embodiments, execution of a set of modeling techniques may comprise training one or more models on a same data sample extracted from the dataset.

At step 936 of method 900, the exploration engine 610 monitors the status of execution of the modeling techniques. When a modeling technique is finished executing, the exploration engine 610 collects the results (step 938), which may include the fitted model and/or metrics of model fit for the corresponding data sample. Such metrics may include any metric that can be extracted from the underlying software components that perform the fitting, including, without limitation, Gini coefficient, r-squared, residual mean squared error, any variations thereof, etc.

At step 940 of method 900, the exploration engine 610 eliminates the worst-performing modeling techniques from consideration (e.g., based on the performance of the models they produced according to model fit metrics). Exploration engine 610 may determine which modeling techniques to eliminate using a suitable technique, including, without limitation, eliminating those that do not produce models that meet a minimum threshold value of a model fit metric, eliminating all modeling techniques except those that have produced models currently in the top fraction of all models produced, or eliminating any modeling techniques that have not produced models that are within a certain range of the top models. In some embodiments, different procedures may be used to eliminate modeling techniques at different stages of the evaluation. In some embodiments, users may be permitted to specify different elimination-techniques for different modeling problems. In some embodiments, users may be permitted to build and use custom elimination techniques. In some embodiments, meta-statistical-learning techniques may be used to choose among elimination-techniques and/or to adjust the parameters of those techniques.

As the exploration engine 610 calculates model performance and eliminates modeling techniques from consideration, predictive modeling system 600 may present the progress of the search space evaluation to the user through the user interface 620 (step 942). In some embodiments, at step 944, exploration engine 610 permits the user to modify the process of evaluating the search space based on the progress of the search space evaluation, the user's expert knowledge, and/or other suitable information. If the user specifies a modification to the search space evaluation process, the space exploration engine 610 reallocates processing resources accordingly (e.g., determines which jobs are affected and either moves them within the scheduling queue or deletes them from the queue). Other jobs continue processing as before.

The user may modify the search space evaluation process in many different ways. For example, the user may reduce the priority of some modeling techniques or eliminate some modeling techniques from consideration altogether even though the performance of the models they produced on the selected metric was good. As another example, the user may increase the priority of some modeling techniques or select some modeling techniques for consideration even though the performance of the models they produced was poor. As another example, the user may prioritize evaluation of specified models or execution of specified modeling techniques against additional data samples. As another example, a user may modify one or more modeling techniques and select the modified techniques for consideration. As another example, a user may change the features used to train the modeling techniques or fit the models (e.g., by adding features, removing features, or selecting different features). Such a change may be beneficial if the results indicate that the feature magnitudes are to be normalizations or that some of the features are "data leaks".

In some embodiments, steps 932-944 may be performed iteratively. Modeling techniques that are not eliminated (e.g., by the system at step 940 or by the user at step 944) survive another iteration. Based on the performance of a model generated in the previous iteration (or iterations), the exploration engine 610 adjusts the corresponding modeling technique's priority and allocates processing resources to the modeling technique accordingly. As computational resources become available, the engine uses the available resources to launch model-technique-execution jobs based on the updated priorities.

In some embodiments, at step 932, exploration engine 610 may "blend" multiple models using different mathematical combinations to create new models (e.g., using stepwise selection of models to include in the blender). In some embodiments, predictive modeling system 600 provides a modular framework that allows users to plug in their own automatic blending techniques. In some embodiments, predictive modeling system 600 allows users to manually specify different model blends.

In some embodiments, predictive modeling system 600 may offer one or more advantages in developing blended prediction models. First, blending may work better when a large variety of candidate models are available to blend. Moreover, blending may work better when the differences between candidate models correspond not simply to minor variations in algorithms but rather to major differences in approach, such as those among linear models, tree-based models, support vector machines, and nearest neighbor classification. Predictive modeling system 600 may deliver a substantial head start by automatically producing a wide variety of models and maintaining metadata describing how the candidate models differ. Predictive modeling system 600 may also provide a framework that allows any model to be incorporated into a blended model by, for example, automatically normalizing the scale of variables across the candidate models. This framework may allow users to easily add their own customized or independently generated models to the automatically generated models to further increase variety.

In addition to increasing the variety of candidate models available for blending, the predictive modeling system 600 also provides a number of user interface features and analytic features that may result in superior blending. First, user interface 620 may provide an interactive model comparison, including several different alternative measures of candidate model fit and graphics such as dual lift charts, so that users can easily identify accurate and complementary models to blend. Second, modeling system 600 gives the user the option of choosing specific candidate models and blending techniques or automatically fitting some or all of the blending techniques in the modeling technique library using some or all of the candidate models. The nested cross-validation framework then enforces the condition that the data used to rank each blended model is not used in tuning the blender itself or in tuning its component models' hyper-parameters. This discipline may provide the user a more accurate comparison of alternative blender performance. In some embodiments, modeling system 600 implements a blended model's processing in parallel, such that the computation time for the blended model approaches the computation time of its slowest component model.

Returning to FIG. 9, at step 946 of method 900, the user interface 620 presents the final results to the user. Based on this presentation, the user may refine the dataset (e.g., by returning to step 912), adjust the allocation of resources to executing modeling techniques (e.g., by returning to step 944), modify one or more of the modeling techniques to improve accuracy (e.g., by returning to step 930), alter the dataset (e.g., by returning to step 902), etc.

At step 948 of method 900, rather than restarting the search space evaluation or a portion thereof, the user may select one or more top predictive model candidates. At step 950, predictive modeling system 600 may present the results of the holdout test for the selected predictive model candidate(s). The holdout test results may provide a final gauge of how these candidates compare. In some embodiments, only users with adequate privileges may release the holdout test results. Preventing the release of the holdout test results until the candidate predictive models are selected may facilitate an unbiased evaluation of performance. However, the exploration engine 610 may actually calculate the holdout test results during the modeling job execution process (e.g., steps 932-944), as long as the results remain hidden until after the candidate predictive models are selected.

Returning to FIG. 10, the user interface 1020 may provide tools for monitoring and/or guiding the search of the predictive modeling space. These tools may provide insight into a prediction problem's dataset (e.g., by highlighting problematic variables in the dataset, identifying relationships between variables in the dataset, etc.), and/or insights into the results of the search. In some embodiments, data analysts may use the interface to guide the search, e.g., by specifying the metrics to be used to evaluate and compare modeling solutions, by specifying the criteria for recognizing a suitable modeling solution, etc. Thus, the user interface may be used by analysts to improve their own productivity, and/or to improve the performance of the exploration engine 610. In some embodiments, user interface 1020 presents the results of the search in real-time, and permits users to guide the search (e.g., to adjust the scope of the search or the allocation of resources among the evaluations of different modeling solutions) in real-time. In some embodiments, user interface 1020 provides tools for coordinating the efforts of multiple data analysts working on the same prediction problem and/or related prediction problems.

In some embodiments, the user interface 1020 provides tools for developing machine-executable templates for the library 630 of modeling techniques. System users may use these tools to modify existing templates, to create new templates, or to remove templates from the library 630. In this way, system users may update the library 630 to reflect advances in predictive modeling research, and/or to include proprietary predictive modeling techniques.

User interface 1020 may include a variety of interface components that allow users to manage multiple modeling projects within an organization, create and modify elements of the modeling methodology hierarchy, conduct comprehensive searches for accurate predictive models, gain insights into the dataset and model results, and/or deploy completed models to produce predictions on new data.

In some embodiments, the user interface 1020 distinguishes between four types of users: administrators, technique developers, model builders, and observers. Administrators may control the allocation of human and computing resources to projects. Technique developers may create and modify modeling techniques and their component tasks. Model builders primarily focus on searching for good models, though they may also make minor adjustments to techniques and tasks. Observers may view certain aspects of project progress and modelling results, but may be prohibited from making any changes to data or initiating any model-building. An individual may fulfill more than one role on a specific project or across multiple projects.

Users acting as administrators may access the project management components of user interface 1020 to set project parameters, assign project responsibilities to users, and allocate computing resources to projects. In some embodiments, administrators may use the project management components to organize multiple projects into groups or hierarchies. All projects within a group may inherit the group's settings. In a hierarchy, all children of a project may inherit the project's settings. In some embodiments, users with sufficient permissions may override inherited settings. In some embodiments, users with sufficient permissions may further divide settings into different sections so that only users with the corresponding permissions may alter them. In some cases, administrators may permit access to certain resources orthogonally to the organization of projects. For example, certain techniques and tasks may be made available to every project unless explicitly prohibited. Others may be prohibited to every project unless explicitly allowed. Moreover, some resources may be allocated on a user basis, so that a project can only access the resources if a user who possesses those rights is assigned to that particular project.

In managing users, administrators may control the group of all users admitted to the system, their permitted roles, and system-level permissions. In some embodiments, administrators may add users to the system by adding them to a corresponding group and issuing them some form of access credentials. In some embodiments, user interface 620 may support different kinds of credentials including, without limitation, username plus password, unified authorization frameworks (e.g., OAuth), hardware tokens (e.g., smart cards), etc.

Once admitted, an administrator may specify that certain users have default roles that they assume for any project. For example, a particular user may be designated as an observer unless specifically authorized for another role by an administrator for a particular project. Another user may be provisioned as a technique developer for all projects unless specifically excluded by an administrator, while another may be provisioned as a technique developer for only a particular group of projects or branch of the project hierarchy. In addition to default roles, administrators may further assign users more specific permissions at the system level. For example, some Administrators may be able to grant access to certain types of computing resources, some technique developers and model builders may be able to access certain features within the builders; and some model builders may be authorized to start new projects, consume more than a given level of computation resources, or invite new users to projects that they do not own.

In some embodiments, administrators may assign access, permissions, and responsibilities at the project level. Access may include the ability to access any information within a particular project. Permissions may include the ability to perform specific operations for a project. Access and permissions may override system-level permissions or provide more granular control. As an example of the former, a user who normally has full builder permissions may be restricted to partial builder permissions for a particular project. As an example of the latter, certain users may be limited from loading new data to an existing project. Responsibilities may include action items that a user is expected to complete for the project.

Users acting as developers may access the builder areas of the interface to create and modify modeling methodologies, techniques, and tasks. As discussed previously, each builder may present one or more tools with different types of user interfaces that perform the corresponding logical operations. In some embodiments, the user interface 1020 may permit developers to use a "Properties" sheet to edit the metadata attached to a technique. A technique may also have tuning parameters corresponding to variables for particular tasks. A developer may publish these tuning parameters to the technique-level Properties sheet, specifying default values and whether or not model builders may override these defaults.

In some embodiments, the user interface 1020 may offer a graphical flow-diagram tool for specifying a hierarchical directed graph of tasks, along with any built-in operations for conditional logic, filtering output, transforming output, partitioning output, combining inputs, iterating over subgraphs, etc. In some embodiments, user interface 1020 may provide facilities for creating the wrappers around pre-existing software to implement leaf-level tasks, including properties that can be set for each task.

In some embodiments, user interface 1020 may provide advanced developers built-in access to interactive development environments (IDEs) for implementing leaf-level tasks. While developers may, alternatively, code a component in an external environment and wrap that code as a leaf-level task, it may be more convenient if these environments are directly accessible. In such an embodiment, the IDEs themselves may be wrapped in the interface and logically integrated into the task builder. From the user perspective, an IDE may run within the same interface framework and on the same computational infrastructure as the task builder. This capability may enable advanced developers to more quickly iterate in developing and modifying techniques. Some embodiments may further provide code collaboration features that facilitate coordination between multiple developers simultaneously programming the same leaf-level tasks.

Model builders may leverage the techniques produced by developers to build predictive models for their specific datasets. Different model builders may have different levels of experience and thus use different support from the user interface. For relatively new users, the user interface 1020 may present as automatic a process as possible, but still give users the ability to explore options and thereby learn more about predictive modeling. For intermediate users, the user interface 1020 may present information to facilitate rapidly assessing how easy a particular problem will be to solve, comparing how their existing predictive models stack up to what the predictive modeling system 600 can produce automatically, and getting an accelerated start on complicated projects that will eventually benefit from substantial hands-on tuning. For advanced users, the user interface 1020 may facilitate extraction of a few extra decimal places of accuracy for an existing predictive model, rapid assessment of applicability of new techniques to the problems they've worked on, and development of techniques for a whole class of problems their organizations may face. By capturing the knowledge of advanced users, some embodiments facilitate the propagation of that knowledge throughout the rest of the organization.

To support this breadth of user requirements, some embodiments of user interface 1020 provide a sequence of interface tools that reflect the model building process. Moreover, each tool may offer a spectrum of features from basic to advanced. The first step in the model building process may involve loading and preparing a dataset. As discussed previously, a user may upload a file or specify how to access data from an online system. In the context of modeling project groups or hierarchies, a user may also specify what parts of the parent dataset are to be used for the current project and what parts are to be added.

For basic users, predictive modeling system 600 may immediately proceed to building models after the dataset is specified, pausing only if the user interface 1020 flags troubling issues, including, without limitation, unparseable data, too few observations to expect good results, too many observations to execute in a reasonable amount time, too many missing values, or variables whose distributions may lead to unusual results. For intermediate users, user interface 1020 may facilitate understanding the data in more depth by presenting the table of data set characteristics and the graphs of variable importance, variable effects, and effect hotspots. User interface 1020 may also facilitate understanding and visualization of relationships between the variables by providing visualization tools including, without limitation, correlation matrixes, partial dependence plots, and/or the results of unsupervised machine-learning algorithms such as k-means and hierarchical clustering. In some embodiments, user interface 1020 permits advanced users to create entirely new dataset features by specifying formulas that transform an existing feature or combination of them.

Once the dataset is loaded, users may specify the model-fit metric to be optimized. For basic users, predictive modeling system 600 may choose the model-fit metric, and user interface 1020 may present an explanation of the choice. For intermediate users, user interface 1020 may present information to help the users understand the tradeoffs in choosing different metrics for a particular dataset. For advanced users, user interface 620 may permit the user to specify custom metrics by writing formulas (e.g., objective functions) based on the low-level performance data collected by the exploration engine 610 or even by uploading custom metric calculation code.

With the dataset loaded and model-fit metric selected, the user may launch the exploration engine. For basic users, the exploration engine 610 may use the default prioritization settings for modeling techniques, and user interface 620 may provide high-level information about model performance, how far into the dataset the execution has progressed, and the general consumption of computing resources. For intermediate users, user interface 620 may permit the user to specify a subset of techniques to consider and slightly adjust some of the initial priorities. In some embodiments, user interface 620 provides more granular performance and progress data so intermediate users can make in-flight adjustments as previously described. In some embodiments, user interface 620 provides intermediate users with more insight into and control of computing resource consumption. In some embodiments, user interface 620 may provide advanced users with significant (e.g., complete) control of the techniques considered and their priority, all the performance data available, and significant (e.g., complete) control of resource consumption. By either offering distinct interfaces to different levels of users or "collapsing" more advanced features for less advanced users by default, some embodiments of user interface 620 can support the users at their corresponding levels.

During and after the exploration of the search space, the user interface may present information about the performance of one or more modeling techniques. Some performance information may be displayed in a tabular format, while other performance information may be displayed in a graphical format. For example, information presented in tabular format may include, without limitation, comparisons of model performance by technique, fraction of data evaluated, technique properties, or the current consumption of computing resources. Information presented in graphical format may include, without limitation, the directed graph of tasks in a modeling procedure, comparisons of model performance across different partitions of the dataset, representations of model performance such as the receiver operating characteristics and lift chart, predicted vs. actual values, and the consumption of computing resources over time. The user interface 620 may include a modular user interface framework that allows for the easy inclusion of new performance information of either type. Moreover, some embodiments may allow the display of some types of information for each data partition and/or for each technique.

As discussed previously, some embodiments of user interface 620 support collaboration of multiple users on multiple projects. Across projects, user interface 620 may permit users to share data, modeling tasks, and modeling techniques. Within a project, user interface 620 may permit users to share data, models, and results. In some embodiments, user interface 620 may permit users to modify properties of the project and use resources allocated to the project. In some embodiments, user interface 620 may permit multiple users to modify project data and add models to the project, then compare these contributions. In some embodiments, user interface 620 may identify which user made a specific change to the project, when the change was made, and what project resources a user has used.

The model deployment engine 640 provides tools for deploying predictive models in operational environments. In some embodiments, the model deployment engine 640 monitors the performance of deployed predictive models, and updates the performance metadata associated with the modeling techniques that generated the deployed models, so that the performance data accurately reflects the performance of the deployed models.

Users may deploy a fitted prediction model when they believe the fitted model warrants field testing or is capable of adding value. In some embodiments, users and external systems may access a prediction module (e.g., in an interface services layer of predictive modeling system 600), specify one or more predictive models to be used, and supply new observations. The prediction module may then return the predictions provided by those models. In some embodiments, administrators may control which users and external systems have access to this prediction module, and/or set usage restrictions such as the number of predictions allowed per unit time.

For each model, exploration engine 610 may store a record of the modeling technique used to generate the model and the state of model the after fitting, including coefficient and hyper-parameter values. Because each technique is already machine-executable, these values may be sufficient for the execution engine to generate predictions on new observation data. In some embodiments, a model's prediction may be generated by applying the pre-processing and modeling steps described in the modeling technique to each instance of new input data. However, in some cases, it may be possible to increase the speed of future prediction calculations. For example, a fitted model may make several independent checks of a particular variable's value. Combining some or all of these checks and then simply referencing them when convenient may decrease the total amount of computation used to generate a prediction. Similarly, several component models of a blended model may perform the same data transformation. Some embodiments may therefore reduce computation time by identifying duplicative calculations, performing them only once, and referencing the results of the calculations in the component models that use them.

In some embodiments, deployment engine 640 improves the performance of a prediction model by identifying opportunities for parallel processing, thereby decreasing the response time in making each prediction when the underlying hardware can execute multiple instructions in parallel. Some modeling techniques may describe a series of steps sequentially, but in fact some of the steps may be logically independent. By examining the data flow among each step, the deployment engine 640 may identify situations of logical independence and then restructure the execution of predictive models so independent steps are executed in parallel. Blended models may present a special class of parallelization, because the constituent predictive models may be executed in parallel, once any common data transformations have completed.

In some embodiments, deployment engine 640 may cache the state of a predictive model in memory. With this approach, successive prediction requests of the same model may not incur the time to load the model state. Caching may work especially well in cases where there are many requests for predictions on a relatively small number of observations and therefore this loading time is potentially a large part of the total execution time.

In some embodiments, deployment engine 640 may offer at least two implementations of predictive models: service-based and code-based. For service-based prediction, calculations run within a distributed computing infrastructure as described below. Final prediction models may be stored in the data services layer of the distributed computing infrastructure. When a user or external system requests a prediction, it may indicate which model is to be used and provides at least one new observation. A prediction module may then load the model from the data services layer or from the module's in-memory cache, validate that the submitted observations matches the structure of the original dataset, and compute the predicted value for each observation. In some implementations, the predictive models may execute on a dedicated pool of cloud workers, thereby facilitating the generation of predictions with low-variance response times.

Service-based prediction may occur either interactively or via API. For interactive predictions, the user may enter the values of features for each new observation or upload a file containing the data for one or more observations. The user may then receive the predictions directly through the user interface 620, or download them as a file. For API predictions, an external system may access the prediction module via local or remote API, submit one or more observations, and receive the corresponding calculated predictions in return.

Some implementations of deployment engine 640 may allow an organization to create one or more miniaturized instances of the distributed computing infrastructure for the purpose of performing service-based prediction. In the distributed computing infrastructure's interface layer, each such instance may use the parts of the monitoring and prediction modules accessible by external systems, without accessing the user-related functions. The analytic services layer may not use the technique IDE module, and the rest of the modules in this layer may be stripped down and optimized for servicing prediction requests. The data services layer may not use the user or model-building data management. Such standalone prediction instances may be deployed on a parallel pool of cloud resources, distributed to other physical locations, or even downloaded to one or more dedicated machines that act as "prediction appliances".

To create a dedicated prediction instance, a user may specify the target computing infrastructure, for example, whether it's a set of cloud instances or a set of dedicated hardware. The corresponding modules may then be provisioned and either installed on the target computing infrastructure or packaged for installation. The user may either configure the instance with an initial set of predictive models or create a "blank" instance. After initial installation, users may manage the available predictive models by installing new ones or updating existing ones from the main installation.

For code-based predictions, the deployment engine 640 may generate source code for calculating predictions based on a particular model, and the user may incorporate the source code into other software. When models are based on techniques whose leaf-level tasks are all implemented in the same programming language as that requested by the user, deployment engine 640 may produce the source code for the predictive model by collating the code for leaf-level tasks. When the model incorporates code from different languages or the language is different from that desired by the user, deployment engine 640 may use more sophisticated approaches.

One approach is to use a source-to-source compiler to translate the source code of the leaf-level tasks into a target language. Another approach is to generate a function stub in the target language that then calls linked-in object code in the original language or accesses an emulator running such object code. The former approach may involve the use of a cross-compiler to generate object code specifically for the user's target computing platform. The latter approach may involve the use of an emulator that will run on the user's target platform.

Another approach is to generate an abstract description of a particular model and then compile that description into the target language. To generate an abstract description, some embodiments of deployment engine 640 may use meta-models for describing a large number of potential preprocessing, model-fitting, and post-processing steps. The deployment engine may then extract the particular operations for a complete model and encode them using the meta-model. In such embodiments, a compiler for the target programming language may be used to translate the meta-models into the target language. So if a user wants prediction code in a supported language, the compiler may produce it. For example, in a decision-tree model, the decisions in the tree may be abstracted into logical if/then/else statements that are directly implementable in a wide variety of programming languages. Similarly, a set of mathematical operations that are supported in common programming languages may be used to implement a linear regression model.

However, disclosing a predictive model's source code in any language may be undesirable in some cases (e.g., in cases where the predictive modeling technique or predictive model contains proprietary capabilities or information). Therefore, the deployment engine 640 may convert a predictive model into a set of rules that preserves the predictive capabilities of the predictive model without disclosing its procedural details. One approach is to apply an algorithm that produces such rules from a set of hypothetical predictions that a predictive model would generate in response to hypothetical observations. Some such algorithms may produce a set of if-then rules for making predictions. For these algorithms, the deployment engine 640 may then convert the resulting if-then rules into a target language instead of converting the original predictive model. An additional advantage of converting a predictive model to a set of if-then rules is that it is generally easier to convert a set of if-then rules into a target programming language than a predictive model with arbitrary control and data flows because the basic model of conditional logic is more similar across programming languages.

Once a model starts making predictions on new observations, the deployment engine 640 may track these predictions, measure their accuracy, and use these results to improve predictive modeling system 600. In the case of service-based predictions, because predictions occur within the same distributed computing environment as the rest of the system, each observation and prediction may be saved via the data services layer. By providing an identifier for each prediction, some embodiments may allow a user or external software system to submit the actual values, if and when they are recorded. In the case of code-based predictions, some embodiments may include code that saves observations and predictions in a local system or back to an instance of the data services layer. Again, providing an identifier for each prediction may facilitate the collection of model performance data against the actual target values when they become available.

Information collected directly by the deployment engine 640 about the accuracy of predictions, and/or observations obtained through other channels, may be used to improve the model for a prediction problem (e.g., to "refresh" an existing model, or to generate a model by re-exploring the modeling search space in part or in full). New data can be added to improve a model in the same ways data was originally added to create the model, or by submitting target values for data previously used in prediction.

Some models may be refreshed (e.g., refitted) by applying the corresponding modeling techniques to the new data and combining the resulting new model with the existing model, while others may be refreshed by applying the corresponding modeling techniques to a combination of original and new data. In some embodiments, when refreshing a model, only some of the model parameters may be recalculated (e.g., to refresh the model more quickly, or because the new data provides information that is particularly relevant to particular parameters).

Alternatively or in addition, new models may be generated exploring the modeling search space, in part or in full, with the new data included in the dataset. The re-exploration of the search space may be limited to a portion of the search space (e.g., limited to modeling techniques that performed well in the original search), or may cover the entire search space. In either case, the initial suitability scores for the modeling technique(s) that generated the deployed model(s) may be recalculated to reflect the performance of the deployed model(s) on the prediction problem. Users may choose to exclude some of the previous data to perform the recalculation. Some embodiments of deployment engine 640 may track different versions of the same logical model, including which subsets of data were used to train which versions.

In some embodiments, this prediction data may be used to perform post-request analysis of trends in input parameters or predictions themselves over time, and to alert the user of potential issues with inputs or the quality of the model predictions. For example, if an aggregate measure of model performance starts to degrade over time, the system may alert the user to consider refreshing the model or investigating whether the inputs themselves are shifting. Such shifts may be caused by temporal change in a particular variable or drifts in the entire population. In some embodiments, most of this analysis is performed after prediction requests are completed, to avoid slowing down the prediction responses. However, the system may perform some validation at prediction time to avoid particularly bad predictions (e.g., in cases where an input value is outside a range of values that it has computed as valid given characteristics of the original training data, modeling technique, and final model fitting state).

After-the-fact analysis may be done in cases where a user has deployed a model to make extrapolations well beyond the population used in training. For example, a model may have been trained on data from one geographic region, but used to make predictions for a population in a completely different geographic region. Sometimes, such extrapolation to new populations may result in model performance that is substantially worse than expected. In these cases, the deployment engine 640 may alert the user and/or automatically refresh the model by re-fitting one or more modeling techniques using the new values to extend the original training data.

The predictive modeling system 600 may significantly improve the productivity of analysts at any skill level and/or significantly increase the accuracy of predictive models achievable with a given amount of resources. Automating procedures can reduce workload and systematizing processes can enforce consistency, enabling analysts to spend more time generating unique insights. Three common scenarios illustrate these advantages: forecasting outcomes, predicting properties, and inferring measurements.

Forecasting Outcomes

If an organization can accurately forecast outcomes, then it can both plan more effectively and enhance its behavior. Therefore, a common application of machine learning is to develop algorithms that produce forecasts. For example, many industries face the problem of predicting costs in large-scale, time-consuming projects.

In some embodiments, the techniques described herein can be used for forecasting cost overruns (e.g., software cost overruns or construction cost overruns). For example, the techniques described herein may be applied to the problem of forecasting cost overruns as follows:

1. Select a model fitting metric appropriate to the response variable type (e.g., numerical or binary, approximately Gaussian or strongly non-Gaussian): Predictive modeling system 600 may recommend a metric based on data characteristics, requiring less skill and effort by the user, but allows the user to make the final selection.

2. Pre-treat the data to address outliers and missing data values: Predictive modeling system 600 may provide detailed summary of data characteristics, enabling users to develop better situational awareness of the modeling problem and assess potential modeling challenges more effectively. Predictive modeling system 600 may include automated procedures for outlier detection and replacement, missing value imputation, and the detection and treatment of other data anomalies, requiring less skill and effort by the user. The predictive modeling system's procedures for addressing these challenges may be systematic, leading to more consistent modeling results across methods, datasets, and time than ad hoc data editing procedures.

3. Partition the data for modeling and evaluation: The predictive modeling system 600 may automatically partition data into training, validation, and holdout sets. This partitioning may be more flexible than the train and test partitioning used by some data analysts, and consistent with widely accepted recommendations from the machine learning community. The use of a consistent partitioning approach across methods, datasets, and time can make results more comparable, enabling more effective allocation of deployment resources in commercial contexts.

4. Select model structures, generate derived features, select model tuning parameters, fit models, and evaluate: In some embodiments, the predictive modeling system 600 can fit many different model types, including, without limitation, decision trees, neural networks, support vector machine models, regression models, boosted trees, random forests, deep learning neural networks, etc. The predictive modeling system 600 may provide the option of automatically constructing ensembles from those component models that exhibit the best individual performance. Exploring a larger space of potential models can improve accuracy. The predictive modeling system may automatically generate a variety of derived features appropriate to different data types (e.g., Box-Cox transformations, text pre-processing, principal components, etc.). Exploring a larger space of potential transformation can improve accuracy. The predictive modeling system 600 may use cross validation to select the best values for these tuning parameters as part of the model building process, thereby improving the choice of tuning parameters and creating an audit trail of how the selection of parameters affects the results. The predictive modeling system 600 may fit and evaluate the different model structures considered as part of this automated process, ranking the results in terms of validation set performance.

5. Select the final model: The choice of the final model can be made by the predictive modeling system 600 or by the user. In the latter case, the predictive modeling system may provide support to help the user make this decision, including, for example, the ranked validation set performance assessments for the models, the option of comparing and ranking performance by other quality measures than the one used in the fitting process, and/or the opportunity to build ensemble models from those component models that exhibit the best individual performance.

A practical aspect of the predictive modeling system's model development process is that, once the initial dataset has been assembled, all subsequent computations may occur within the same software environment. This aspect represents a difference from the conventional model-building efforts, which often involves a combination of different software environments. A practical disadvantage of such multi-platform analysis approaches can be the need to convert results into common data formats that can be shared between the different software environments. Often this conversion is done either manually or with custom "one-off" reformatting scripts. Errors in this process can lead to extremely serious data distortions. Predictive modeling system 600 may avoid such reformatting and data transfer errors by performing all computations in one software environment. More generally, because it is highly automated, fitting and optimizing many different model structures, the predictive modeling system 600 can provide a substantially faster and more systematic, thus more readily explainable and more repeatable, route to the final model. Moreover, as a consequence of the predictive modeling system 600 exploring more different modeling methods and including more possible predictors, the resulting models may be more accurate than those obtained by traditional methods.

Predicting Properties

In many fields, organizations face uncertainty in the outcome of a production process and want to predict how a given set of conditions will affect the final properties of the output. Therefore, a common application of machine learning is to develop algorithms that predict these properties. For example, concrete is a common building material whose final structural properties can vary dramatically from one situation to another. Due to the significant variations in concrete properties with time and their dependence on its highly variable composition, neither models developed from first principles nor traditional regression models offer adequate predictive accuracy.

In some embodiments, the techniques described herein can be used for predicting properties of the outcome of a production process (e.g., properties of concrete). For example, the techniques described herein may be applied to the problem of predicting properties of concrete as follows:

1. Partition the dataset into training, validation, and test subsets.

2. Clean the modeling dataset: The predictive modeling system 600 may automatically check for missing data, outliers, and other data anomalies, recommending treatment strategies and offering the user the option to accept or decline them. This approach may involve less skill and effort by the user, and/or may provide more consistent results across methods, datasets, and time.

3. Select the response variable and choose a primary fitting metric: The user may select the response variable to be predicted from those available in the modeling dataset. Once the response variable has been chosen, the predictive modeling system 600 may recommend a compatible fitting metric, which the user may accept or override. This approach may involve less skill and effort by the user. Based on the response variable type and the fitting metric selected, the predictive modeling system may offer a set of predictive models, including traditional regression models, neural networks, and other machine learning models (e.g., random forests, boosted trees, support vector machines). By automatically searching among the space of possible modeling approaches, the predictive modeling system 600 may increase the expected accuracy of the final model. The default set of model choices may be overridden to exclude certain model types from consideration, to add other model types supported by the predictive modeling system but not part of the default list, or to add the user's own custom model types (e.g., implemented in R or Python).

4. Generate input features, fit models, optimize model-specific tuning parameters, and evaluate performance: In some embodiments, feature generating may include scaling for numerical covariates, Box-Cox transformations, principal components, etc. Tuning parameters for the models may be optimized via cross-validation. Validation set performance measures may be computed and presented for each model, along with other summary characteristics (e.g., model parameters for regression models, variable importance measures for boosted trees or random forests).

5. Select the final model: The choice of the final model can be made by the predictive modeling system 600 or by the user. In the latter case, the predictive modeling system may provide support to help the user make this decision, including, for example, the ranked validation set performance assessments for the models, the option of comparing and ranking performance by other quality measures than the one used in the fitting process, and/or the opportunity to build ensemble models from those component models that exhibit the best individual performance.

Inferring Measurements

Some measurements are much more costly to make than others, so organizations may want to substitute cheaper metrics for more expensive ones. Therefore, a common application of machine learning is to infer the likely output of an expensive measurement from the known output of cheaper ones. For example, "curl" is a property that captures how paper products tend to depart from a flat shape, but it can typically be judged only after products are completed. Being able to infer the curl of paper from mechanical properties easily measured during manufacturing can thus result in an enormous cost savings in achieving a given level of quality. For typical end-use properties, the relationship between these properties and manufacturing process conditions is not well understood.

In some embodiments, the techniques described herein can be used for inferring measurements. For example, the techniques described herein may be applied to the problem of inferring measurements as follows:

1. Characterize the modeling datasets: The predictive modeling system 600 may provide key summary characteristics and offer recommendations for treatment of data anomalies, which the user is free to accept, decline, or request more information about. For example, key characteristics of variables may be computed and displayed, the prevalence of missing data may be displayed and a treatment strategy may be recommended, outliers in numerical variables may be detected and, if found, a treatment strategy may be recommended, and/or other data anomalies may be detected automatically (e.g., inliers, non-informative variables whose values never change) and recommended treatments may be made available to the user.

2. Partition the dataset into training/validation/holdout subsets.

3. Feature generation/model structure selection/model fitting: The predictive modeling system 600 may combine and automate these steps, allowing extensive internal iteration. Multiple features may be automatically generated and evaluated, using both classical techniques like principal components and newer methods like boosted trees. Many different model types may be fitted and compared, including regression models, neural networks, support vector machines, random forests, boosted trees, and others. In addition, the user may have the option of including other model structures that are not part of this default collection. Model substructure selection (e.g., selection of the number of hidden units in neural networks, the specification of other model-specific tuning parameters, etc.) may be automatically performed by extensive cross-validation as part of this model fitting and evaluation process.

4. Select the final model: The choice of the final model can be made by the predictive modeling system 600 or by the user. In the latter case, the predictive modeling system may provide support to help the user make this decision, including, for example, the ranked validation set performance assessments for the models, the option of comparing and ranking performance by other quality measures than the one used in the fitting process, and/or the opportunity to build ensemble models from those component models that exhibit the best individual performance.

In some embodiments, because the predictive modeling system 600 automates and efficiently implements data pretreatment (e.g., anomaly detection), data partitioning, multiple feature generation, model fitting and model evaluation, the time used to develop models may be much shorter than it is in the traditional development cycle. Further, in some embodiments, because the predictive modeling system automatically includes data pretreatment procedures to handle both well-known data anomalies like missing data and outliers, and less widely appreciated anomalies like inliers (repeated observations that are consistent with the data distribution, but erroneous) and postdictors (i.e., extremely predictive covariates that arise from information leakage), the resulting models may be more accurate and more useful. In some embodiments, the predictive modeling system 600 is able to explore a vastly wider range of model types, and many more specific models of each type, than is traditionally feasible. This model variety may greatly reduce the likelihood of unsatisfactory results, even when applied to a dataset of compromised quality.

Referring to FIG. 10, in some embodiments, a predictive modeling system 1000 (e.g., an embodiment of predictive modeling system 600) includes at least one client computer 1010, at least one server 1050, and one or more processing nodes 1070. The illustrative configuration is only for exemplary purposes, and it is intended that there can be any number of clients 1010 and/or servers 1050.

In some embodiments, predictive modeling system 1000 may perform one or more (e.g., all) steps of method 800. In some embodiments, client 1010 may implement the user interface 1020, and the predictive modeling module 1052 of server 1050 may implement other components of predictive modeling system 600 (e.g., modeling space exploration engine 610, library of modeling techniques 630, a library of prediction problems, and/or modeling deployment engine 640). In some embodiments, the computational resources allocated by exploration engine 610 for the exploration of the modeling search space may be resources of the one or more processing nodes 1070, and the one or more processing nodes 1070 may execute the modeling techniques according to the resource allocation schedule. However, embodiments are not limited by the manner in which the components of predictive modeling system 600 or predictive modeling method 800 are distributed between client 1010, server 1050, and one or more processing nodes 1070. Furthermore, in some embodiments, all components of predictive modeling system 600 may be implemented on a single computer (instead of being distributed between client 1010, server 1050, and processing node(s) 1070), or implemented on two computers (e.g., client 1010 and server 1050).

One or more communications networks 1030 connect the client 1010 with the server 1050, and one or more communications networks 1080 connect the server 1050 with the processing node(s) 1070. The communication networks 1030 or 1080 can include one or more component or functionality of network 570. The communication may take place via any media such as standard telephone lines, LAN or WAN links (e.g., T1, T3, 56 kb, X.25), broadband connections (ISDN, Frame Relay, ATM), and/or wireless links (IEEE 802.11, Bluetooth). The networks 1030/1080 can carry TCP/IP protocol communications, and data (e.g., HTTP/HTTPS requests, etc.) transmitted by client 1010, server 1050, and processing node(s) 1070 can be communicated over such TCP/IP networks. The type of network is not a limitation, however, and any suitable network may be used. Non-limiting examples of networks that can serve as or be part of the communications networks 1030/1080 include a wireless or wired Ethernet-based intranet, a local or wide-area network (LAN or WAN), and/or the global communications network known as the Internet, which may accommodate many different communications media and protocols.

The client 1010 can be implemented with software 1012 running on hardware. In some embodiments, the hardware may include a personal capable of running operating systems and/or various varieties of Unix and GNU/Linux. The client 1010 may also be implemented on such hardware as a smart or dumb terminal, network computer, wireless device, wireless telephone, information appliance, workstation, minicomputer, mainframe computer, personal data assistant, tablet, smart phone, or other computing device that is operated as a general purpose computer, or a special purpose hardware device used solely for serving as a client 1010.

Generally, in some embodiments, clients 1010 can be operated and used for various activities including sending and receiving electronic mail and/or instant messages, requesting and viewing content available over the World Wide Web, participating in chat rooms, or performing other tasks commonly done using a computer, handheld device, or cellular telephone. Clients 1010 can also be operated by users on behalf of others, such as employers, who provide the clients 1010 to the users as part of their employment.

In various embodiments, the software 1012 of client computer 610 includes client software 1014 and/or a web browser 1016. The web browser 1016 allows the client 1010 to request a web page or other downloadable program, applet, or document (e.g., from the server 1050) with a web-page request. One example of a web page is a data file that includes computer executable or interpretable information, graphics, sound, text, and/or video, that can be displayed, executed, played, processed, streamed, and/or stored and that can contain links, or pointers, to other web pages.

In some embodiments, the software 1012 includes client software 1014. The client software 1014 provides, for example, functionality to the client 1010 that allows a user to send and receive electronic mail, instant messages, telephone calls, video messages, streaming audio or video, or other content. Not shown are standard components associated with client computers, including a central processing unit, volatile and non-volatile storage, input/output devices, and a display.

In some embodiments, web browser software 1016 and/or client software 1014 may allow the client to access a user interface 1020 for a predictive modeling system 600.

The server 1050 interacts with the client 1010. The server 1050 can be implemented on one or more server-class computers that have sufficient memory, data storage, and processing power and that run a server-class operating system. System hardware and software other than that specifically described herein may also be used, depending on the capacity of the device and the size of the user base. For example, the server 1050 may be or may be part of a logical group of one or more servers such as a server farm or server network. As another example, there may be multiple servers 1050 associated with or connected to each other, or multiple servers may operate independently, but with shared data. In a further embodiment and as is typical in large-scale systems, application software can be implemented in components, with different components running on different server computers, on the same server, or some combination.

In some embodiments, server 1050 includes a predictive modeling module 1052, a communications module 1056, and/or a data storage module 1054. In some embodiments, the predictive modeling module 1052 may implement modeling space exploration engine 610, library of modeling techniques 630, a library of prediction problems, and/or modeling deployment engine 640. In some embodiments, server 1050 may use communications module 1056 to communicate the outputs of the predictive modeling module 1052 to the client 1010, and/or to oversee execution of modeling techniques on processing node(s) 1070. The modules described throughout the specification can be implemented in whole or in part as a software program using any suitable programming language or languages (C++, C #, java, LISP, BASIC, PERL, etc.) and/or as a hardware device (e.g., ASIC, FPGA, processor, memory, storage and the like).

A data storage module 1054 may store, for example, predictive modeling library 630 and/or a library of prediction problems.

FIG. 7 illustrates an implementation of a predictive modeling system 600. The discussion of FIG. 7 is given by way of example of some embodiments, and is in no way limiting.

Figure 11:
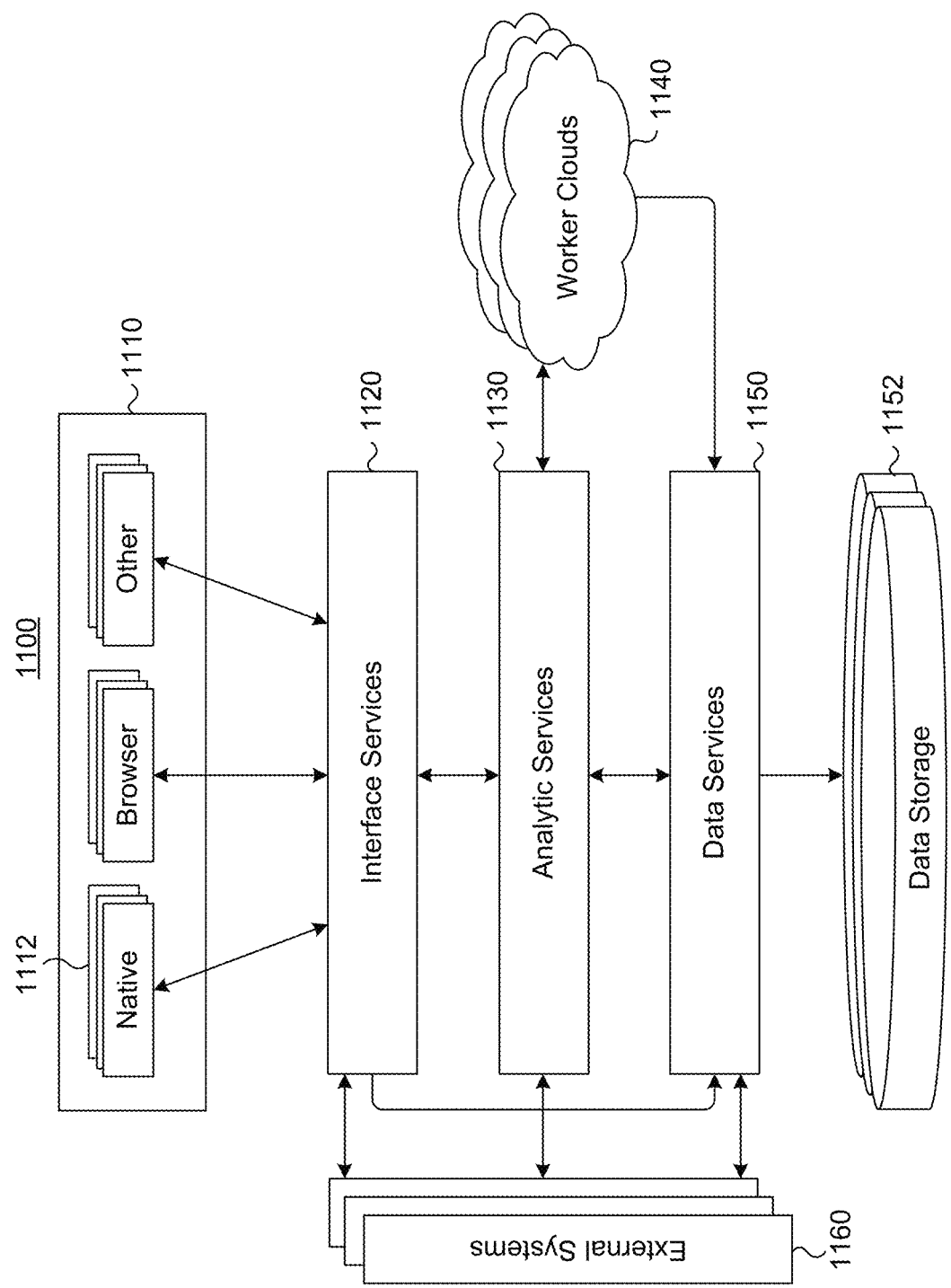
FIG. 11 illustrates another block diagram of a predictive modeling system, in accordance with some embodiments.

To execute the previously described procedures, predictive modeling system 600 may use a distributed software architecture 1100 running on a variety of client and server computers. The goal of the software architecture 1100 is to simultaneously deliver a rich user experience and computationally intensive processing. The software architecture 1100 may implement a variation of the basic 4-tier Internet architecture. As illustrated in FIG. 11, it extends this foundation to leverage cloud-based computation, coordinated via the application and data tiers.

The similarities and differences between architecture 1100 and the basic 4-tier Internet architecture may include:

(1) Clients 1110. The architecture 1100 makes essentially the same assumptions about clients 1110 as any other Internet application. The primary use-case includes frequent access for long periods of time to perform complex tasks. So target platforms include rich Web clients running on a laptop or desktop. However, users may access the architecture via mobile devices. Therefore, the architecture is designed to accommodate native clients 712 directly accessing the Interface Services APIs using relatively thin client-side libraries. Of course, any cross-platform GUI layers such as Java and Flash, could similarly access these APIs.

(2) Interface Services 1120. This layer of the architecture is an extended version of the basic Internet presentation layer. Due to the sophisticated user interaction that may be used to direct machine learning, alternative implementations may support a wide variety of content via this layer, including static HTML, dynamic HTML, SVG visualizations, executable Javascript code, and even self-contained IDEs. Moreover, as new Internet technologies evolve, implementations may accommodate new forms of content or alter the division of labor between client, presentation, and application layers for executing user interaction logic. Therefore, their Interface Services layer 1120 may provide a flexible framework for integrating multiple content delivery mechanisms of varying richness, plus common supporting facilities such as authentication, access control, and input validation.

(3) Analytic Services 1130. The architecture may be used to produce predictive analytics solutions, so its application tier focuses on delivering Analytic Services. The computational intensity of machine learning drives the primary enhancement to the standard application tier—the dynamic allocation of machine-learning tasks to large numbers of virtual "workers" running in cloud environments. For every type of logical computation request generated by the execution engine, the Analytic Services layer 1130 coordinates with the other layers to accept requests, break requests into jobs, assign jobs to workers, provide the data used for job execution, and collate the execution results. There is also an associated difference from a standard application tier. The predictive modeling system 600 may allow users to develop their own machine-learning techniques and thus some implementations may provide one or more full IDEs, with their capabilities partitioned across the Client, Interface Services, and Analytic Services layers. The execution engine then incorporates new and improved techniques created via these IDEs into future machine-learning computations.

(4) Worker Clouds 1140. To efficiently perform modeling computations, the predictive modeling system 600 may break them into smaller jobs and allocates them to virtual worker instances running in cloud environments. The architecture 700 allows for different types of workers and different types of clouds. Each worker type corresponds to a specific virtual machine configuration. For example, the default worker type provides general machine-learning capabilities for trusted modeling code. But another type enforces additional security "sandboxing" for user-developed code. Alternative types might offer configurations optimized for specific machine-learning techniques. As long as the Analytic Services layer 1130 understands the purpose of each worker type, it can allocate jobs appropriately. Similarly, the Analytic Services layer 1130 can manage workers in different types of clouds. An organization might maintain a pool of instances in its private cloud as well as have the option to run instances in a public cloud. It might even have different pools of instances running on different kinds of commercial cloud services or even a proprietary internal one. As long as the Analytic Services layer 730 understands the tradeoffs in capabilities and costs, it can allocate jobs appropriately.

(5) Data Services 1150. The architecture 1100 assumes that the various services running in the various layers may benefit from a corresponding variety of storage options. Therefore, it provides a framework for delivering a rich array of Data Services 1150, e.g., file storage for any type of permanent data, temporary databases for purposes such as caching, and permanent databases for long-term record management. Such services may even be specialized for particular types of content such as the virtual machine image files used for cloud workers and IDE servers. In some cases, implementations of the Data Services layer 1150 may enforce particular access idioms on specific types of data so that the other layers can smoothly coordinate. For instance, standardizing the format for datasets and model results means the Analytic Services layer 1130 may simply pass a reference to a user's dataset when it assigns a job to a worker. Then, the worker can access this dataset from the Data Services layer 1150 and return references to the model results which it has, in turn, stored via Data Services 1150.

(6) External Systems 1160. Like any other Internet application, the use of APIs may enable external systems to integrate with the predictive modeling system 600 at any layer of the architecture 1100. For example, a business dashboard application could access graphic visualizations and modeling results through the Interface Services layer 1120. An external data warehouse or even live business application could provide modeling datasets to the Analytic Services layer 1130 through a data integration platform. A reporting application could access all the modeling results from a particular time period through the Data Services layer 1150. However, under most circumstances, external systems would not have direct access to Worker Clouds 1140; they would utilize them via the Analytic Services layer 1130.

As with all multi-tiered architectures, the layers of architecture 1100 are logical. Physically, services from different layers could run on the same machine, different modules in the same layer could run on separate machines, and multiple instances of the same module could run across several machines. Similarly, the services in one layer could run across multiple network segments and services from different layers may or may not run on different network segments. But the logical structure helps coordinate developers' and operators' expectations of how different modules will interact, as well as gives operators the flexibility used to balance service-level requirements such as scalability, reliability, and security.

While the high-level layers appear reasonably similar to those of a typical Internet application, the addition of cloud-based computation may substantially alter how information flows through the system.

Internet applications usually offer two distinct types of user interaction: synchronous and asynchronous. With conceptually synchronous operations, such as finding an airline flight and booking a reservation, the user makes a request and waits for the response before making the next request. With conceptually asynchronous operations, such as setting an alert for online deals that meet certain criteria, the user makes a request and expects the system to notify him at some later time with results. Typically, the system provides the user an initial request "ticket" and offers notification through a designated communications channel.

In contrast, building and refining machine-learning models may involve an interaction pattern somewhere in the middle. Setting up a modeling problem may involve an initial series of conceptually synchronous steps. But when the user instructs the system to begin computing alternative solutions, a user who understands the scale of the corresponding computations is unlikely to expect an immediate response. Superficially, this expectation of delayed results makes this phase of interaction appear asynchronous.

However, predictive modeling system 600 doesn't force the user to "fire-and-forget", i.e., stop his own engagement with the problem until receiving a notification. In fact, it may encourage him to continue exploring the dataset and review preliminary results as soon as they arrive. Such additional exploration or initial insight might inspire him to change the model-building parameters "in-flight". The system may then process the requested changes and reallocate processing tasks. The predictive modeling system 600 may allow this request-and-revise dynamic continuously throughout the user's session.

The predictive modeling system 600 may not fit cleanly into the layered model, which assumes that each layer mostly only relies on the layer directly below it. Various analytic services and data services can cooperatively coordinate users and computation.

To make operational predictions, a user may want an independent prediction service, completely separate from the model building computing infrastructure. An independent prediction service may run in a different computing environment or be managed as a distinct component within a shared computing environment. Once instantiated, the service's execution, security, and monitoring may be fully separated from the model building environment allowing the user to deploy and manage it independently.

After instantiating the service, the deployment engine may allow the user to install fitted models into the service. To enhance (e.g., optimize) performance, the implementation of a modeling technique suitable for fitting models may be suboptimal for making predictions. For example, fitting a model may entail running the same algorithm repeatedly so it is often worthwhile to invest a significant amount of overhead into enabling fast parallel execution of the algorithm. However, if the expected rate of prediction requests isn't very high, that same overhead may not be worthwhile for an independent prediction service. In some cases, a modeling technique developer may even provide specialized versions of one or more of its component execution tasks that provide better performance characteristics in a prediction environment. In particular, implementations designed for highly parallel execution or execution on specialized processors may be advantageous for prediction performance. Similarly, in cases where a modeling technique includes tasks specified in a programming language, precompiling the tasks at the time of service instantiation rather than waiting until service startup or an initial request for a prediction from that model may provide a performance improvement.

Also, model fitting tasks generally use computing infrastructure differently than a prediction service. To protect a cloud infrastructure from errors during modeling technique execution and to prevent access to modeling techniques from other users in the cloud, modeling techniques may execute in secure computing containers during model fitting. However, prediction services often run on dedicated machines or clusters. Removing the secure container layer may therefore reduce overhead without any practical disadvantage.

Therefore, based on the specific tasks executed by a model's modeling technique, the expected load, and the characteristics of the target computing environment for prediction, the deployment engine may use a set of rules for packaging and deploying the model. These rules may optimize execution.

Because a given prediction service may execute multiple models, the service may allocate computing resources across prediction requests for each model. There are two basic cases, deployments to one or more server machines and deployments to computing clusters.

In the case of deployments to servers, the challenge is how to allocate requests among multiple servers. The prediction service may have several types of a priori information. Such information may include (a) estimates of how long it takes to execute a prediction for each configured model, (b) the expected frequency of requests for each configured model at different times, and (c) the desired priority of model execution. Estimates of execution time may be calculated based on measuring the actual execution speed of the prediction code for each model under one or more conditions. The desired priority of model execution may be specified by a service administrator. The expected frequency of requests could be computed from historical data for that model, forecast based on a meta-machine learning model, or provided by an administrator.

The service may include an objective function that combines some or all of these factors to compute a fraction of all available servers' aggregate computing power that may be initially allocated to each model. As the service receives and executes requests, it naturally obtains updated information on estimates of execution time and expected frequency of requests. Therefore, the service may recalculate these fractions and reallocate models to servers accordingly.

A deployed prediction service may have two different types of server processes: routers and workers. One or more routers may form a routing service that accepts requests for predictions and allocates them to workers. Incoming requests may have a model identifier indicating which prediction model to use, a user or client identifier indicating which user or software system is making the request, and one or more vectors of predictor variables for that model.

When a request comes into a dedicated prediction service, its routing service may inspect some combination of the model identifier, user or client identifier, and number of vectors of predictor variables. The routing service may then allocate requests to workers to increase (e.g., maximize) server cache hits for instructions and data used (1) in executing a given model and/or (2) for a given user or client. The routing service may also take into account the number of vectors of predictor variables to achieve a mixture of batch sizes submitted to each worker that balances latency and throughput.

Examples of algorithms for allocating requests for a model across workers may include round-robin, weighted round robin based on model computation intensity and/or computing power of the worker, and dynamic allocation based on reported load. To facilitate quick routing of requests to the designated server, the routing service may use a hash function that chooses the same server given the same set of observed characteristics (e.g., model identifier). The hash function may be a simple hash function or a consistent hash function. A consistent hash function may use less overhead when the number of nodes (corresponding to workers in this case) changes. So if a worker goes down or new workers are added, a consistent hash function can reduce the number of hash keys that are recomputed.

In addition to enhancing (e.g., optimizing) performance by intelligently distributing prediction requests among available services, a prediction service may enhance (e.g., optimize) the performance of individual models by intelligently configuring how each worker executes each model. For example, if a given server receives a mix of requests for several different models, loading and unloading models for each request may incur substantial overhead. However, aggregating requests for batch processing may incur substantial latency. In some embodiments, the service can intelligently make this tradeoff if the administrator specifies the latency tolerance for a model. For example, urgent requests may have a latency tolerance of only 100 milliseconds in which case a server may process only one or at most a few requests. In contrast, a latency tolerance might of two seconds may enable batch sizes in the hundreds. Due to overhead, increasing the latency tolerance by a factor of two may increase throughput by 10× to 100×.

Similarly, using operating system threads may improve throughput while increasing latency, due to the thread set up and initialization overhead. In some cases, predictions may be extremely latency sensitive. If all the requests to a given model are likely to be latency sensitive, then the service may configure the servers handling those requests to operate in single threaded mode. Also, if only a subset of requests are likely to be latency sensitive, the service may allow requesters to flag a given request as sensitive. In this case, the server may operate in single threaded mode only while servicing the specific request.

In some cases, a user's organization may have batches of predictions that the organization wants to use a distributed computing cluster to calculate as rapidly as possible. Distributed computing frameworks generally allow an organization to set up a cluster running the framework, and any programs designed to work with the framework can then submit jobs comprising data and executable instructions.

Because the execution of one prediction on a model does not affect the result of another prediction on that model, or the result of any other model, predictions are stateless operations in the context of a cluster computing and thus are generally very easy to make parallel. Therefore, given a batch of data and executable instructions, the normal behavior of the framework's partitioning and allocation algorithms may result in linear scaling.

In some cases, making predictions may be part of a large workflow in which data is produced and consumed in many steps. In such cases, prediction jobs may be integrated with other operations through publish-subscribe mechanisms.

The prediction service subscribes to channels that produce new observations for which to make predictions. After the service makes predictions, it publishes them to one or more channels that other programs may consume.

Fitting modeling techniques and/or searching among a large number of alternative techniques can be computationally intensive. Computing resources may be costly. Some embodiments of the system 600 for producing predictive models identifies opportunities to reduce resource consumption.

Based on user preferences, the engine 610 may adjust its search for models to reduce execution time and consumption of computing resources. In some cases, a prediction problem may include a lot of training data. In such cases, the benefit of cross validation is usually lower in terms of reducing model bias. Therefore, the user may prefer to fit a model on all the training data at once rather than on each cross validation fold, because the computation time of one run on five to ten times the amount of data is typically much less than five to 10 runs on one-fifth to one-tenth the amount of data.

Even in cases where a user does not have a relatively large training set, the user may still wish to conserve time and resources. In such cases, the engine 610 may offer a "greedier" option that uses several more aggressive search approaches. First, the engine 610 can try a smaller subset of possible modeling techniques (e.g., only those whose expected performance is relatively high). Second, the engine 610 may prune underperforming models more aggressively in each round of training and evaluation. Third, the engine 610 may take larger steps when searching for the optimal hyper-parameters for each model.

In general, searching for the better (e.g., optimal) hyper-parameters can be costly. So even if the user wants the engine 610 to evaluate a wide spectrum of potential models and not prune them aggressively, the engine can still conserve resources by limiting (e.g., optimizing) the hyper-parameter search. The cost of this search is generally proportional to the size of the dataset. One strategy is to tune the hyper-parameters on a small fraction of the dataset and then extrapolate these parameters to the entire dataset. In some cases, adjustments are made to account for the larger amount of data. In some embodiments, the engine 610 can use one of two strategies. First, the engine 610 can perform the adjustment based on heuristics for that modeling technique. Second, the engine 610 can engage in meta-machine learning, tracking how each modeling technique's hyper-parameters vary with dataset size and building a meta predictive model of those hyper-parameters, then applying that meta model in cases where the user wants to make the tradeoff.

When working with a categorical prediction problem, there may be a minority class and a majority class. The minority class may be much smaller but relatively more useful, as in the case of fraud detection. In some embodiments, the engine 610 "down-samples" the majority class so that the number of training observations for that class is more similar to that for the minority class. In some cases, modeling techniques may automatically accommodate such weights directly during model fit. If the modeling techniques do not accommodate such weights, the engine 610 can make a post-fit adjustment proportional to the amount of down-sampling. This approach may sacrifice some accuracy for much shorter execution times and lower resource consumption.

Some modeling techniques may execute more efficiently than others. For example, some modeling techniques may be optimized to run on parallel computing clusters or on servers with specialized processors. Each modeling technique's metadata may indicate any such performance advantages. When the engine 610 is assigning computing jobs, it may detect jobs for modeling techniques whose advantages apply in the currently available computing environment. Then, during each round of search, the engine 610 may use bigger chunks of the dataset for those jobs. Those modeling techniques may then complete faster. Moreover, if their accuracy is great enough, other modeling techniques that are performing relatively poorly may not be tested.

K. User Interface (UI) Enhancements

The engine 610 may help users produce better predictive models by extracting more information from them before model building, and may provide users with a better understanding of model performance after model fitting.

In some cases, a user may have additional information about datasets that is suitable for better directing the search for accurate predictive models. For example, a user may know that certain observations have special significance and want to indicate that significance. The engine 610 may allow the user to easily create new variables for this purpose. For example, one synthetic variable may indicate that the engine should use particular observations as part of the training, validation, or holdout data partitions instead of assigning them to such partitions randomly. This capability may be useful in situations where certain values occur infrequently and corresponding observations should be carefully allocated to different partitions. This capability may be useful in situations where the user has trained a model using a different machine learning system and wants to perform a comparison where the training, validation, and holdout partitions are the same.

Similarly, certain observations may represent particularly useful or indicative events to which the user wants to assign additional weight. Thus, an additional variable inserted into the dataset may indicate the relative weight of each observation. The engine 610 may then use this weight when training models and calculating their accuracy, with the goal being to produce more accurate predictions under higher-weighted conditions.

In other cases, the user may have prior information about how certain features should behave in the models. For example, a user may know that a certain feature should have a monotonic effect on the prediction target over a certain range. In automobile insurance, it is generally believed that the chance of accident increases monotonically with age after the age of 30. Another example is creating bands for otherwise continuous variables. Personal income is continuous, but there are analytic conventions for assigning values to bands such as $10K increments up until $100K and then $25K bands until $250K, and any income greater than $250K. Then there are cases where limitations on the dataset require constraints on specific features. Sometimes, categorical variables may have a very large number of values relative to the size of dataset. The user may wish to indicate either that the engine 610 should ignore categorical features that have more than a certain number of possible categories or limit the number of categories to the most frequent X, assigning all other values to an "Other" category. In all these situations, the user interface may present the user with the option of specifying this information for each feature detected (e.g., at step 912 of the method 900).

The user interface may provide guided assistance in transforming features. For example, a user may want to convert a continuous variable into a categorical variable, but there may be no standard conventions for that variable. By analyzing the shape of the distribution, the engine 610 may choose the optimal number of categorical bands and the points at which to place "knots" in the distribution that define the boundaries between each band. Optionally, the user may override these defaults in the user interface by adding or deleting knots, as well as moving the location of the knots.

Similarly, for features that are already categorical, the engine 610 may simplify their representation by combining one or more categories into a single category. Based on the relative frequency of each observed category and the frequency with which they appear relative to the values of other features, the engine 610 may calculate the optimal way to combine categories. Optionally, the user may override these calculations by removing original categories from a combined category and/or putting existing categories into a combined category.

In certain cases, a prediction problem may include events that occur at irregular intervals. In such cases, it may be useful to automatically create a new feature that captures how many of these events have occurred within a particular time frame. For example, in insurance prediction problems, a dataset may have records of each time a policy holder had a claim. However, in building a model to predict future risk, it may be more useful to consider how many claims a policy-holder has had in the past X years. The engine may detect such situations when it evaluates the dataset (e.g., step 908 of the method 900) by detecting data structure relationships between records corresponding to entities and other records corresponding to events. When presenting the dataset to the user (e.g., at step 910), the user interface may automatically create or suggest creating such a feature. It may also suggest a time frame threshold based on the frequency with which the event occurs, calculated to maximize the statistical dependency between this variable and the occurrence of future events, or using some other heuristic. The user interface may also allow the user to override the creation of such a feature, force the creation of such a feature, and override the suggested time frame threshold.

When the system makes predictions based on models, users may wish to review these predictions and explore unusual ones. For example, the user interface may provide a list of all or a subset of predictions for a model and indicate which ones were extreme, either in terms of the magnitude of the value of the predictor or its low probability of having that value. Moreover, it is also possible to provide insight into the reason for the extreme value. For example, in an automobile insurance risk model, a particular high value may have the reason "age<25 and marital status=single."

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device may be implemented in a distributed way over a network, such as a server farm or a set of widely distributed servers, or may be implemented in a single computing device.

Embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

Present implementations can obtain, at least at the database and data collectors discussed above, real-time data in many categories and aggregate population data of additional category types. As one example, present implementations can obtain, but are not limited to obtaining, real-time reported cases, deaths, testing data, vaccination rates, and hospitalization rates from any suitable source external data source. Data sources are not limited to university and government databases, and those examples are presented above as non-limiting examples. As another example, present implementations can obtain, but are not limited to obtaining, real-time mobility data including movement trends over time by geography, and movement across different categories of places, such as retail and recreation, groceries and pharmacies, parks, transit stations, workplaces, and residential. As another example, present implementations can obtain, but are not limited to obtaining, real-time climate and other environmental data known to be disease drivers, including temperature, rainfall, and the like. Present implementations can also obtain, but are not limited to obtaining, static demographic data, including age, gender, race, ethnicity, population density, obesity rates, diabetes rates, and the like. Present implementations can also obtain, but are not limited to obtaining, static socio-economic data including median annual income, median educational level, median lifespan, and the like.

Although examples provided herein may have described modules as residing on separate computers or operations as being performed by separate computers, it should be appreciated that the functionality of these components can be implemented on a single computer, or on any larger number of computers in a distributed fashion.

The above-described embodiments may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be non-transitory. The computer readable medium or media can be transportable, such that the program or programs stored thereon can be loaded onto one or more different computers or other processors to implement various aspects of predictive modeling as discussed above. The terms "program" or "software" are used herein in a generic sense to refer to any type of computer code or set of computer-executable instructions that can be employed to program a computer or other processor to implement various aspects described in the present disclosure. Additionally, it should be appreciated that according to one aspect of this disclosure, one or more computer programs that when executed perform predictive modeling methods need not reside on a single computer or processor, but may be distributed in a modular fashion amongst a number of different computers or processors to implement various aspects of predictive modeling.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish a relationship between data elements.

Also, predictive modeling techniques may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

In some embodiments the method(s) may be implemented as computer instructions stored in portions of a computer's random access memory to provide control logic that affects the processes described above. In such an embodiment, the program may be written in any one of a number of high-level languages, such as FORTRAN, PASCAL, C, C++, C#, Java, JavaScript, Tcl, or BASIC. Further, the program can be written in a script, macro, or functionality embedded in commercially available software. Additionally, the software may be implemented in an assembly language directed to a microprocessor resident on a computer. The software may be embedded on an article of manufacture including, but not limited to, "computer-readable program means" such as a floppy disk, a hard disk, an optical disk, a magnetic tape, a PROM, an EPROM, or CD-ROM.

Various aspects of the present disclosure may be used alone, in combination, or in a variety of arrangements not specifically described in the foregoing, and the solution is therefore not limited in its application to the details and arrangement of components set forth in the foregoing description or illustrated in the drawings. For example, aspects described in one embodiment may be combined in any manner with aspects described in other embodiments.

The phraseology and terminology used herein is for the purpose of description and should not be regarded as limiting.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

Having thus described several aspects of at least one embodiment of this solution, it is to be appreciated that various alterations, modifications, and improvements will readily occur to those skilled in the art. Such alterations, modifications, and improvements are intended to be part of this disclosure, and are intended to be within the spirit and scope of the solution.

L. Terminology

The phraseology and terminology used herein is for the purpose of description and should not be regarded as limiting.

As used herein, "image data" may refer to a sequence of digital images (e.g., video), a set of digital images, a single digital image, and/or one or more portions of any of the foregoing. A digital image may include an organized set of picture elements ("pixels") stored in a file. Any suitable format and type of digital image file may be used, including but not limited to raster formats (e.g., TIFF, JPEG, GIF, PNG, BMP, etc.), vector formats (e.g., CGM, SVG, etc.), compound formats (e.g., EPS, PDF, PostScript, etc.), and/or stereo formats (e.g., MPO, PNS, JPS).

As used herein, "non-image data" may refer to any type of data other than image data, including but not limited to structured textual data, unstructured textual data, categorical data, and/or numerical data.

As used herein, "natural language data" may refer to speech signals representing natural language, text (e.g., unstructured text) representing natural language, and/or data derived therefrom.

As used herein, "speech data" may refer to speech signals (e.g., audio signals) representing speech, text (e.g., unstructured text) representing speech, and/or data derived therefrom.

As used herein, "auditory data" may refer to audio signals representing sound and/or data derived therefrom.

As used herein "time-series data" may refer to data having the attributes of "time-series data."

As used herein, the term "machine learning model" may refer to any suitable model artifact generated by the process of training a machine learning algorithm on a specific training data set. Machine learning models can be used to generate predictions.

As used herein, the term "machine learning system" may refer to any environment in which a machine learning model operates. A machine learning system may include various components, pipelines, data sets, other infrastructure, etc.

As used herein, the term "development" with regard to a machine learning model may refer to construction of the machine learning model. Machine learning models may be constructed by computers using training data sets. Thus, "development" of a machine learning model may refer to training of the machine learning model using a training data set. In some cases (generally referred to as "supervised learning"), a training data set used to train a machine learning model can include known outcomes (e.g., labels). In alternative cases (generally referred to as "unsupervised learning"), a training data set does not include known outcomes.

As used herein, "data analytics" may refer to the process of analyzing data (e.g., using machine learning models or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What we claim is:

1. A method, comprising:
receiving, by a data processing system comprising one or more processors and memory, a request to provide a visual representation of a machine learning technique executed on a set of images to generate a first attribute and a second attribute for each image;
executing, by the data processing system, the machine learning model to receive the first and the second attribute for each image;
mapping, by the data processing system, the first attribute to a visual distinctiveness protocol;
identifying, by the data processing system, a distance for each image, the distance representing a difference between the second attribute predicted by the model for each pair of respective images within the set of images; and
providing for display, by the data processing system, at least a subset of the set of images arranged in accordance with their respective distance and having a visual attribute corresponding to the mapped first attribute for each image.

2. The method of claim 1, wherein visual distinctiveness protocol corresponds to a color spectrum.

3. The method of claim 2, wherein the visual attribute corresponds to a colored border for at least one image where the color is selected based on the color spectrum.

4. The method of claim 1, wherein visual distinctiveness protocol corresponds to different shapes selected based on the first attribute.

5. The method of claim 1, wherein the subset of the set of images are selected based on a prediction threshold.

6. The method of claim 1, wherein the subset of the set of images are selected based on a known attribute associated with the set of images.

7. The method of claim 1, wherein the machine learning technique corresponds to at least one of a binary technique, a classification technique, a regression technique, a clustering technique, a multi-class technique, or a multi-labeling technique.

8. The method of claim 1, further comprising:
providing for display, by the data processing system, an input element configured to receive a feedback value.

9. The method of claim 1, further comprising:
providing for display, by the data processing system, an activation map associated with the subset of the set of images.

10. A computer system comprising:
a server having one or more processors configured to:
receive a request to provide a visual representation of a machine learning technique executed on a set of images to generate a first attribute and a second attribute for each image;
execute the machine learning model to receive the first and the second attribute for each image;
map the first attribute to a visual distinctiveness protocol;
identify a distance for each image, the distance representing a difference between the second attribute predicted by the model for each pair of respective images within the set of images; and
provide for display at least a subset of the set of images arranged in accordance with their respective distance and having a visual attribute corresponding to the mapped first attribute for each image.

11. The system of claim 10, wherein visual distinctiveness protocol corresponds to a color spectrum.

12. The system of claim 11, wherein the visual attribute corresponds to a colored border for at least one image where the color is selected based on the color spectrum.

13. The system of claim 10, wherein visual distinctiveness protocol corresponds to different shapes selected based on the first attribute.

14. The system of claim 10, wherein the subset of the set of images are selected based on a prediction threshold.

15. The system of claim 10, wherein the subset of the set of images are selected based on a known attribute associated with the set of images.

16. The system of claim 10, wherein the machine learning technique corresponds to at least one of a binary technique, a classification technique, a regression technique, a clustering technique, a multi-class technique, or a multi-labeling technique.

17. The system of claim 10, wherein the server is further configured to:
provide for display an input element configured to receive a feedback value.

18. The system of claim 10, wherein the server is further configured to:
provide for display an activation map associated with the subset of the set of images.

19. A computer system comprising:
a server comprising a processor and a non-transitory computer-readable medium containing instructions that when executed by the processor causes the processor to perform operations comprising:
receiving a request to provide a visual representation of a machine learning technique executed on a set of images to generate a first attribute and a second attribute for each image;
executing the machine learning model to receive the first and the second attribute for each image;
mapping, by the data processing system, the first attribute to a visual distinctiveness protocol;
identifying a distance for each image, the distance representing a difference between the second attribute predicted by the model for each pair of respective images within the set of images; and
providing for display at least a subset of the set of images arranged in accordance with their respective distance and having a visual attribute corresponding to the mapped first attribute for each image.

20. The system of claim 19, wherein the machine learning technique corresponds to at least one of a binary technique, a classification technique, a regression technique, a clustering technique, a multi-class technique, or a multi-labeling technique.

* * * * *